US010448627B2

(12) United States Patent
Austin et al.

(10) Patent No.: US 10,448,627 B2
(45) Date of Patent: Oct. 22, 2019

(54) PEST MONITORING SYSTEM WITH CONDUCTIVE ELECTRODES

(71) Applicant: BASF Corporation, Florham Park, NJ (US)

(72) Inventors: James W. Austin, Wake Forest, NC (US); Cheryl Ann Leichter, Durham, NC (US); Greggory Keith Storey, Cary, NC (US); Kenneth Scott Brown, Apex, NC (US); Gregory Kent Thompson, Huntsville, AL (US); Thomas S. Rancour, II, Raleigh, NC (US); Timothy Robert Sloper, Mount Dora, FL (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/028,899

(22) Filed: Jul. 6, 2018

(65) Prior Publication Data

US 2019/0008131 A1   Jan. 10, 2019

Related U.S. Application Data

(60) Provisional application No. 62/670,248, filed on May 11, 2018, provisional application No. 62/544,428, filed on Aug. 11, 2017, provisional application No. 62/529,681, filed on Jul. 7, 2017.

(51) Int. Cl.
*A01M 1/02* (2006.01)
*G01V 3/02* (2006.01)
*A01M 31/00* (2006.01)
*A01M 25/00* (2006.01)
*G01V 3/06* (2006.01)

(52) U.S. Cl.
CPC .......... *A01M 1/026* (2013.01); *A01M 25/002* (2013.01); *A01M 31/002* (2013.01); *G01V 3/02* (2013.01); *G01V 3/06* (2013.01)

(58) Field of Classification Search
None
See application file for complete search history.

(56) References Cited

U.S. PATENT DOCUMENTS

| 6,166,641 | A * | 12/2000 | Oguchi ................. A01M 1/026 340/573.1 |
| 6,914,529 | B2 | 7/2005 | Barber et al. |
| 7,212,129 | B2 | 5/2007 | Barber et al. |

(Continued)

FOREIGN PATENT DOCUMENTS

WO   2015036934 A1   3/2015

OTHER PUBLICATIONS

Botch, P.S. and Judd, T.M., Effects of Soil Cations on the Foraging Behavior of Reticulitermes flavipes (Isoptera: Rhinotermitidae), Journal of Economic Entomology, vol. 104, No. 2, pp. 425-435, 2011.

(Continued)

*Primary Examiner* — Douglas X Rodriguez
(74) *Attorney, Agent, or Firm* — Brinks Gilson & Lione

(57) ABSTRACT

A pest monitoring system generally includes a circuit, wherein the circuit is initially in a first impedance state that is configured to change to a second impedance state due to pest activity, wherein the second impedance state is lower than the first impedance state.

13 Claims, 29 Drawing Sheets

(56) References Cited

U.S. PATENT DOCUMENTS

| | | |
|---|---|---|
| 8,026,822 B2 | 9/2011 | Borth et al. |
| 8,111,155 B2 | 2/2012 | Barber et al. |
| 8,830,071 B2 | 9/2014 | Borth et al. |
| 8,984,804 B2 | 3/2015 | Borth et al. |
| 9,123,228 B2 | 9/2015 | Morehead |
| 9,542,835 B2 | 1/2017 | Borth et al. |
| 9,750,239 B2 | 9/2017 | Vilinskis et al. |
| 2006/0176834 A1 | 8/2006 | Dickerson et al. |
| 2009/0288335 A1 | 11/2009 | Cink |
| 2010/0043276 A1* | 2/2010 | Eger, Jr. ............... A01M 1/026 43/131 |
| 2010/0102926 A1 | 4/2010 | Grieve et al. |
| 2013/0276354 A1 | 10/2013 | Eger, Jr. et al. |
| 2016/0310329 A1* | 10/2016 | Patel .................. A61F 13/42 |
| 2017/0142953 A1* | 5/2017 | Carver ................. A01M 1/026 |
| 2017/0223943 A1* | 8/2017 | Park .................... A01M 1/026 |
| 2017/0223945 A1* | 8/2017 | Tolley ................. A01M 1/2011 |

OTHER PUBLICATIONS

Glenn et al., "Efficacy of Commercial Termite Baiting Systems for Management of Subterranean Termites (Isoptera: Rhinotermitidae) in Texas," Sociobiology, vol. 51, No. 2, pp. 333-362, 2008.

Lenz et al., "Differential Use of Identical Food Resources by Reticulitermes flavipes (Isoptera: Rhinotermitidae) in Two Types of Habitats," Environmental Entomology, vol. 38, No. 1, pp. 35-42, 2009.

Potter, M.F., "Termite Baits: A Guide for Homeowners," University of Kentucky, College of Agriculture, Department of Entomology, ENTFACT-639, 2004.

Su et al., "Native Subterranean Termites: Reticulitermes flavipes (Kollar), Reticulitermes virginicus (Banks), Reticulitermes hageni Banks (Insecta: Isoptera: Rinotermitidae)," University of Florida Cooperative Extension Service, Institute of Food and Agricultural Sciences, EDIS, EENY-212, 2001.

Waller, D. A., "Termite Resource Partitioning Related to Log Diameter," Northeastern Naturalist, vol. 14(1), pp. 139-144, 2007.

* cited by examiner

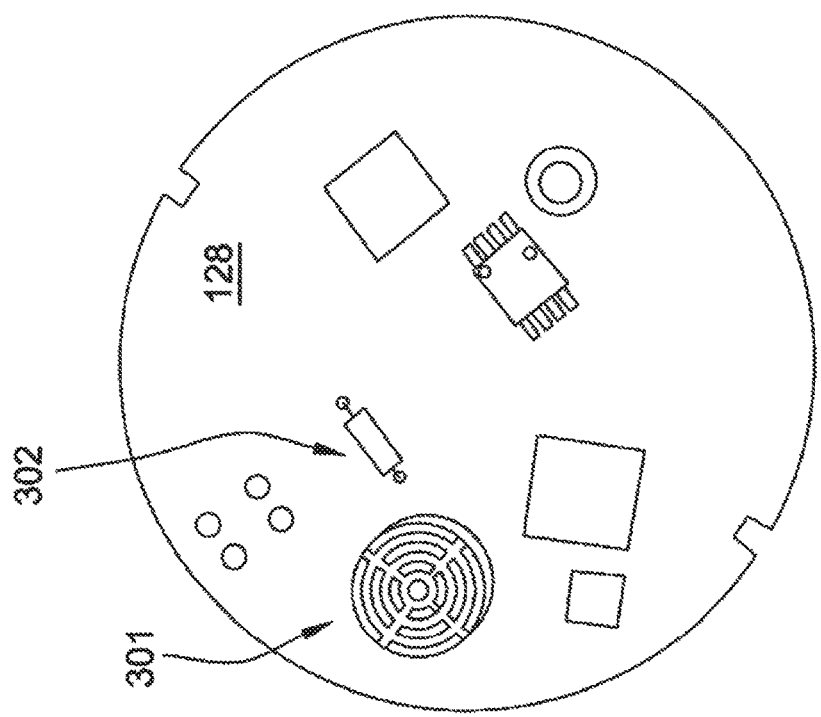
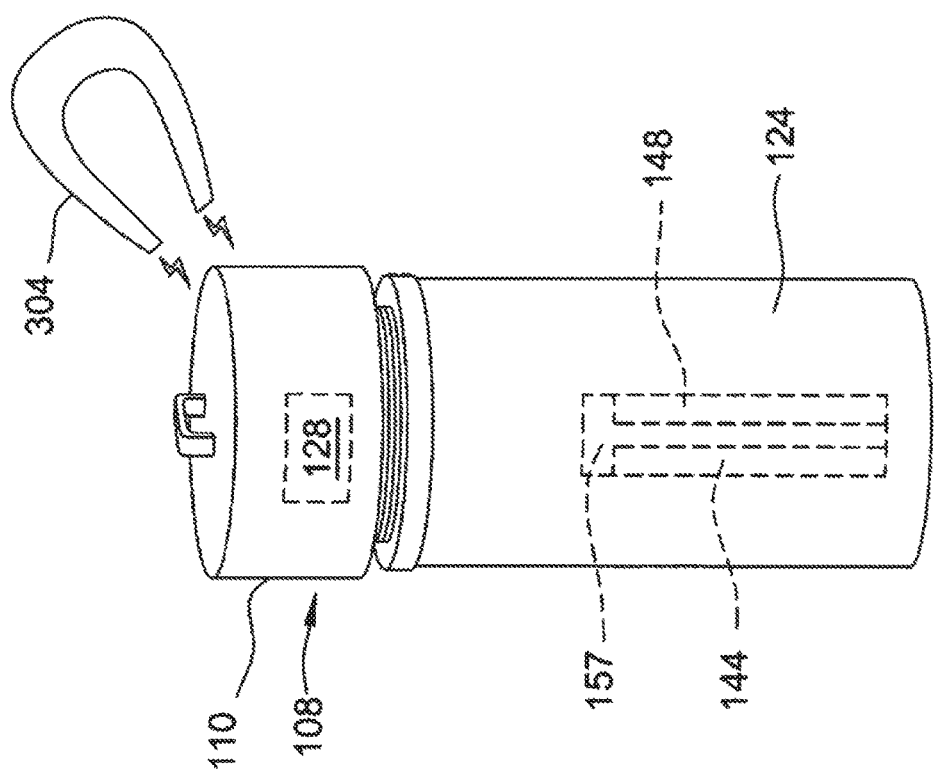
FIG. 5
FIG. 4

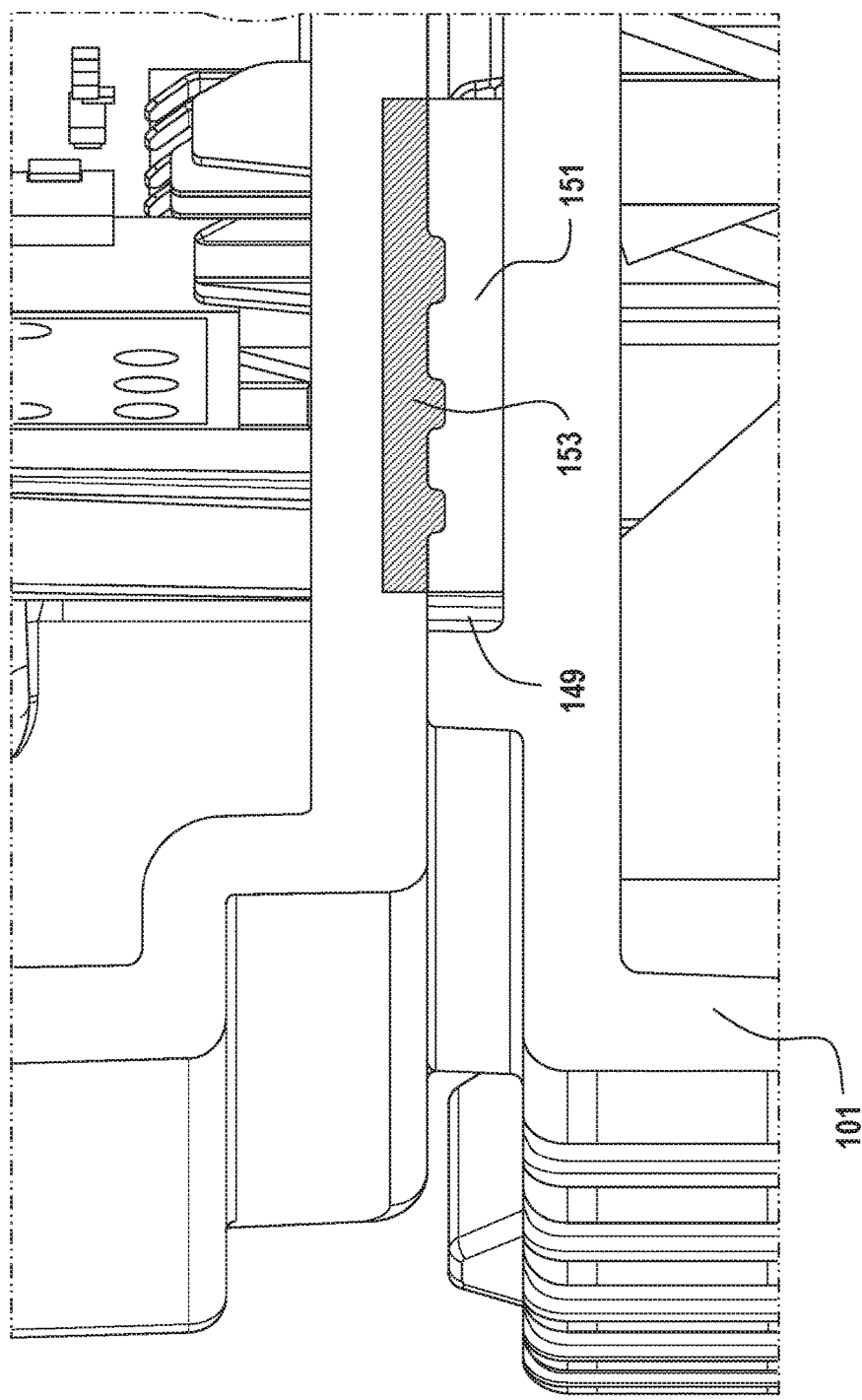

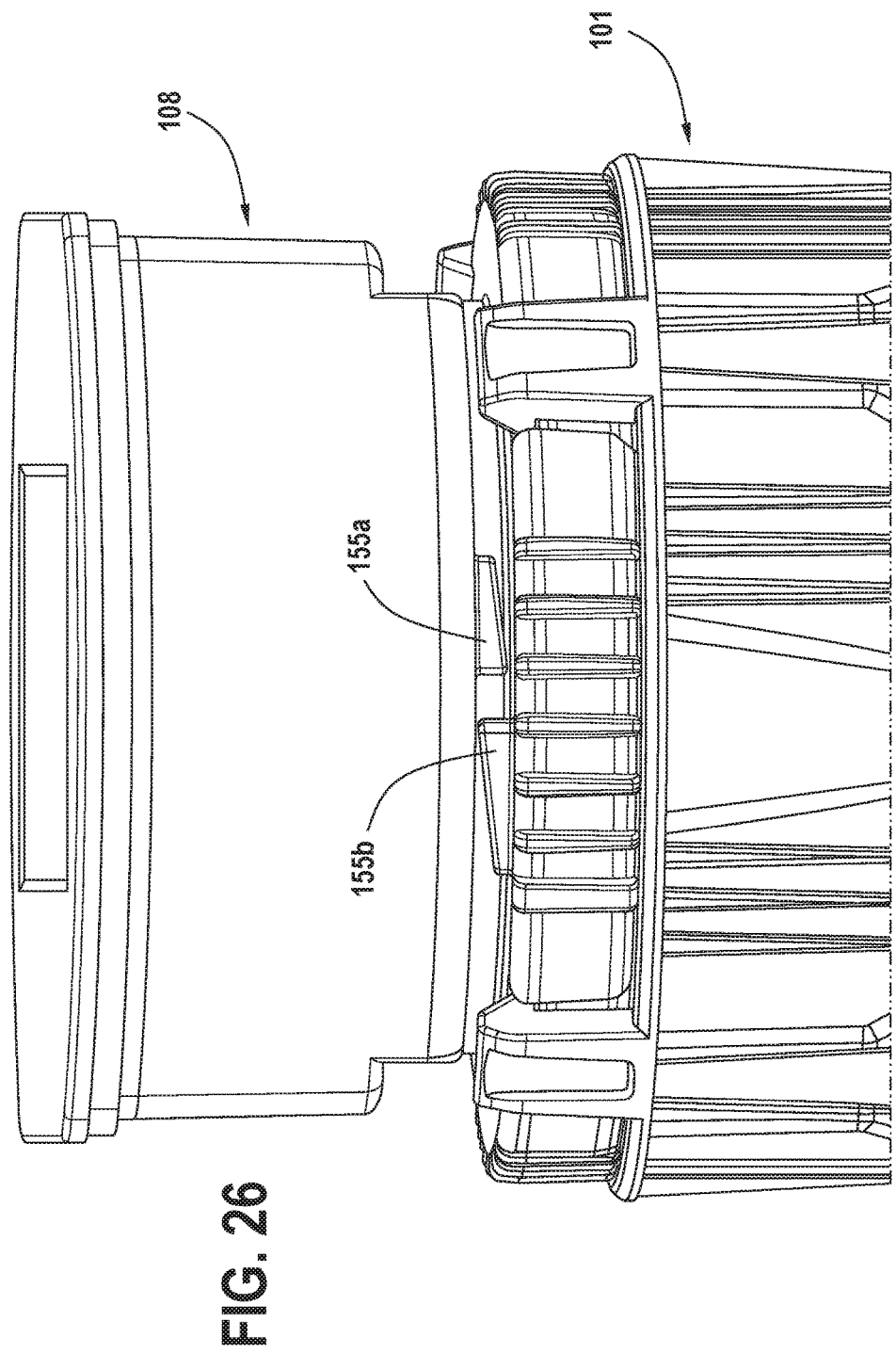

PEST MONITORING SYSTEM WITH CONDUCTIVE ELECTRODES

CROSS-REFERENCE TO RELATED APPLICATIONS

This application claims the benefit of U.S. Provisional Application No. 62/670,248, filed May 11, 2018; U.S. Provisional Application No. 62/544,428, filed Aug. 11, 2017; and U.S. Provisional Application No. 62/529,681, filed Jul. 7, 2017, each of which is incorporated by reference in its entirety.

FIELD

The present disclosure relates generally to pest monitoring systems and, more particularly, to pest monitoring systems with conductive electrodes.

BACKGROUND

Pests can cause damage to raw materials, structures, crops, food, livestock, and other human concerns. Conventional pest monitoring apparatuses often facilitate locating, deterring, and/or eradicating pests by deploying an attractant (or bait) that the pests are inclined to chew for purposes of collection and/or consumption.

Many conventional pest monitoring apparatuses must be physically inspected (e.g., manually disassembled) to visually determine whether, and to what extent, the pests are chewing (or otherwise depleting) the bait. For example, in current termite monitoring systems, a bait matrix (or matrices) is typically inserted into a physical station housing that is itself inserted into a cavity in the ground. During foraging, termites searching for food encounter the station, enter the interior of the station housing and begin feeding on the edible bait matrix or matrices. The bait typically consists of non-toxic materials, or alternatively a mixture of non-toxic and toxic materials (i.e. a pesticide active ingredient).

Pest monitoring systems may be employed to determine when control treatments should be applied and/or used, for example, as disclosed in WO 2017/011574, which is hereby incorporated by reference in its entirety. The success of a pest monitoring system for the detection of pests (e.g., termites) depends on its ability to identify the presence of pests. The relative ability of a system to discern legitimate presence of pests without false positives (indications that pest are present when they are in fact not) or false negatives (indications that pests are not present when in fact they are) is a key element to a robust and accurate pest presence determination. Improving this system to quickly identify the presence of pests increases the likelihood of controlling pests, minimizes the risk of incurring damage, and reduces false indications of pest presence.

SUMMARY

In one embodiment, a pest monitoring system generally includes a circuit, wherein the circuit is initially in a first impedance state that is configured to change to a second impedance state due to pest activity, wherein the second impedance state is lower than the first impedance state.

In another aspect, a pest monitoring system generally includes a circuit, wherein the circuit is initially in a first impedance state that is configured to change to a second impedance state due to pest activity, wherein the second impedance state is lower than the first impedance state. The system also includes a control unit configured to determine presence of pests based on a measured electrical characteristic of the circuit.

In yet another aspect, a pest monitoring system generally includes a bait station, with or without bait, and a central device of a connected system of a structure. The assembled bait station includes a circuit, wherein the circuit is initially in a first impedance state that is configured to change to a second impedance state due to pest activity, wherein the second impedance state is lower than the first impedance state. The bait station also includes a control unit configured to transmit a pest presence signal based on a detected change in impedance. The central device is configured to receive the pest presence signal from the bait station.

BRIEF DESCRIPTION OF THE DRAWINGS

FIG. 4 is an illustration of a pest monitoring or detection system using a magnet to activate a magnetic reed switch on a bait station or a data collection system;

FIG. 5 is an illustration of a control unit of the bait station or data collection system that includes a magnetic reed switch or an ultrasonic switch;

FIG. 25 illustrates a cross-section scaled view of one embodiment of a cage frame connected to a sensor assembly of the present invention; and FIG. 26 illustrates a perspective, scaled view of one embodiment of a cage frame connected to a sensor assembly of the present invention.

Corresponding reference characters indicate corresponding parts throughout the several views of the drawings.

DETAILED DESCRIPTION

Figure 1:
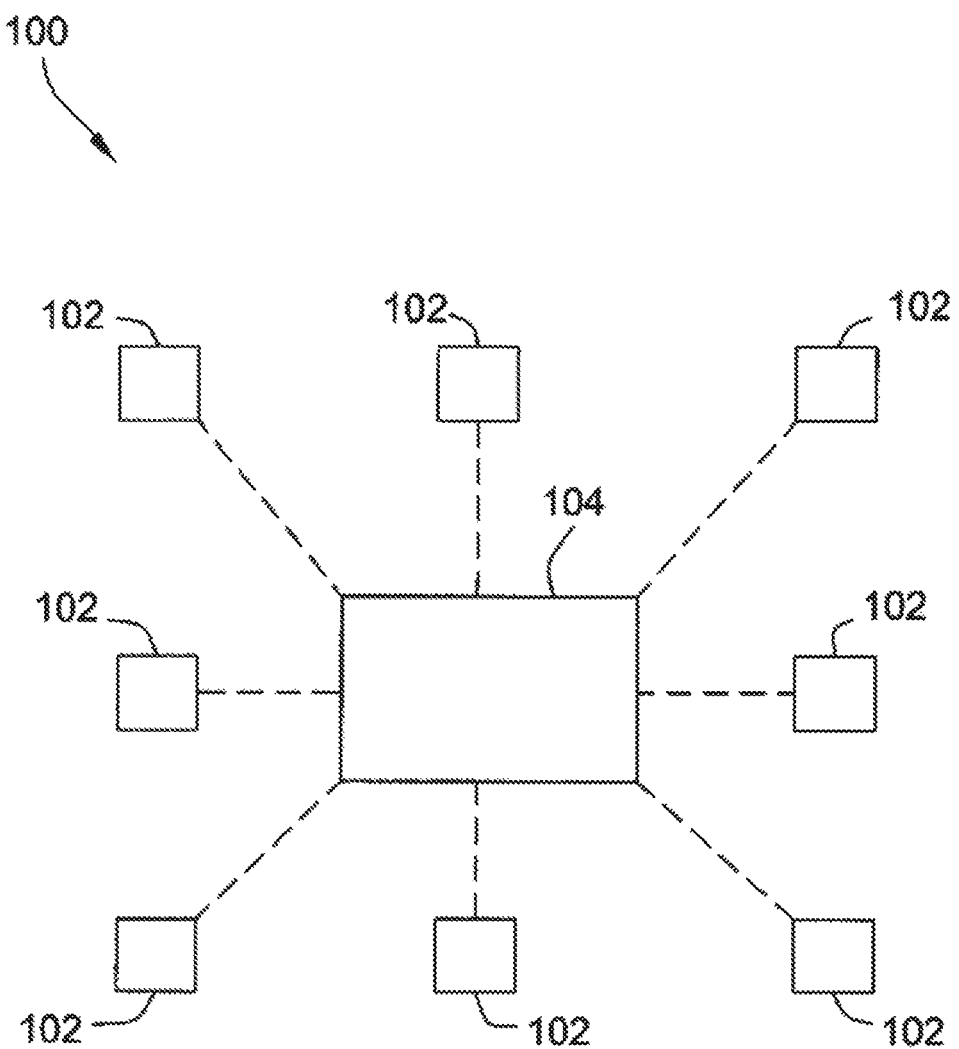
FIG. 1 is a schematic illustration of one embodiment of a pest monitoring system.

Referring now to the drawings, and in particular to FIG. 1, a pest monitoring and/or detecting system (broadly, "pest monitoring system") according to one embodiment of the present disclosure is generally indicated by reference numeral 100. In the illustrated embodiment, the system 100 is configured for at least monitoring and/or detecting, and in some embodiments controlling, pests, such as, termites (or other insects/arthropods). In other contemplated embodiments, however, the system 100 may be configured for monitoring and/or detecting, and in some embodiments controlling, other pests such as, for example and without limitation, cockroaches, ants or other insects, rats, mice, voles or other rodents, birds, bats, etc.

The system 100 may be used to monitor for pests in a variety of applications, including but not limited to, buildings (e.g., residences, offices, storage facilities, warehouses, etc.), walls, driveways, levees/dams, ship yards, docks, bridges, railroad tracks, crops (e.g., sugar-cane), orchards, ground nuts (e.g., peanuts), and/or any other suitable application.

The illustrated system 100 includes at least one bait station 102 and a gateway 104 located remotely from and capable of communication with the bait station(s) 102 for at least receiving signals from, and in some embodiments for transmitting signals to, the bait station(s) 102 as set forth in more detail below. While the phrase "bait station" may be found throughout the present disclosure, the phrase should not be interpreted as requiring a bait component, but rather should be broadly interpreted as serving as the housing for the circuitry herein described capable of triggering a pest presence signal. In this manner, a bait station should be considered any housing into which one or more pests may gain access to trigger the pest presence signal. Similarly, a reference to a "bait cage" need not include a bait component. Rather, a "bait cage" serves as a cage frame for containing the electrode assembly and other components of the present invention. Suitably, the gateway 104 may include a processor-based or microprocessor-based device with associated memory (such as a computer or a microcontroller); or any suitable configuration of a reduced instruction set circuit(s) (RISC), an application-specific integrated circuit(s) (ASICs), and/or a logic circuit(s). In other embodiments, the gateway 104 may suitably include any circuit and/or processor that is capable of executing the functions of the gateway 104 as described herein. In yet another embodiment, the gateway 104 may be integrated into a connected system, including but not limited to a smart home system and/or home security panel/system. As used herein, the term "signal" is not limited to a particular type of signaling methodology but, rather, broadly refers to any suitable type of (preferably) wireless signaling, for example, WiFi or cellular. While a single gateway 104 is illustrated in FIG. 1, it is understood that a plurality of gateways 104 may be employed and/or that the gateway(s) 104 may be integral to another connected system within the structure.

In the illustrated embodiment, the gateway 104 is located in spaced relationship from each of the bait stations 102 (eight bait stations being illustrated in FIG. 1 but any suitable number of bait stations 102 can be used in the system 100). It is understood, however, that the gateway 104 may include the components of and function as a bait station 102. Thus, in one suitable embodiment, the gateway 104 and one of the bait stations 102 can be integrated into a common assembly.

In one contemplated embodiment, the pest monitoring system 100 may include a plurality of bait stations 102 deployed at a site for monitoring and/or detecting pest activity (e.g., the perimeter around a home), and the gateway 104 may be located remotely from and stationary relative to the site and may communicate with the bait stations 102 from the remote location as set forth in more detail below. In another contemplated embodiment, the gateway 104 may be configured for use at the site (e.g., the gateway 104 may include a suitable handheld device (such as a wireless device or the like) that is moveable relative to the bait station(s) 102 for use by e.g. a technician at the site).

Figure 2A:
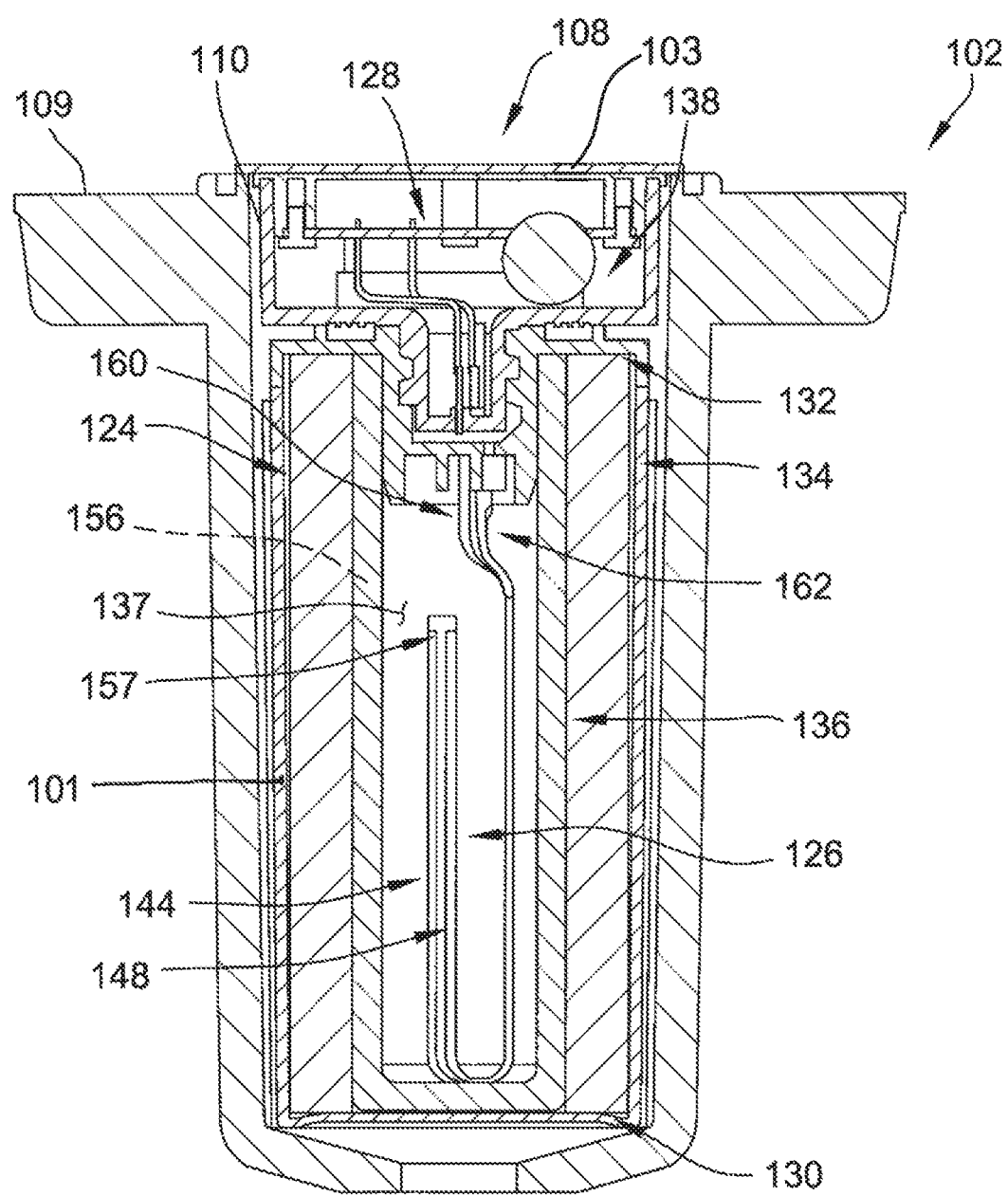
FIG. 2A is a vertical cross-section of a bait station of the pest monitoring system of FIG. 1, the bait station having an electrode assembly.

Referring to FIG. 2A, each bait station 102 includes a sensor assembly, indicated generally at 108, and, optionally, a suitable cage frame 101 for enclosing and/or housing the bait and electrode assembly as will be described in more detail herein and conjoined to the sensor assembly 108 prior to activation at the placement location (e.g., in/above the ground). The station housing 109 is configured to permit ingress and egress of termites into and out of the station housing 109 (e.g., via slits or holes in the station housing) and thereby enable termites to feed on or otherwise displace an optional bait matrix 124 located within the station housing 109 as set forth in more detail below. It is understood that the station housing 109 is not required for all embodiments of the bait station 102 and/or for the gateway 104. A further feature, with reference to FIG. 2B, includes station housing 109 and cap 103 which hold a sensor assembly 108 conjoined to a cage frame 101, for ease of transport, handling, and implanting, as well as for aesthetics.

The illustrated sensor assembly 108 generally comprises a sensor holder 110, an electrode assembly 126, and a control unit 128. As set forth in more detail below, the electrode assembly 126 of the illustrated embodiment is adjacent to or surrounded by the bait matrix 124, and the control unit 128 is configured for selectively supplying the electrode assembly 126 with an electrical stimulus. In particular embodiments, the control unit 128 is also operable to transmit a signal indicative of pest (termite) presence and/or at least one electrical characteristic of the electrode assembly 126 as a function of the electrical stimulus being supplied to the electrode assembly 126. In this manner, the control unit 128 facilitates remote monitoring via the gateway 104, which is capable of receiving the signals transmitted by the control unit 128.

Figure 17A:
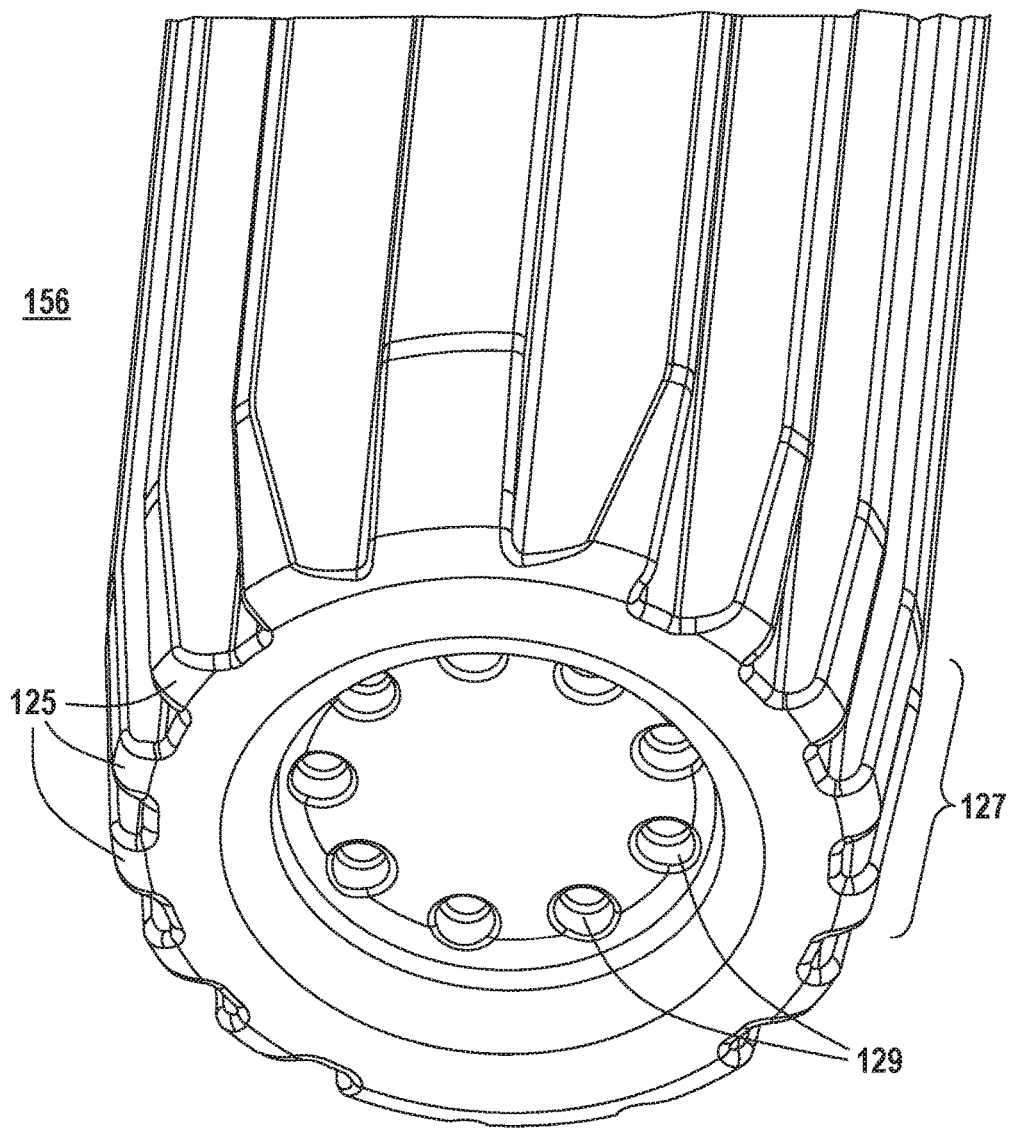
FIG. 17A illustrates a perspective, scaled view of one embodiment of a waterproof member of the present invention.
Figure 17B:
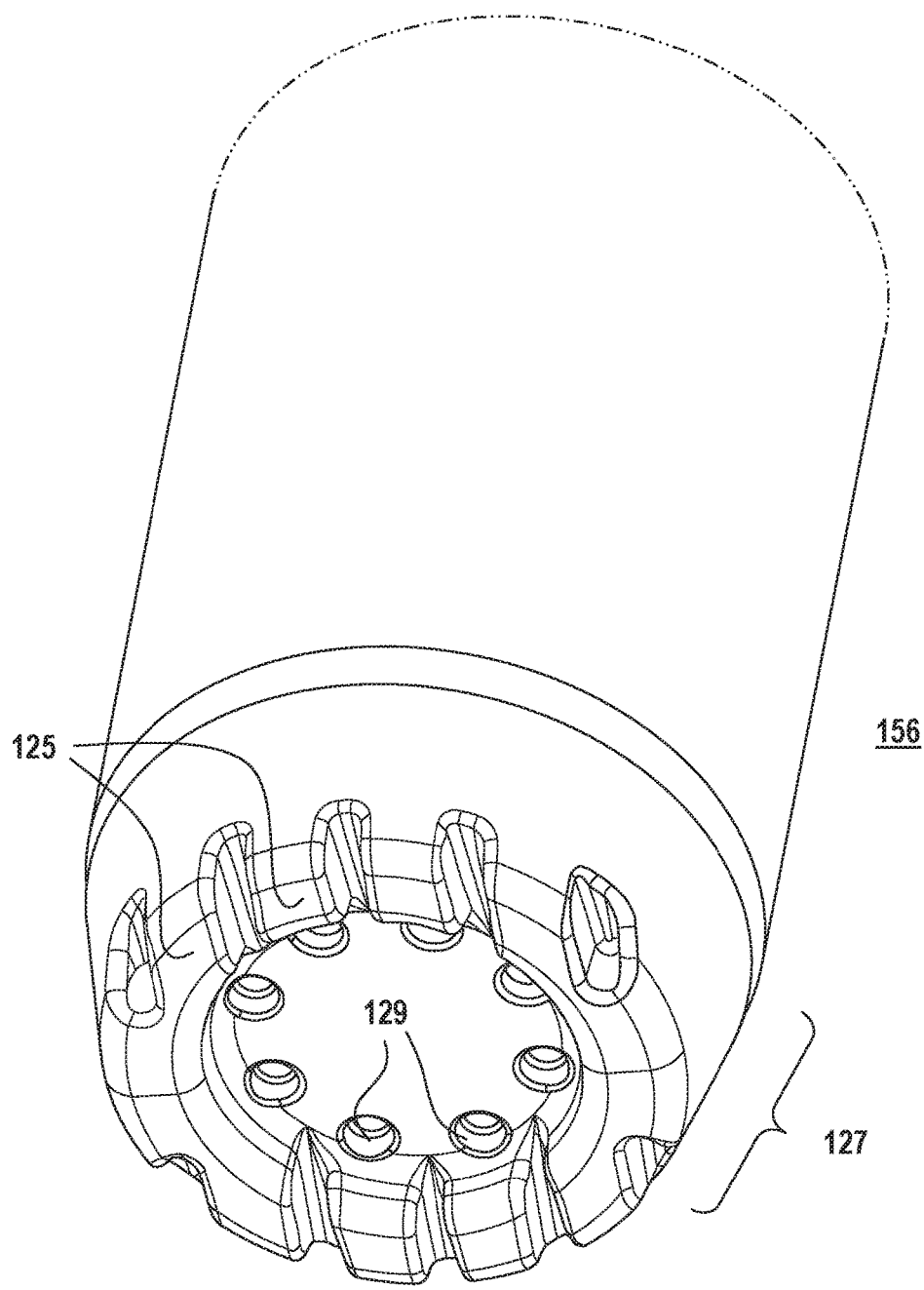
FIG. 17B illustrates a perspective, scaled view of one embodiment of a waterproof member of the present invention.
Figure 18A:
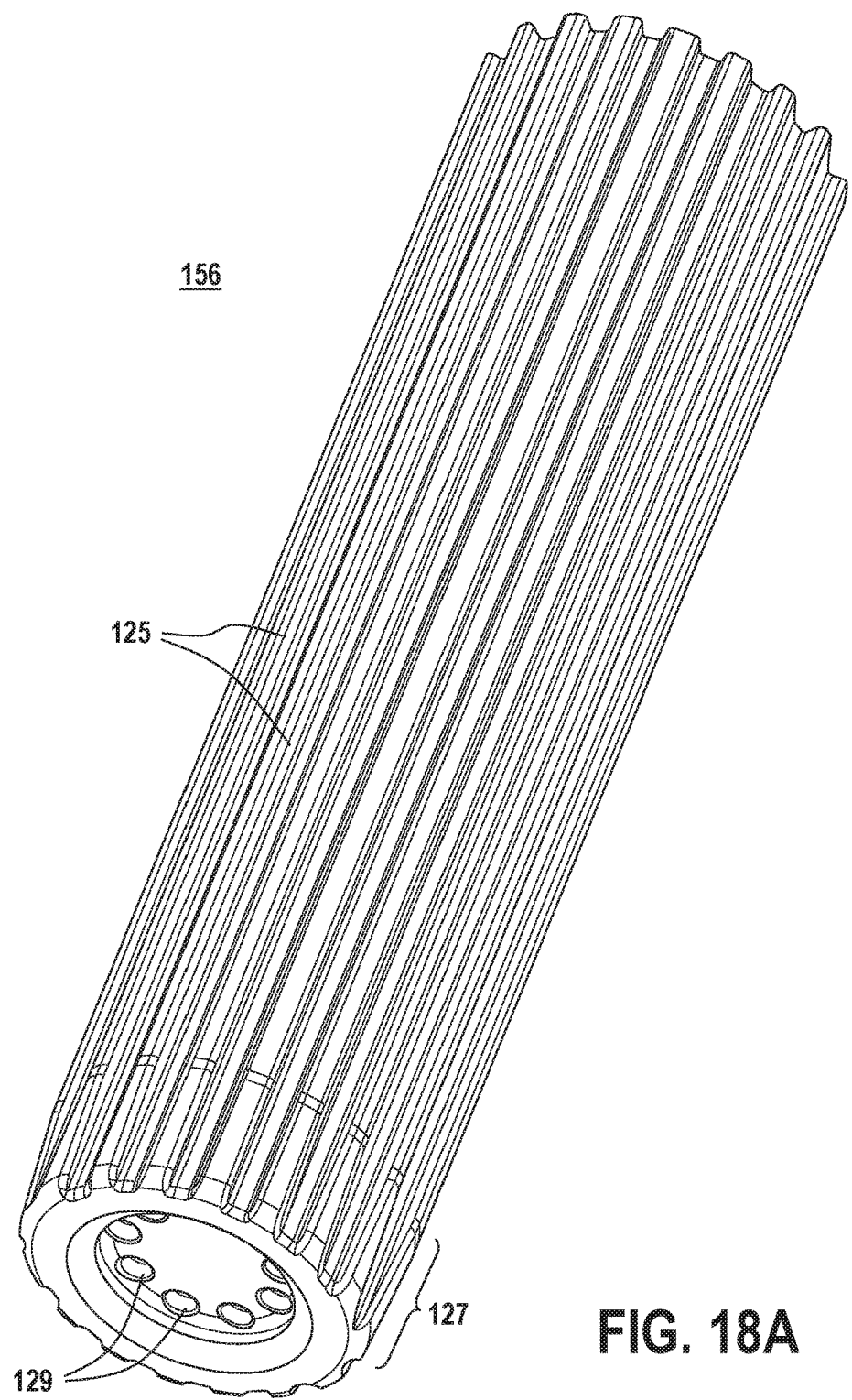
FIG. 18A illustrates a perspective view of one embodiment of a waterproof member of the present invention.
Figure 18B:
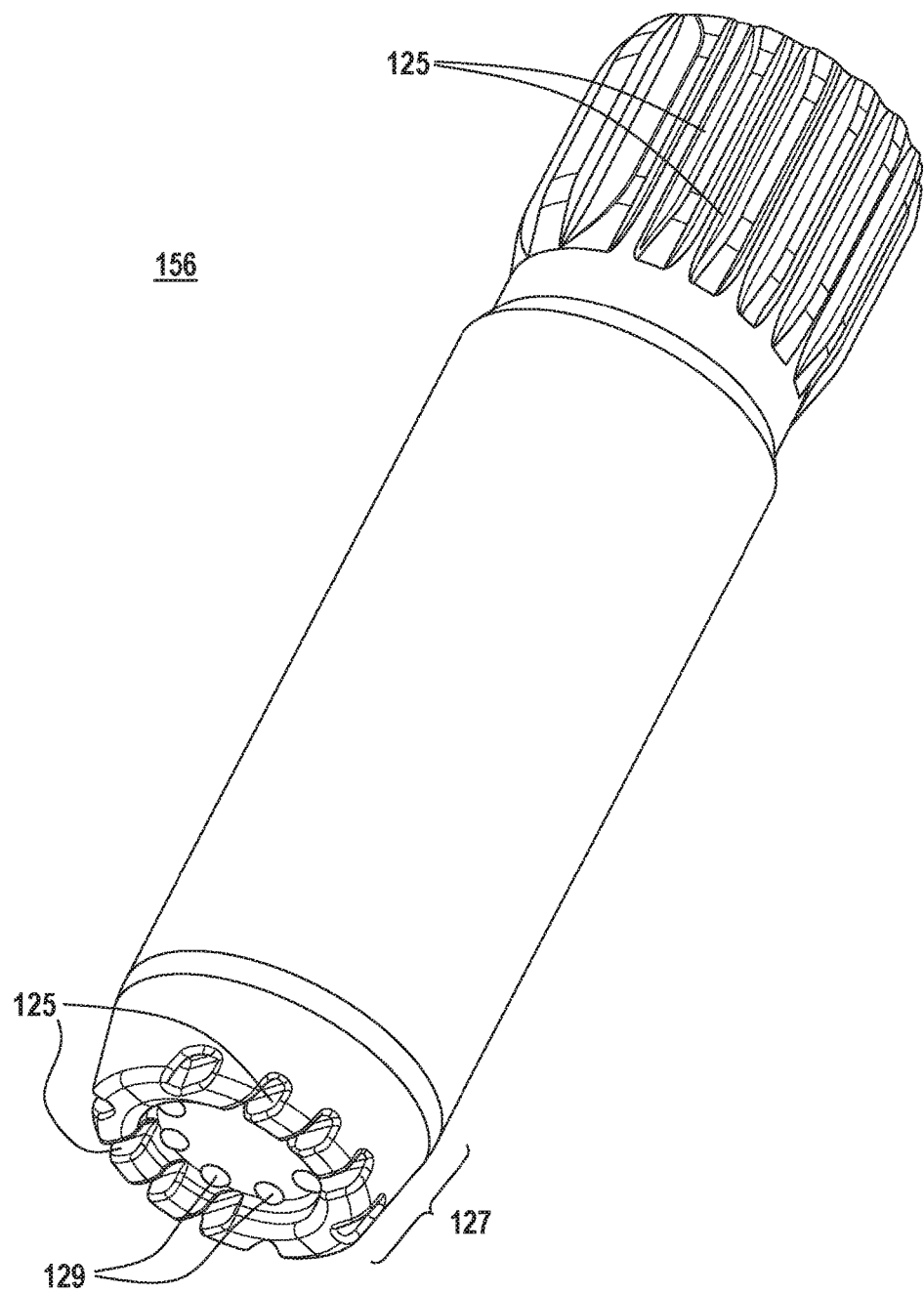
FIG. 18B illustrates a perspective view of one embodiment of a waterproof member of the present invention.

As shown in FIGS. 17 and 18, a waterproof member 156 may surround the electrode assembly 126. FIGS. 17A and 18A illustrate one embodiment. FIGS. 17B and 18B illustrate and alternative embodiment. The invention, therefore, should not be limited to particular shapes or design elements. Waterproof member 156 preferably is made of foam, and may optionally include one or more points of interest, such as ribs 125, which serve to further encourage pest exploitation. Waterproof member 156 surrounds electrode assembly 126, and, in turn, is surrounded by bait matrix 124. The point of interest ribs 125 may be longitudinal ribs the length of waterproof member 156, as illustrated in FIG. 17A, or focused on a portion of the waterproof member 156, such as at the bottom or top, as illustrated in FIGS. 18A and 18B. Further, as shown in more detail in FIGS. 17 and 18, beveling 127 and dimples 129 offer additional points of interest for pest exploitation.

With reference to FIG. 2A, the illustrated bait matrix 124 is generally tubular (e.g., generally cylindrical with an interior passage in the illustrated embodiment) having a first end surface 130, a second end surface 132, a circumferential outer surface 134, and a circumferential inner surface 136 defining an internal cavity 137 of the bait matrix 124.

While an embodiment is illustrated as cylindrical, it is understood that the bait matrix 124 may be of other suitable shapes. For example, the bait matrix 124 may have a tubular shape that is not generally cylindrical (e.g., the tubular shape may have a substantially polygonal cross-section), and/or the cavity may not extend from the first end surface 130 to the second end surface 132. In other suitable embodiments, the bait matrix 124 may not be tubular but, rather, may be generally shaped like a sphere, pyramid, cube or other suitable shape. Regardless of shape, the bait matrix may include points of interest to encourage pest exploitation of the bait matrix 124.

It is also understood that the thickness (i.e. the transverse width from the outer surface 134 to the inner surface 136) of the tubular bait matrix 124 shown in FIG. 2A is for illustration purposes. The thickness of the bait matrix 124 according to other suitable embodiments may be substantially greater or substantially smaller than that illustrated. The thickness of the bait matrix 124, however, may be any suitable thickness without departing from the scope of this invention.

In one suitable embodiment, the bait matrix 124 can be made, at least in part or in whole, from a cellulosic material that is edible or displaceable by termites, such as wood, paper, cardboard, etc. In other suitable embodiments, an agar matrix alone or combined with sugars (i.e. xylose, mannose, galactose, erythritol, aspartame, saccharin) and/or purified cellulose materials may be used as the bait matrix 124. It is contemplated that any suitable material that is edible to or can be displaced by termites can be used as the bait matrix 124 without departing from some aspects of this disclosure.

Figure 19A:
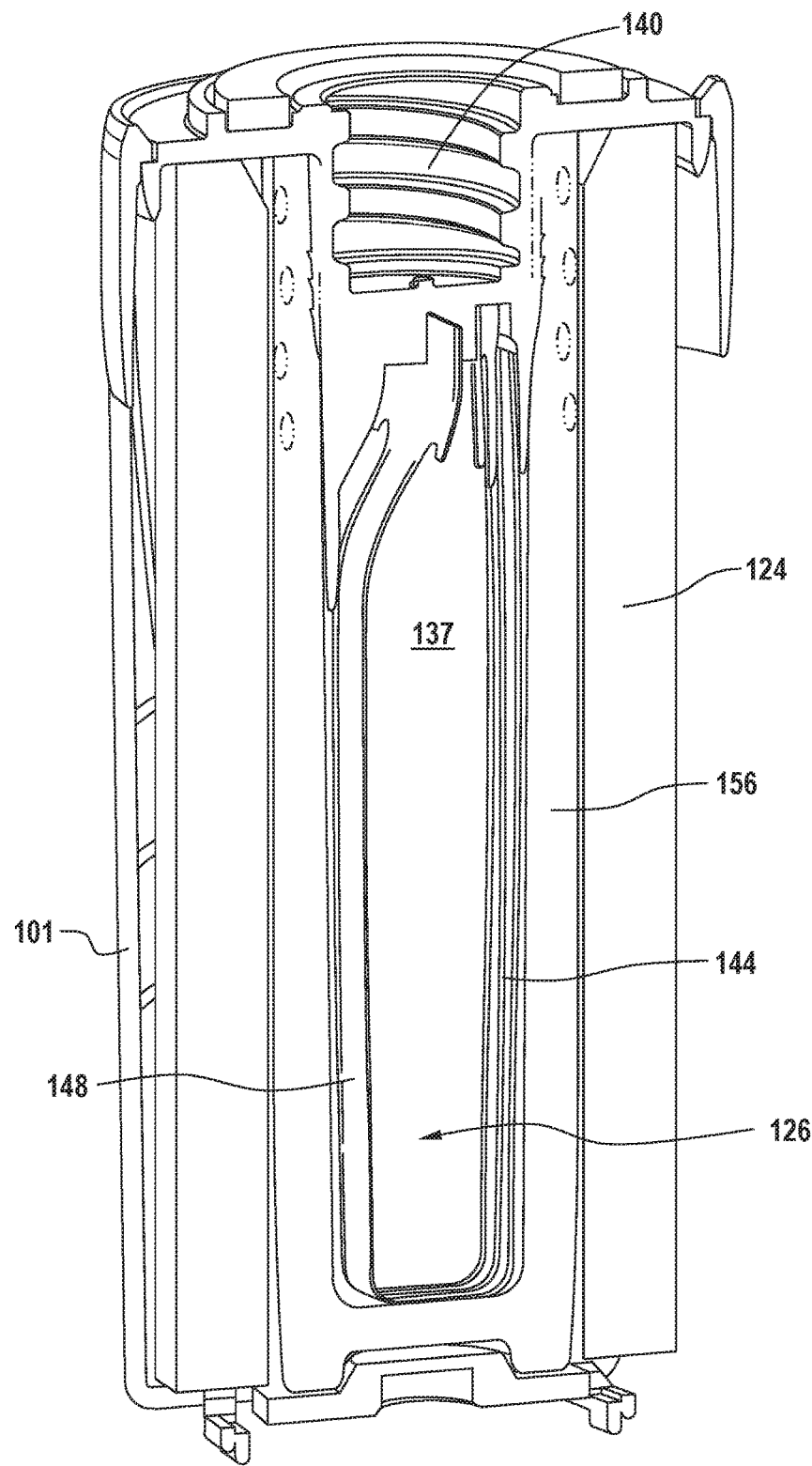
FIG. 19A illustrates a cross-sectional view of one embodiment of the present invention, shown assembled, which includes a bait matrix and an electrode assembly.
Figure 19B:
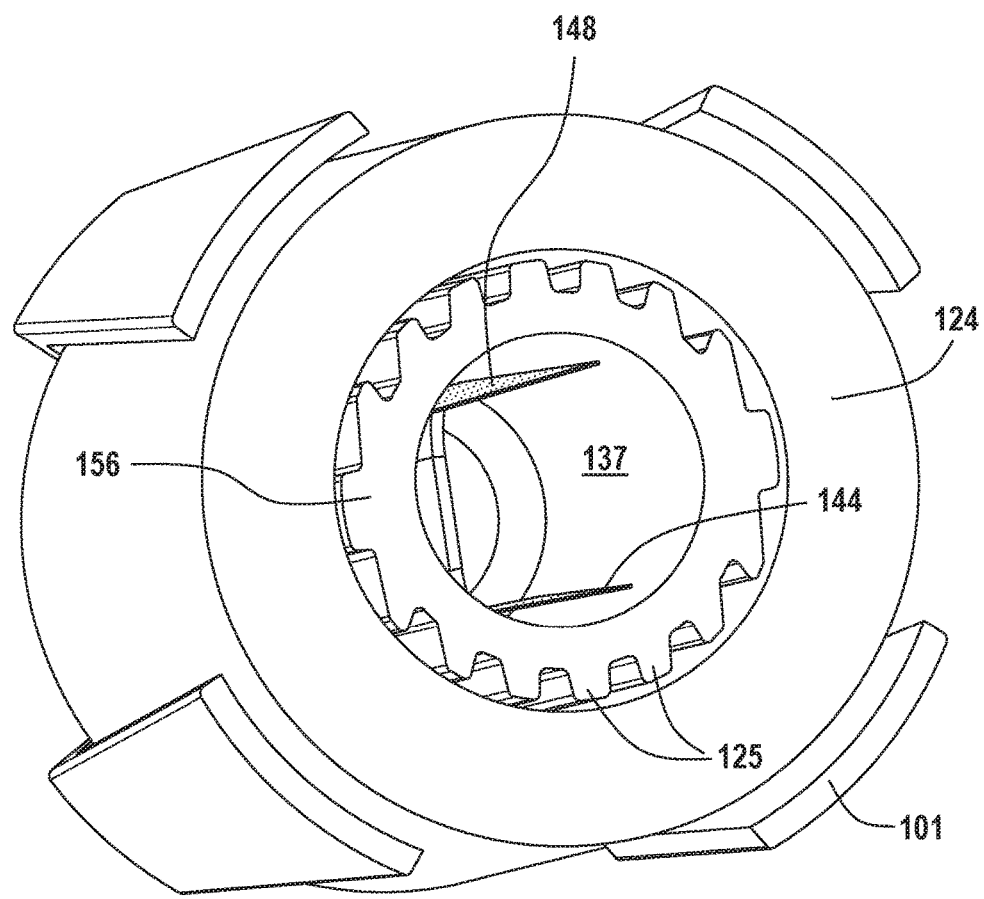
FIG. 19B illustrates a perspective, scaled, cross-sectional view of the present invention, which includes a bait matrix, within which is configured a waterproof member which holds an electrode assembly.

In the illustrated embodiment, and with reference to FIG. 19A, the electrode assembly 126 is positioned within the internal cavity 137 of the bait matrix 124 such that, in some embodiments, the electrode assembly 126 is surrounded by the bait matrix 124. For example, the electrode assembly 126 may be any one of surrounded by, embedded within, sealed within, or encased within the bait matrix 124. In other suitable embodiments, the electrode assembly 126 is positioned at least partially within the internal cavity 137 of the bait matrix 124. In other suitable embodiments, the electrode assembly 126 is positioned adjacent to, above, below, nearby, surrounding, or at any other suitable location relative to the bait matrix 124.

Figure 2B:
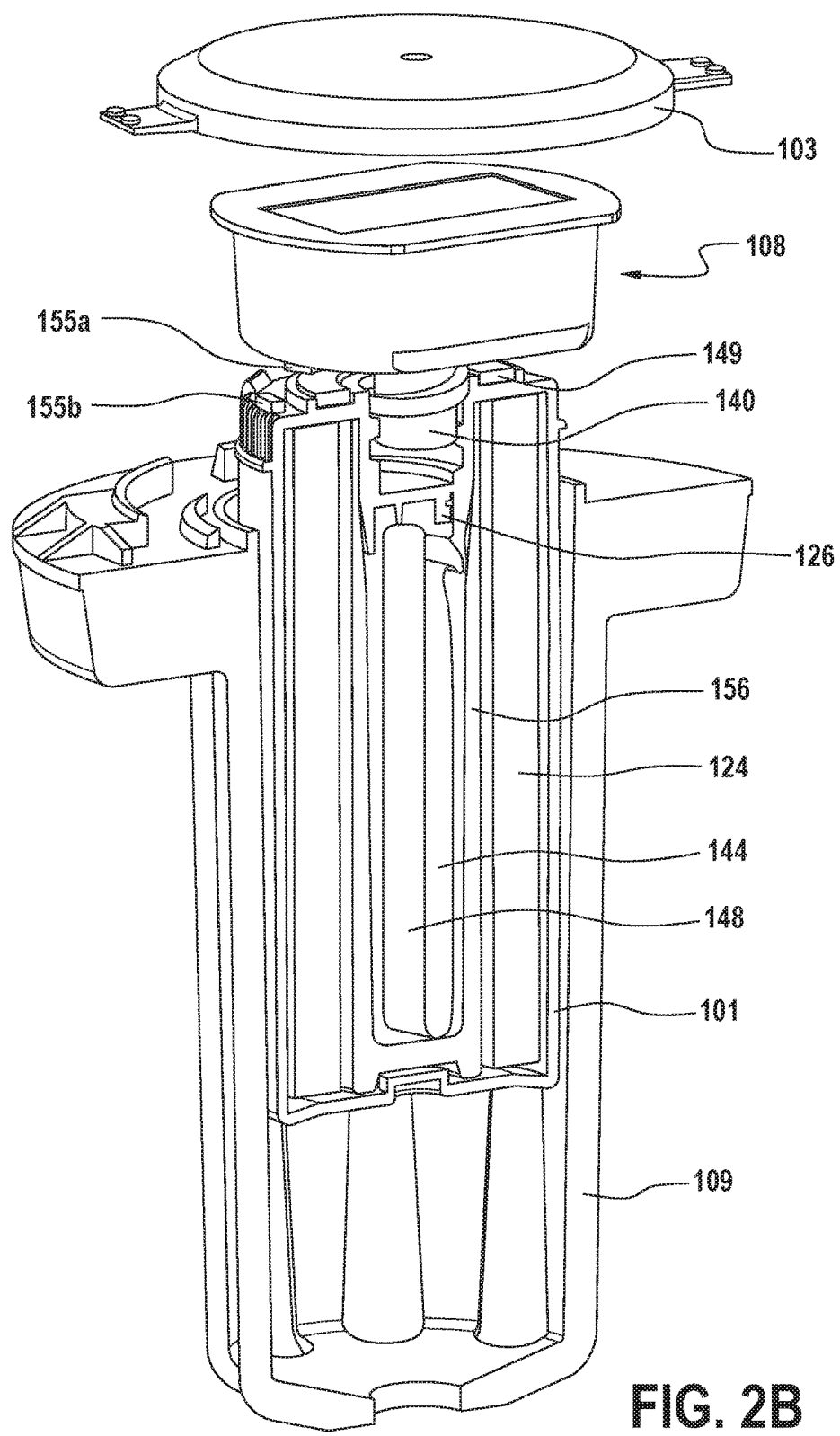
FIG. 2B is a vertical, cross-section of a bait station of the pest monitoring system of the present invention, in partial connection of sensor assembly to station housing.
Figure 20:
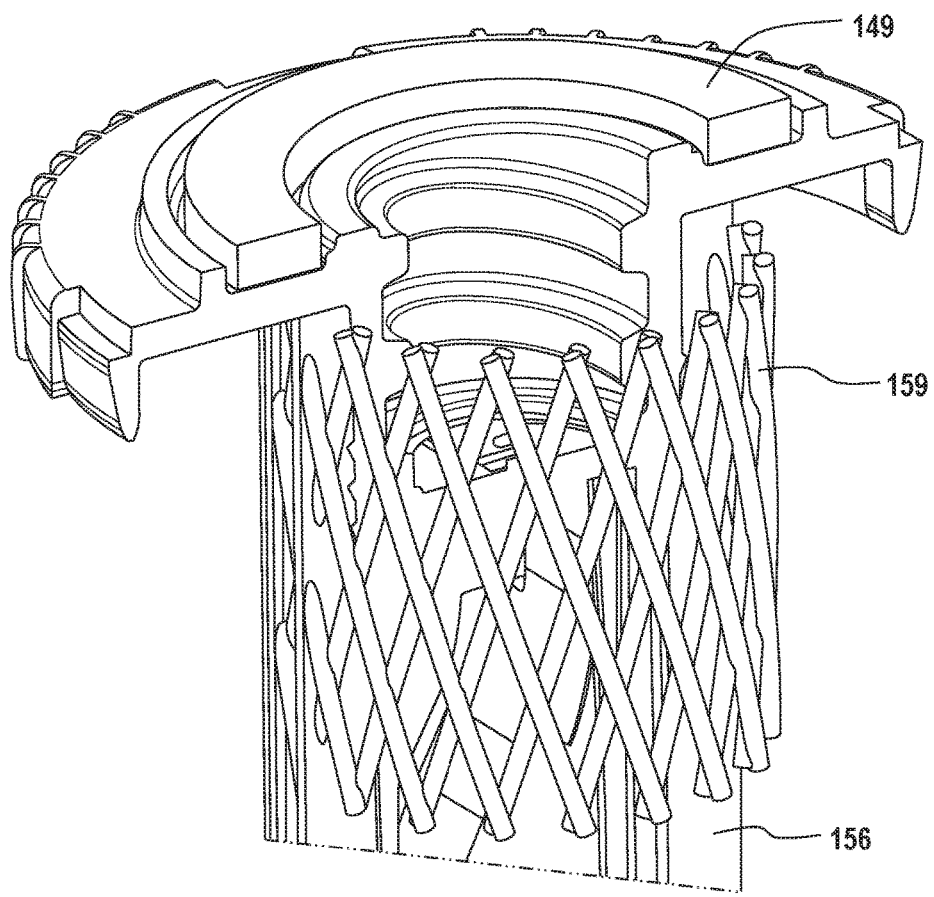
FIG. 20 illustrates a perspective scaled view with partial transparency of one embodiment of the present invention to illustrate detail of a mesh sleeve.

In one embodiment, the sensor assembly 108 includes a waterproof member 156 (e.g., a waterproof, preferably cross-linked, closed cell foam sleeve) surrounding the electrode assembly 126. As used herein, waterproof is generally defined as being water-resistant, moisture-resistant, impermeable, and/or impervious to water. The waterproof member 156 is configured to prevent water or moisture from contacting the electrode assembly 126 (thereby generating a false indication of pest presence) until pests actually penetrate the electrode assembly 126. In this regard, electrode assembly 126 may be configured with a sensitivity profile adjusted to minimize further false positive signaling. The waterproof member 156, in the embodiment seen in FIGS. 2A and 2B, is generally tubular and is sized to fit within the internal cavity 137 of the bait matrix 124 defined by the circumferential inner surface 136. In one embodiment, as shown in cross-sectional detail in FIG. 20, an additional mesh sleeve 159 surrounds the waterproof member 156 to create cylindrical pressure and ensure the internal cavity 137 is waterproof. The mesh sleeve 159 preferably is made of polyethylene and offers even pressure and hoop stress about the waterproof member to maintain a tight fit within the bait matrix 124. While the invention should not be considered limited thereto, the present inventors believe that proximity of bait matrix 124 to waterproof member 156, namely direct contact, may improve the likelihood that termites continue to tunnel from the bait matrix 124 and enter into the waterproof member 156, thereby triggering a signal. Based on termite behavior, tunneling appears to continue unless or until an open space is available. Thus, in one embodiment, the bait matrix 124 is configured in direct contact with the waterproof member 156.

In other suitable embodiments, the waterproof member 156 may be sized and shaped to receive the electrode assembly 126 and may be positioned adjacent to, above, below, nearby, surrounding, or at any other suitable location relative to the bait matrix 124. In the illustrated embodiment, the waterproof member 156 extends generally from the first end surface 130 to the second end surface 132. It is understood, however, that the waterproof member 156 can be any suitable size or shape. In one embodiment, once the electrode assembly is configured within the waterproof member 156, the waterproof member 156 is sealed. Preferably, to ensure a waterproof seal, the waterproof member 156 is sealed using ultrasonic sealing. The waterproof member 156 may have a tubular shape that is not generally cylindrical (e.g., the tubular shape may have a substantially polygonal cross-section), and/or the cavity may not extend from the first end surface 130 to the second end surface 132. In other suitable embodiments, the waterproof member 156 may not be tubular but, rather, may be generally shaped like a sphere, pyramid, cube or other suitable shape. In one embodiment, the bait matrix 124 may be constructed using waterproof material such that a separate waterproof member 156 is not necessary.

The waterproof member 156 can be formed from any suitable, waterproof material. For example, the waterproof member 156 may be formed using expanded or extruded polymers such as, for example, closed-cell extruded polyethylene, expanded polystyrene, expanded polypropylene, etc. In other examples, the waterproof member 156 can be a film or a coating. For example, in one suitable embodiment, the waterproof member 156 can be a waterproof coating applied to the bait matrix 124.

Figure 3:
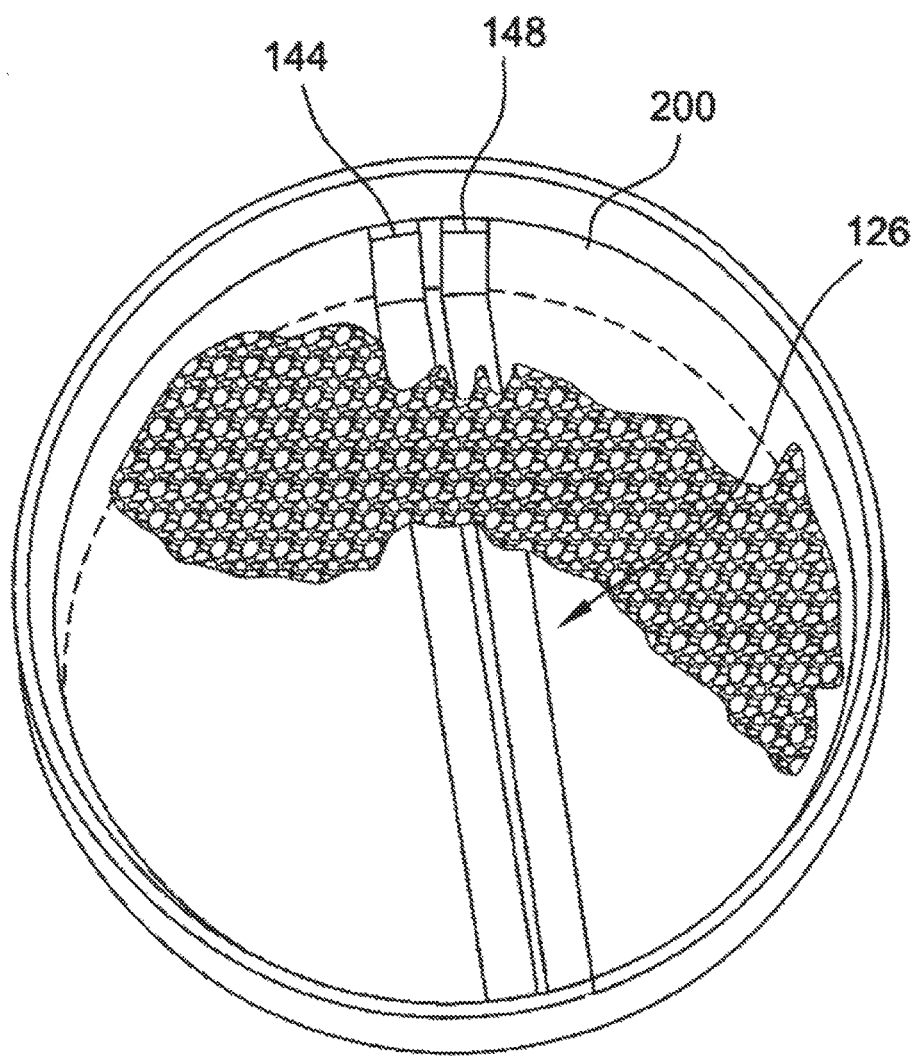
FIG. 3 is top perspective of material applied to the electrode assembly of FIG. 2A.

With reference to FIGS. 2 and 3, the electrode assembly 126 includes a first electrode 144 and a second electrode 148. In one embodiment, the electrodes 144, 148 are elongated strips of a conductive material (e.g., copper). In the illustrated embodiment, the electrodes 144, 148 extend parallel to one another and are spaced apart such that there is no contact therebetween. When installed in the bait station 102, the electrodes 144, 148 extend in a substantially vertical direction relative to the ground in which the bait station 102 is buried. In one suitable embodiment, the electrodes 144, 148 may generally form a "U" shape, where a first portion of the electrodes 144, 148 extends substantially vertically relative to the ground, a second portion of the electrodes 144, 148 extends substantially horizontally relative to the ground along a bottom side of the bait station 102, and a third portion of the electrodes 144, 148 extends substantially vertically relative to the ground at a distance from the first portion. In other embodiments, the electrodes 144, 148 may be made of any suitable material and may have any suitable shape, configuration, and/or orientation that enable the electrode assembly 126 to function as described herein. As shown in FIGS. 19A (vertical cross-section) and 19B (perspective cross-section), in one embodiment the electrodes 144, 148 fit tightly against the wall of the waterproof member 156. In one aspect, in order to allow a pest to make contact with the electrode assembly 126, a preferred embodiment configures the electrode assembly 126 to be closely proximal to the wall of the waterproof member 156. Therefore, regardless of shape, the electrode assembly 126 preferably matches the geometry of the waterproof member 156 and bait matrix 124. In this regard, therefore, the electrode assembly 126 preferably is semi-rigid and capable of placement within a finite location for production of a fully assembled bait station 102.

In some suitable embodiments, the electrode assembly 126 includes an electrode track 157 made of an electrically insulating material (e.g., a rubber or plastic material) as illustrated in FIG. 2A. The electrode track 157 provides a base to which the first and second electrodes 144, 148 can be attached thereby ensuring proper positioning of the electrodes 144, 148 and preventing the electrodes 144, 148 from contacting one another.

As illustrated in FIG. 2A, the first electrode 144 is coupled to a first terminal 160 of a power supply circuit that transmits a signal to provide the electrical stimulus, and the second electrode 148 is coupled to a second terminal 162 to monitor a state of the sensor assembly 108. Because the electrodes 144, 148 do not contact one another, a circuit defined by the first terminal 160, the first electrode 144, the second terminal 162, and the second electrode 148 is an open circuit. When the circuit is an open circuit, taking a measurement of an electrical characteristic, such as impedance, returns a very high value that approaches infinity. Accordingly, when the circuit is open, it may be referred to as being in a "high impedance state". Alternatively, when the bait station 102 and, more specifically, the bait matrix 124 is exploited by termites, a conductive material (e.g., soil, water, termite feces, termite salivary secretions, etc.) is applied across the electrodes 144, 148, and the circuit is completed, or closed. When the circuit is a closed circuit, taking a measurement of the impedance returns a measurable value. Accordingly, when the circuit is closed, it may be referred to as being in a "lower impedance state". The lower impedance state means the circuit has any impedance that is lower than the impedance of the circuit when it is in the high impedance state, which approaches infinity. Thus, termite activity within the bait station 102 creates a measurable impedance across the normally open circuit.

In the illustrated embodiment, the control unit 128 is disposed at least in part within an interior compartment 138 of the sensor holder 110. The control unit 128 is configured to supply the electrode assembly 126 with a known electrical stimulus. In one suitable embodiment, the electrical stimulus is electrical current. The control unit 128 may also be operable to transmit, in a wired or wireless manner, one or more signals indicative of at least one of pest presence and/or one or more electrical characteristics of the electrode assembly 126 (e.g., resistance or reactance) from the bait station 102 to the gateway 104.

The control unit 128 may include any suitable processor-based device (e.g., a microcontroller with associated memory on which executable instructions are stored), or any suitable configuration of a reduced instruction set circuit(s) (RISC), an application-specific integrated circuit(s) (ASICs), and/or a logic circuit(s). Alternatively, the control unit 128 may suitably include any circuit and/or processor that is capable of executing the functions of the control unit 128 as described herein.

Figure 21:
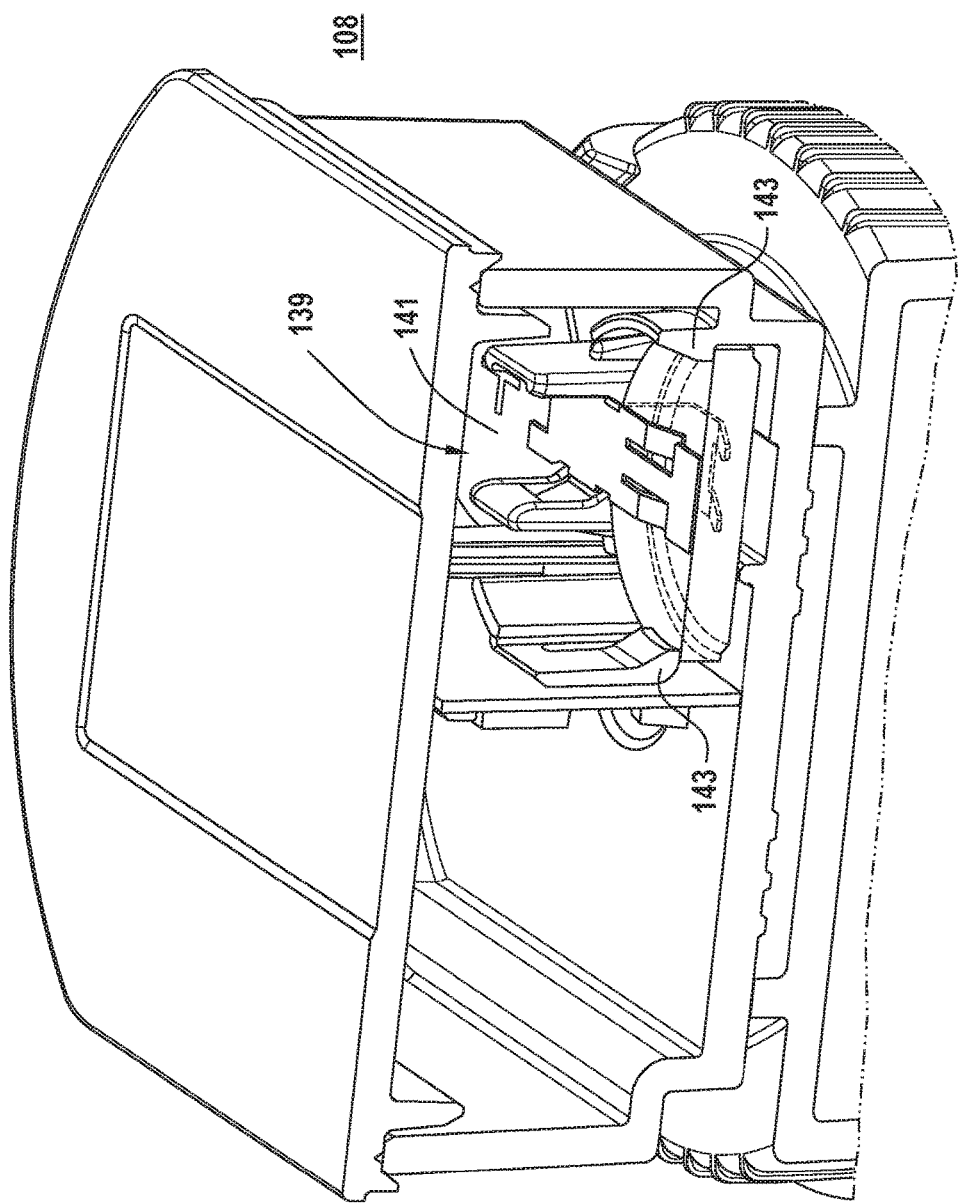
FIG. 21 illustrates a perspective scaled view with partial transparency of one embodiment of a sensor assembly of the present invention to illustrate detail of a power supply.
Figure 22:
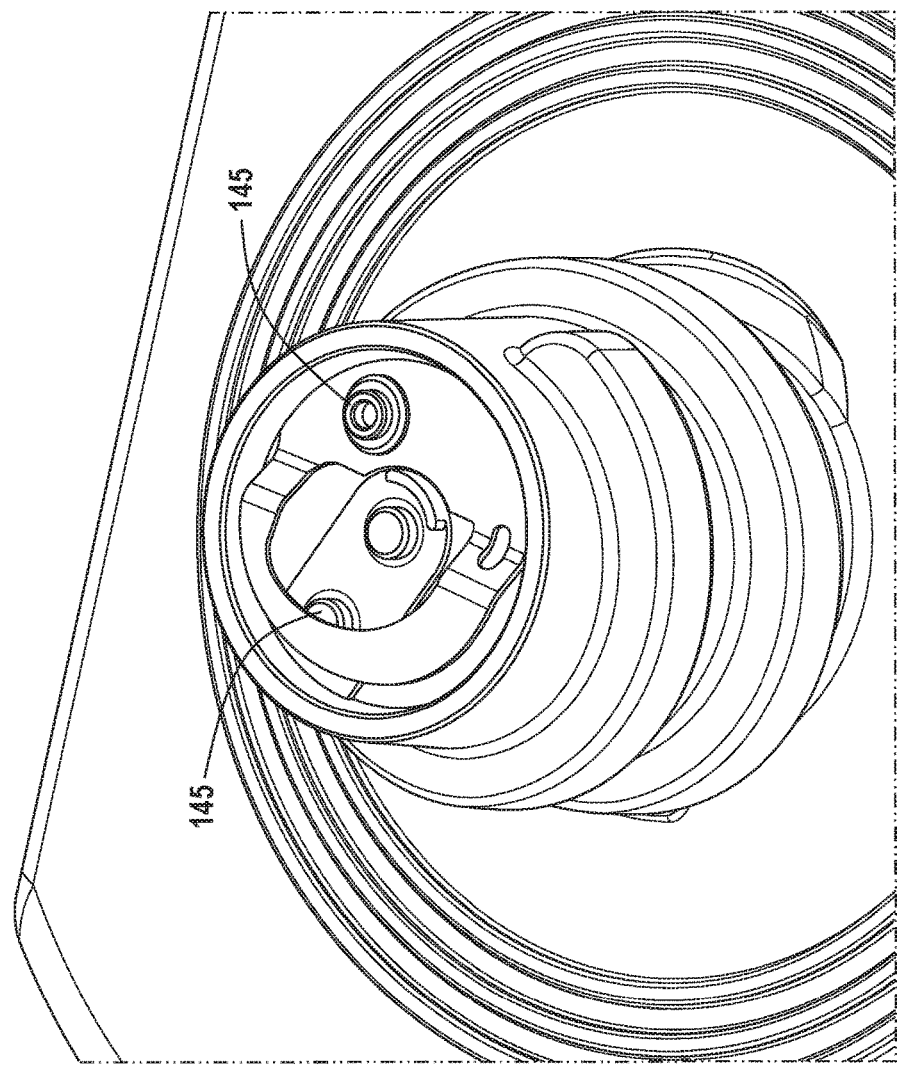
FIG. 22 illustrates a perspective scaled view of one embodiment of a sensor assembly of the present invention.
Figure 23:
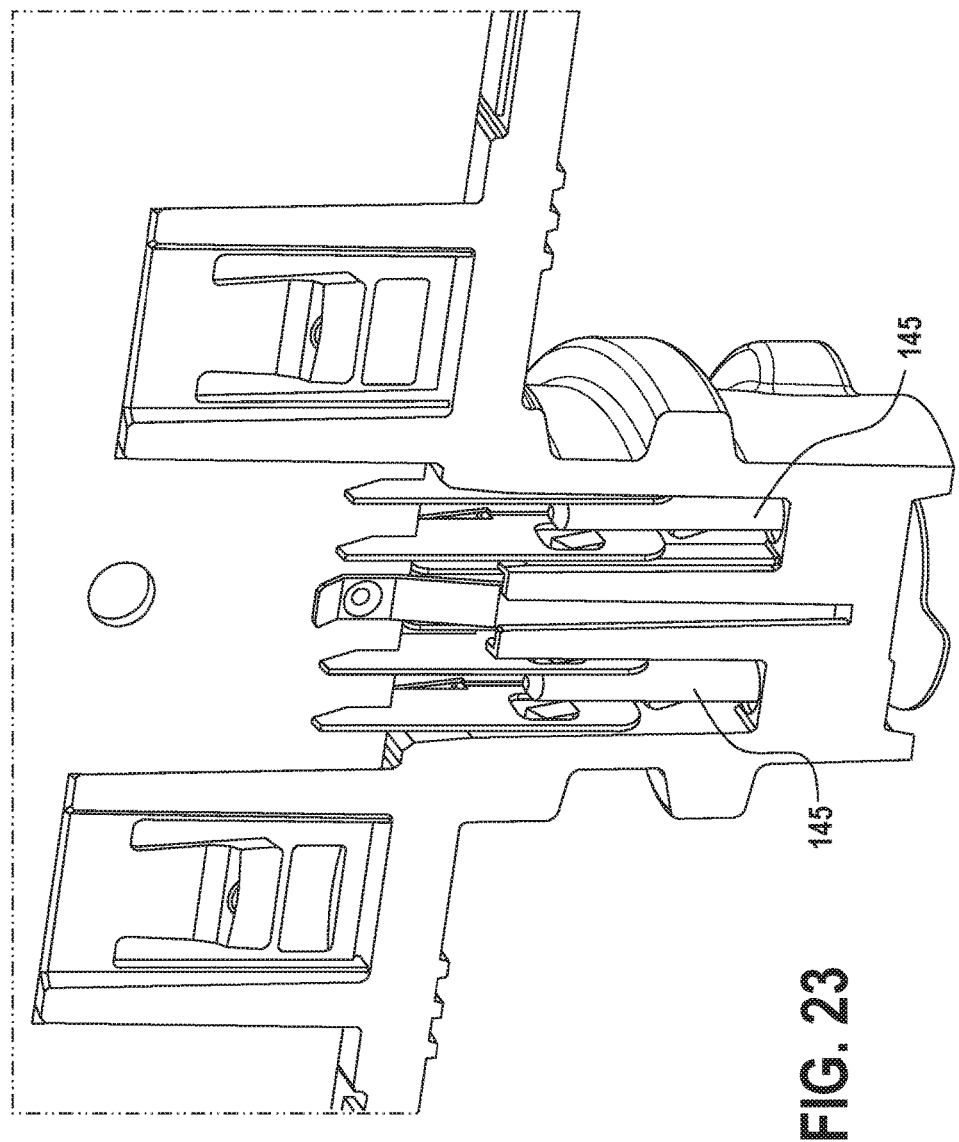
FIG. 23 illustrates a perspective scaled view of one embodiment of a sensor assembly of the present invention.

In one suitable embodiment, the control unit 128 may also include a suitable power supply 139 and functional circuitry (e.g., an electrochemical cell, a battery, electronic circuits, etc.) suitably disposed within the hollow interior compartment 138 of the sensor holder 110 for powering the control unit 128, and/or for supplying the electrode assembly 126 with the electrical stimulus via a suitable electrical interconnect. As shown in FIG. 21, in one embodiment, power supply 139 is a coin cell battery 141, which offers robust retention of the battery in the control unit 128 and a long life for the operation of an assembled bait station 102. Preferably, the power supply 139 is located to minimize RF interference by placing it apart or away from any antennae. In one embodiment, retaining snaps 143 may be used to seat the power supply 139 in place to secure the power supply 139 away from the walls of the sensor holder 110, which houses the control unit. Further, as shown in FIG. 22 and FIG. 23, preferably the connection pins 145 are molded into the bottom wall of sensor holder 110, preferably using swaged retention, which is believed to ensure a robust electrical interconnection.

Alternatively, the power supply 139 may be located remotely from the bait station 102 and may be electrically connected to the control unit 128 and/or the electrode assembly 126 in any suitable manner (e.g., a plurality of aboveground or underground terminals may be accessible on the exterior of the bait station 102 for selectively connecting the remote power supply and/or the gateway 104 to the control unit 128 and/or the electrode assembly 126 via the terminals). Alternatively, in a passive system, the power supply may be provided in a signal sent by the gateway 104 or another suitable device.

To assemble the bait station 102 seen in FIGS. 2A and 2B, the electrode assembly 126, including the electrodes 144, 148 coupled to the electrode track 157, is positioned within the waterproof member 156 such that the electrodes 144, 148 extend in a substantially vertical direction. The waterproof member 156 and the electrode assembly 126 disposed therein are positioned within the bait matrix 124, which is then placed into the station housing 109.

Figure 24:
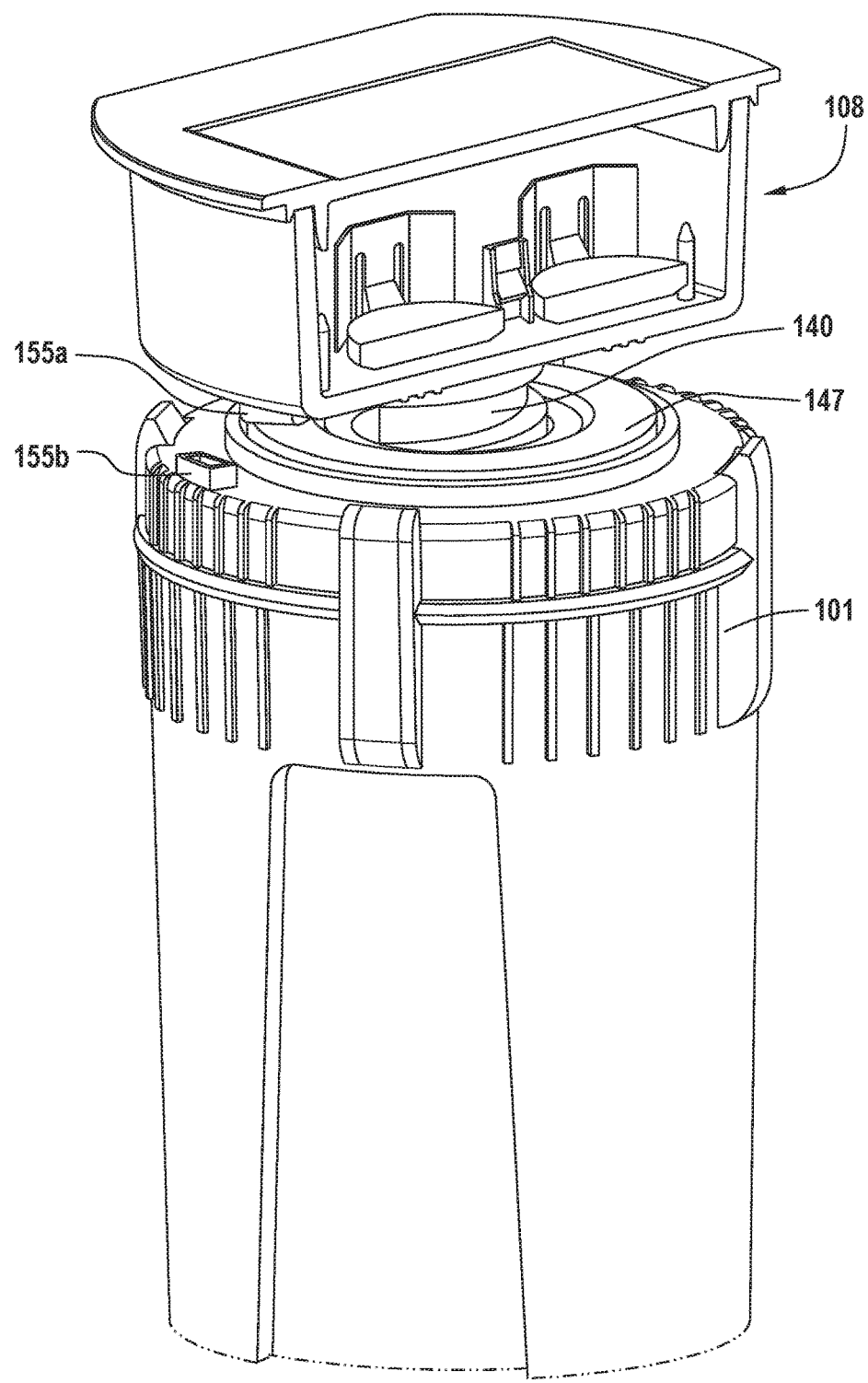
FIG. 24 illustrates a perspective, scaled view with partial cross-section of one embodiment of a bait station showing a sensor assembly partially connected to a cage frame of the present invention.

The control unit 128 and associated power supply 139 are suitably stowed within the interior compartment 138 of the sensor holder 110. The sensor holder 110 is configured to be coupled to the station housing 109 using a connection mechanism 140. The connection mechanism 140 may be a screw-type connection mechanism and the sensor holder 110 is screwed into the station housing 109. Preferably, as shown in FIG. 24, one embodiment of a connection mechanism 140 includes a screw-type connection mechanism wherein a gasket 147 is compressed upon connection of the sensor holder 110 to the cage frame 101, to offer an additional waterproof seal for the electrode assembly 126, which is housed within the cage frame 101. As shown in more detail in FIG. 25, the cage frame 101 may include a channel 149, which contains compressible material 151, such as foam. The sensor holder 110 may include a ribbed ceiling 153, which aligns with channel 149, and upon connecting the sensor holder 110 to the cage frame 101, the ceiling 153 compresses the compressible material 151, which fills the channel 149 and forms a waterproof seal. The connection mechanism 140 includes a switch therein that is closed by the sensor holder 110 being screwed into the station housing 109. When closed, the switch couples the power supply 139 to the control unit 128 to facilitate powering on and operation of the bait station. Accordingly, the bait station 102 remains in a powered off state until the sensor holder 110 is screwed into the station housing 109. As shown in FIG. 26, in one embodiment, the bottom of sensor holder 110 has a molded stop 155a, which aligns with a corresponding stop 155b on the top of the cage frame 101. Upon screwing the sensor holder 110 into the cage frame 101, the stops 155a and 155b prevent over-rotation, which could damage the electrical contact. Further, the stops 155a and 155b offer a confirmation to the installer that the connection is secured, and the station 102 is assembled. Other embodiments may include a visual indicator, an audible indicator, or a spring-loaded contact. As shown in FIG. 24, preferably stops 155a and 155b are located on the outer periphery to minimize physical stress of the molded plastic material and offer a tighter control on tolerance.

The control unit 128 is operatively connected to the electrodes 144, 148 via the first terminal 160 and the second terminal 162, respectively, of the power supply 139 and functional circuitry in a manner that enables the control unit 128 to selectively supply the electrodes 144, 148 with the electrical stimulus. The first electrode 144 and the second electrode 148 extend in a parallel direction relative to one another without any contact therebetween. Thus, because the electrodes 144, 148 are coupled to the first terminal 160 and the second terminal 162, respectively, of the functional circuitry, an open circuit is created by the space between the electrodes 144, 148.

Suitably, the waterproof member 156 surrounds and protects the electrodes 144, 148. More specifically, the waterproof member 156 is adapted to protect the electrodes 144, 148 from moisture. In some embodiments, and as illustrated in FIGS. 2A and 2B, both the bait matrix 124 and the waterproof member 156 surround and protect the electrodes 144, 148.

Once the sensor assembly 108 is assembled, it is able to be deployed without containment in the station housing 109, or may be suitably inserted into a station housing that contains at least a portion of the sensor assembly 108 within the station housing. Without the use of a station housing, the sensor assembly 108 can be suitably buried at least partially underground on a site where termite activity is suspected or has been detected. On the other hand, the illustrated embodiment of the sensor assembly 108 and/or its station housing may be suitably configured for deployment aboveground to facilitate locating, monitoring, deterring, and/or eradicating any suitable type of pest in any suitable manner. For example, the sensor assembly 108 and/or its station housing may be configured for suitable aboveground deployment on top of soil, on a generally horizontal surface relative to the ground, a sloped surface relative to the ground, or a vertical mounting surface relative to the ground (such as an interior or exterior wall of a house or building, a tree, a fence post or picket, a crawl space, and the like), or at other suitable above ground locations. It is understood that in suitable embodiments, the pest monitoring system 100 may include one or more underground bait stations 102, one or more aboveground bait stations 102, and/or a combination of underground and aboveground bait stations 102.

After the bait station 102 has been deployed, the control unit 128 is operable to supply the electrodes 144, 148 with the electrical stimulus. While, or after, the electrical stimulus is applied the electrodes 144, 148, the control unit 128 is operable to measure an electrical characteristic (e.g., resistance or reactance) of the electrode assembly 126 and to transmit signals indicative of pest presence and/or the electrical characteristic to the gateway 104.

In one embodiment, the control unit 128 may be configured for autonomous operation, in the sense that it is configured for automatic (e.g., scheduled, intermittent) supplying of the electrodes 144, 148 with the electrical stimulus and measuring of the electrical characteristic. For example, in a preferred embodiment, the control unit 128 is programmed to generate a status report at predefined time intervals (e.g., once per day, twice per day, once per week, etc.). Information included in the status report may include, but is not limited to including, impedance measured low information, station low-battery condition information, and/or station low-signal strength information. The control unit 128 transmits the status report to the gateway 104 in accordance with the predefined time intervals. Because the control unit 128 measures the electrical characteristic and transmits the status report immediately, storage of data by the control unit is not necessary. In another suitable embodiment, the control unit 128 is configured to only transmit a status report signal to the gateway 104 when the measured electrical characteristic indicates pest presence.

In an alternative embodiment, the control unit 128 may be configured for subservient operation under the direction of a suitable remote control system, in the sense that the control unit 128 may be configured to supply the electrodes 144, 148 with the electrical stimulus and/or to transmit associated signals to the gateway 104 when instructed to do so by the remote control system. As such, some embodiments of the control unit 128 may transmit signals to the gateway 104 in real time (e.g., almost immediately after each occurrence of monitoring the bait matrix 124), or other embodiments of the control unit 128 may record events in its memory for transmitting batch-type signals to the gateway 104 when scheduled or instructed to do so.

Additionally, in some embodiments, a single reading or measurement of the electrical characteristic may be set as a threshold for determining termite presence. The control unit 128 may store or record occurrence of a single measurement of the electrical characteristic and transmit the occurrence when prompted (i.e. by a timing algorithm, an external prompt by the gateway 104, etc.). For example, in one suitable embodiment, the control unit 128 may be pinged once per day to monitor for termite presence. Alternatively, the threshold for determining termite presence may be set to require multiple measurements of the electrical characteristic.

When the illustrated embodiment of the sensor assembly 108 is deployed, termites locate the bait matrix 124 and the sensor assembly 108. As termites penetrate the bait matrix 124 and the waterproof member 156, they remove (e.g., such as by tunneling, foraging, eating, excavating, displacing, or otherwise separating) particles from the bait matrix 124 and the waterproof member 156. Some particles may be returned to the nest and/or gallery system for consumption/deposition. It is to be understood that the bait station 102 may be provided with only the bait matrix 124, only the waterproof member 156, or both the bait matrix 124 and the waterproof member 156.

As particles are removed from the bait matrix 124 and the waterproof member 156 by termites, the electrodes 144, 148 become exposed to moisture intrusion and/or termites that deposit material 200 (shown in FIG. 3) across the electrodes 144, 148. The material 200 may include, for example, water, soil, termite feces, termite salivary secretions, dead termites, etc. The material 200 or the moisture applied across the electrodes 144, 148 closes the open circuit formed by the electrodes 144, 148 and the terminals 160, 162 of the functional circuitry such that there is a measurable electrical characteristic. For example, an open circuit normally has a resistance approaching infinity, and a lower impedance circuit has a measurable value. Because the electrodes 144, 148 lie in relatively close proximity to each other, as termites penetrate the waterproof member 156, the material 200 will seep onto, be placed onto or otherwise accumulate on the electrode track 157 creating an electrical contact between the electrodes 144, 148. As such, termite activity closes the circuit between the electrodes 144, 148, causing the circuit to go into the lower impedance state.

It is to be understood that the electrodes 144, 148 may be positioned in any configuration relative to the ground in which they are buried including, but not limited to, a vertical configuration relative to the ground, a horizontal configuration relative to the ground, a diagonal configuration relative to the ground, combinations thereof, or any suitable configuration as desired. It is to be further understood that the electrodes may be positioned in various distances from each other, where the nearest distance between the electrodes may be: any distance greater than 0, 10 micrometers (µm), 100 µm, 1 millimeter (mm), 10 mm, and more preferably may be: up to 5 centimeters (cm), up to 2 cm, up to 10 mm, up to 5 mm, up to 1 mm, up to 100 µm, or up to 10 µm. However, such ranges may be adjusted for the size and configuration of the desired device.

In the illustrated embodiment, the mere occurrence of a measurable electrical characteristic is sufficient for the control unit 128 to determine a presence of termites and indicate such presence in the signal transmitted to the gateway 104. Because the circuit is normally an open circuit in the high impedance state, the high impedance state provides a known baseline measurable characteristic (the high impedance value approaching infinity). The circuit only enters the lower impedance state when the material 200 creates contact between the electrodes 144, 148, which indicates that termites have penetrated the waterproof member 156. Accordingly, obtaining a measurable electrical characteristic is the indicator of pest (termite) presence, as opposed to a change in the actual value of the measurement, so storing/transmitting the measurements by the control unit 128 is unnecessary for the detection of the presence of pests.

In alternative embodiments, the electrical impedance changes based on the amount of material 200 applied to the electrodes 144, 148. For example, as more material 200 is applied to the electrodes 144, 148, the electrical resistance decreases. The level of measured electrical resistance may be periodically transmitted to the gateway 104 for additional determinations such as, for example, changes in termite activity over time.

In the illustrated embodiment, with each pulse of current supplied to the electrodes 144, 148, the control unit 128 measures the electrical characteristic and determines whether termites are present based on the measured electrical characteristic. For example, in one suitable embodiment, the electrical characteristic is electrical resistance. While the circuit is open, a measurement of the electrical resistance will return a value approaching infinity; however, when the circuit is closed, the electrical resistance will return a measurable value. Alternatively, in another suitable embodiment, the electrical characteristic is electrical reactance. While the circuit is open, a measurement of the electrical reactance will return a value of approximately zero; however, when the circuit is closed, the electrical reactance will become a different measurable value. If termite presence is determined, the control unit 128 transmits a signal to the gateway 104, and the signal is indicative of termite presence.

It is contemplated that the control unit 128 may transmit signals indicative of other suitable properties of the bait matrix 124 as well. Moreover, all such properties of the bait matrix 124 and its environment may be utilized by the control unit 128 and/or the gateway 104 to create predictive models or indicator models through which pest advisories can be provided to the property owner.

In alternative embodiments, and as shown in FIGS. 4 and 5, the control unit 128 may also include one or more switches that are capable of turning on, waking up, resetting or initiating other such functions by the bait stations 102 and/or the gateway 104 when energized by an external device 304. Such switches may include mechanically-activated contacts and interconnects, magnetic switches, RF switches, ultrasonic switches, manual switches, or any other such type of switch that one may choose to add. A passive and/or proximity type switch may be preferred to an active and/or manual type switch given the possible subterranean location of the pest monitoring system 100, such as magnetic reed, inductive and capacitive, seismic, infrared, photographic, thermal, electrical field, chemical, and/or ultrasonic switches, etc.

In yet another embodiment, the pest monitoring system 100 may preferably use a magnetic reed switch 302, as seen in FIG. 5, to wake-up, turn on, and/or reset the one or more bait stations 102 and/or the one or more gateways 104. The magnetic reed switch 302 as shown in FIG. 5 may supply power to the circuit board. Given that the pest monitoring system 100 may be located in a subsurface environment the magnetic reed switch 302 provides various advantages such as, it is a locking switch, it uses less power than other options such as an ultrasonic switch, and it may be internally located allowing for a more secure sealed housing around it.

Prior to the magnetic reed switch 302 being activated by the external device 304, one or more of the bait stations 102 and/or the gateway 104 may be in a sleeping state or turned-off state to preserve energy. Once the magnetic reed switch 302 is used to provide power to the one or more bait stations 102 and/or the one or more gateways 104, the one or more bait stations 102 are now in discovery mode or administration mode and able to search for the one or more gateways 104. It is understood that another type of switch may be used to wake-up, turn on, and/or reset the one or more bait stations 102 and/or the one or more gateways 104.

Figure 6:
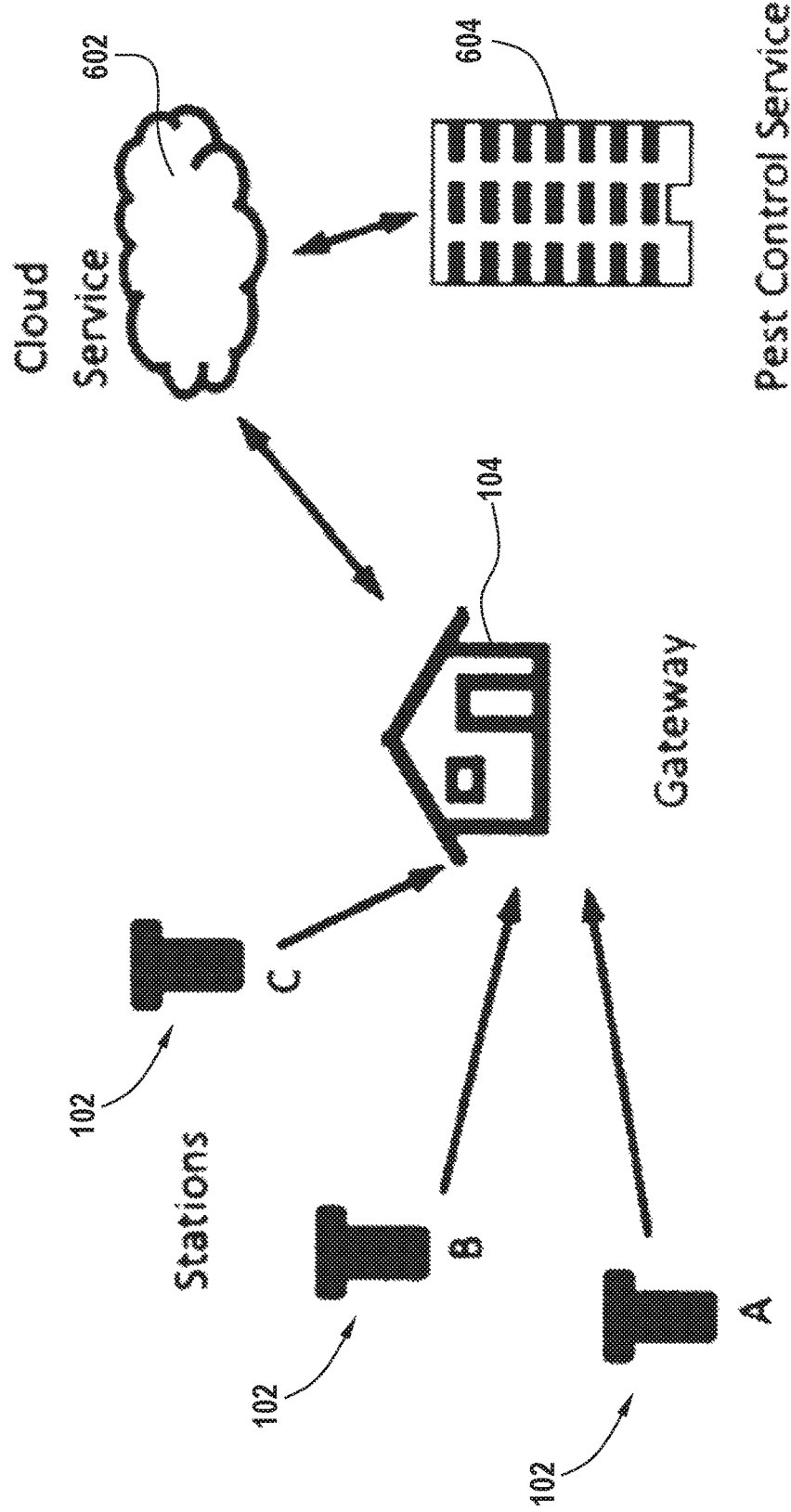
FIG. 6 is an illustration showing one example of a pest monitoring network that provides a communication pathway for the pest monitoring and detection system of FIG. 1.
Figure 7:
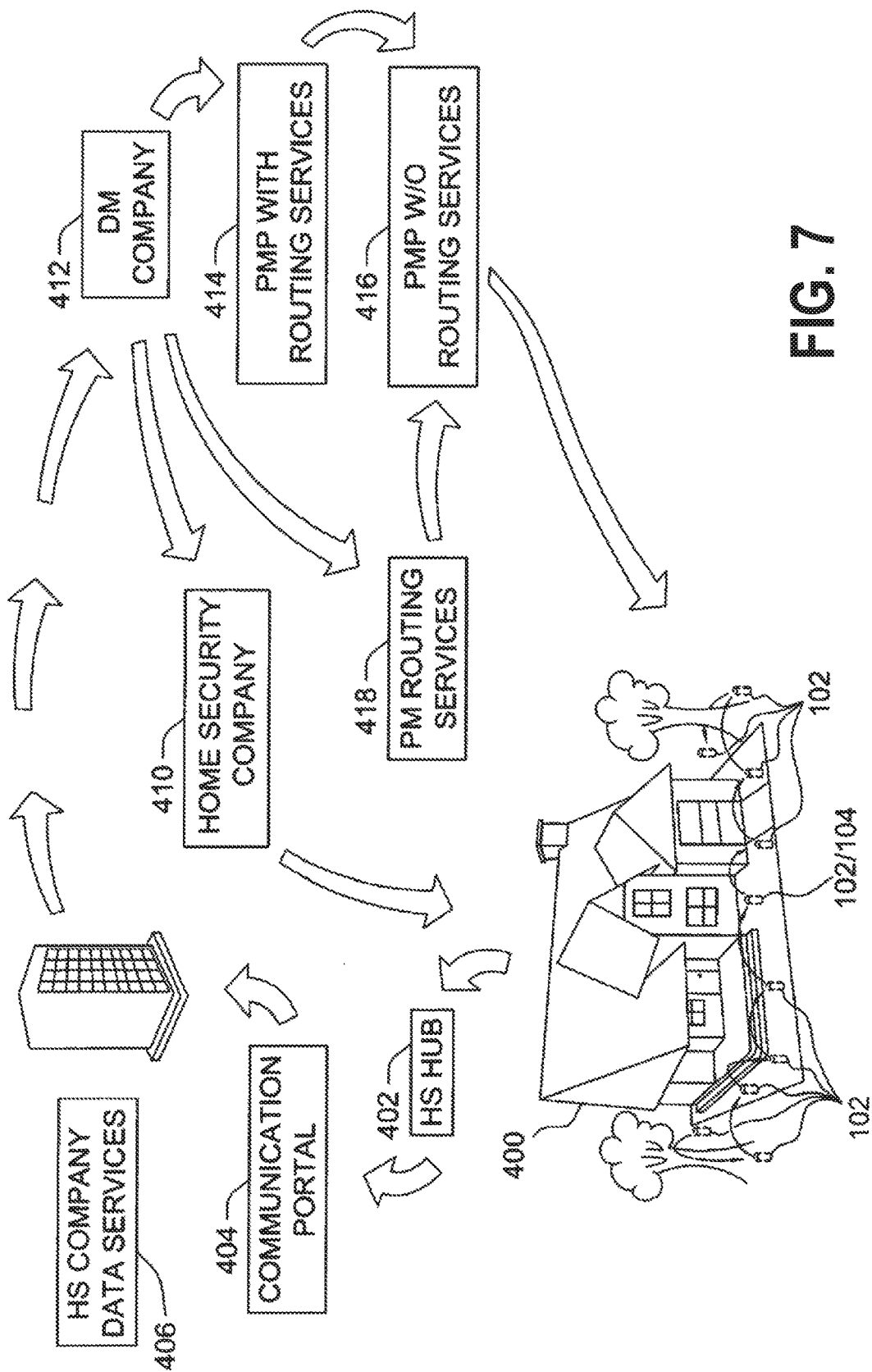
FIG. 7 shows one example of a data communication pathway for the pest monitoring and detection system of FIG. 1 when data is hosted on and flow through a connected network such as, e.g., a Home Security Company's data network to a Data Management Company.
Figure 8:
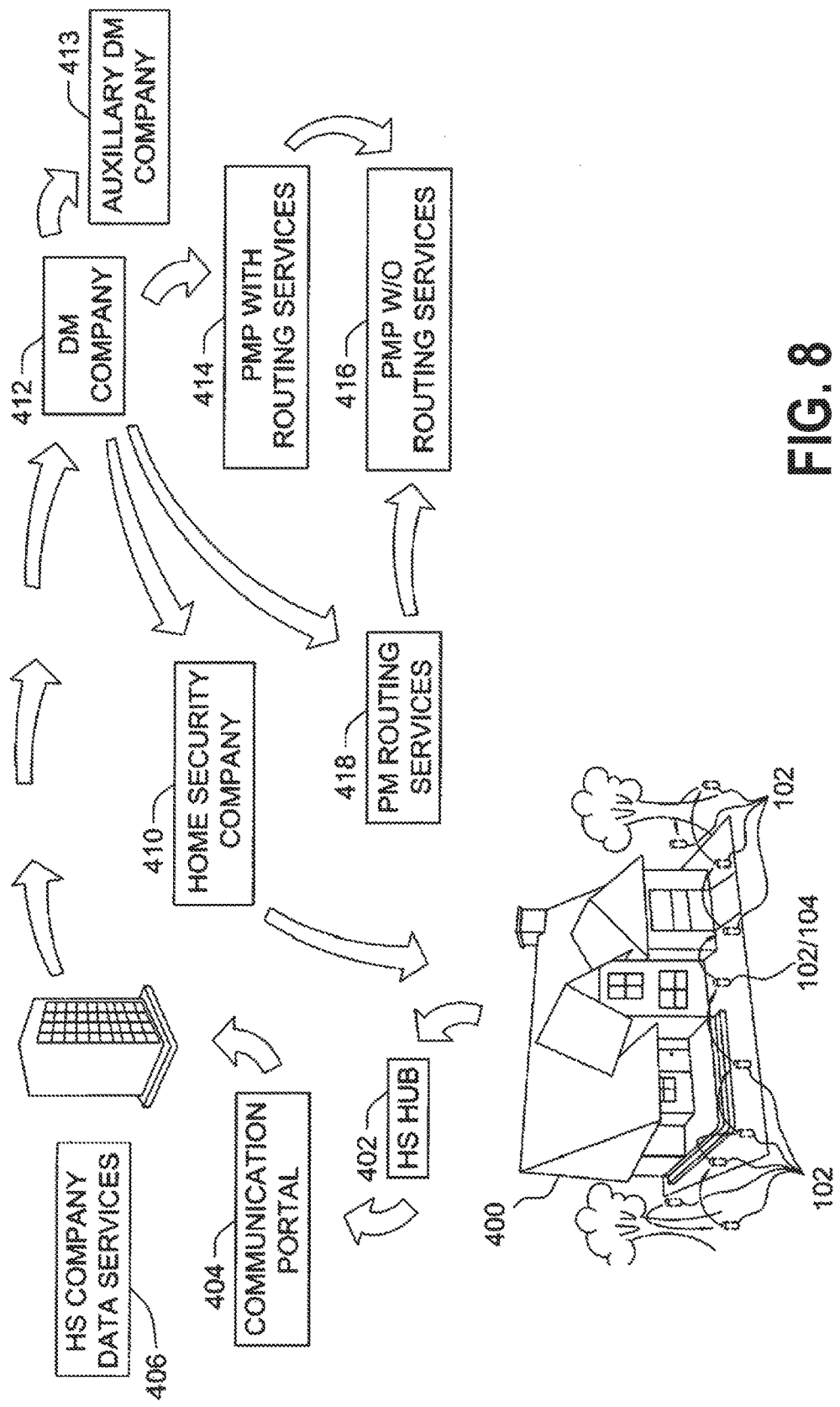
FIG. 8 shows another example of a data communication pathway that differs from the process of FIG. 7 in that an auxiliary data management company also receives pest monitoring/detection data.
Figure 9:
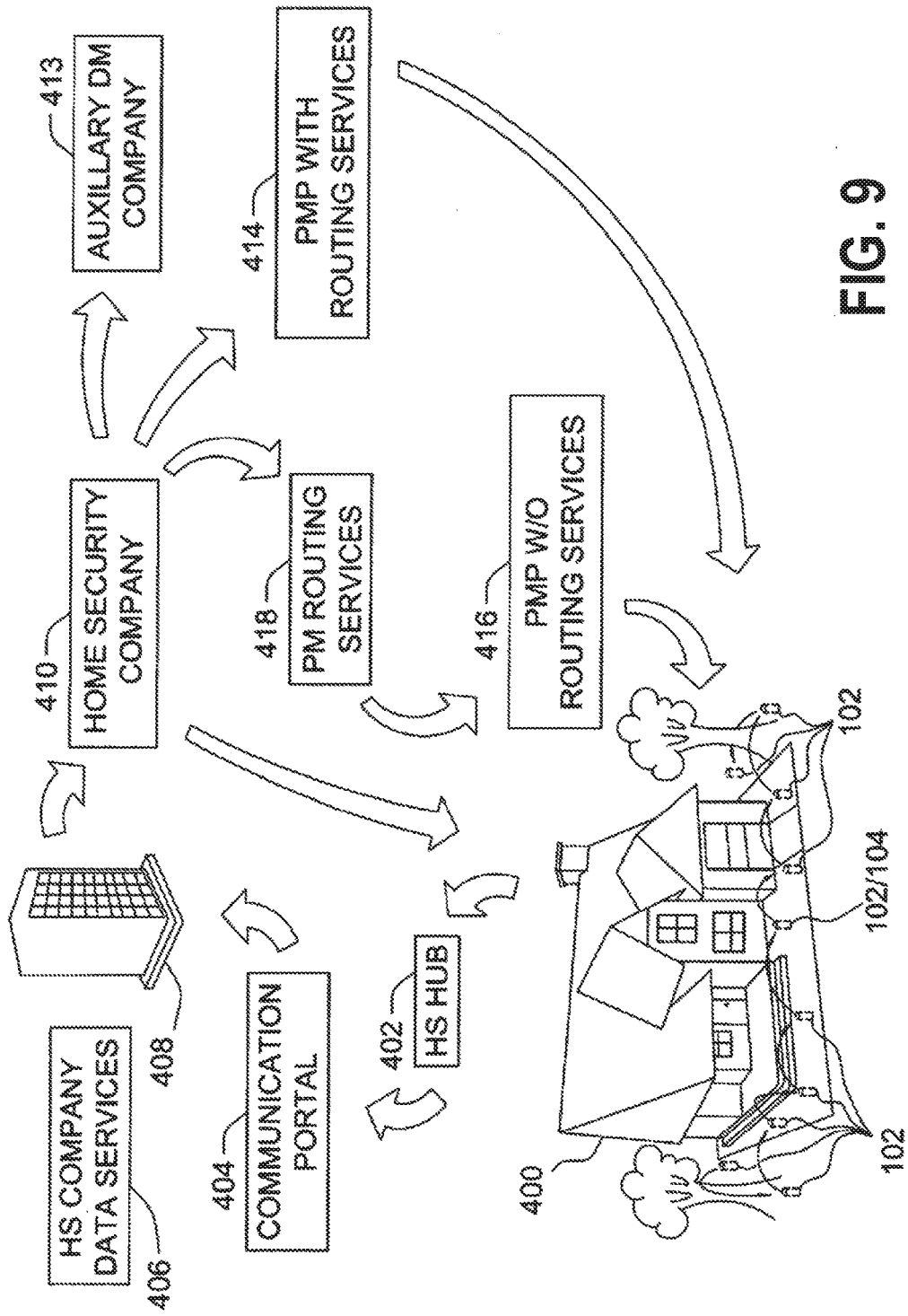
FIG. 9 shows another example of a data communication pathway that differs from the process of FIG. 7 in that the pest monitoring/detection data is managed by the Home Security Company itself, i.e. without using an additional Data Management Company; data may also be forwarded to an auxiliary data management company.
Figure 10:
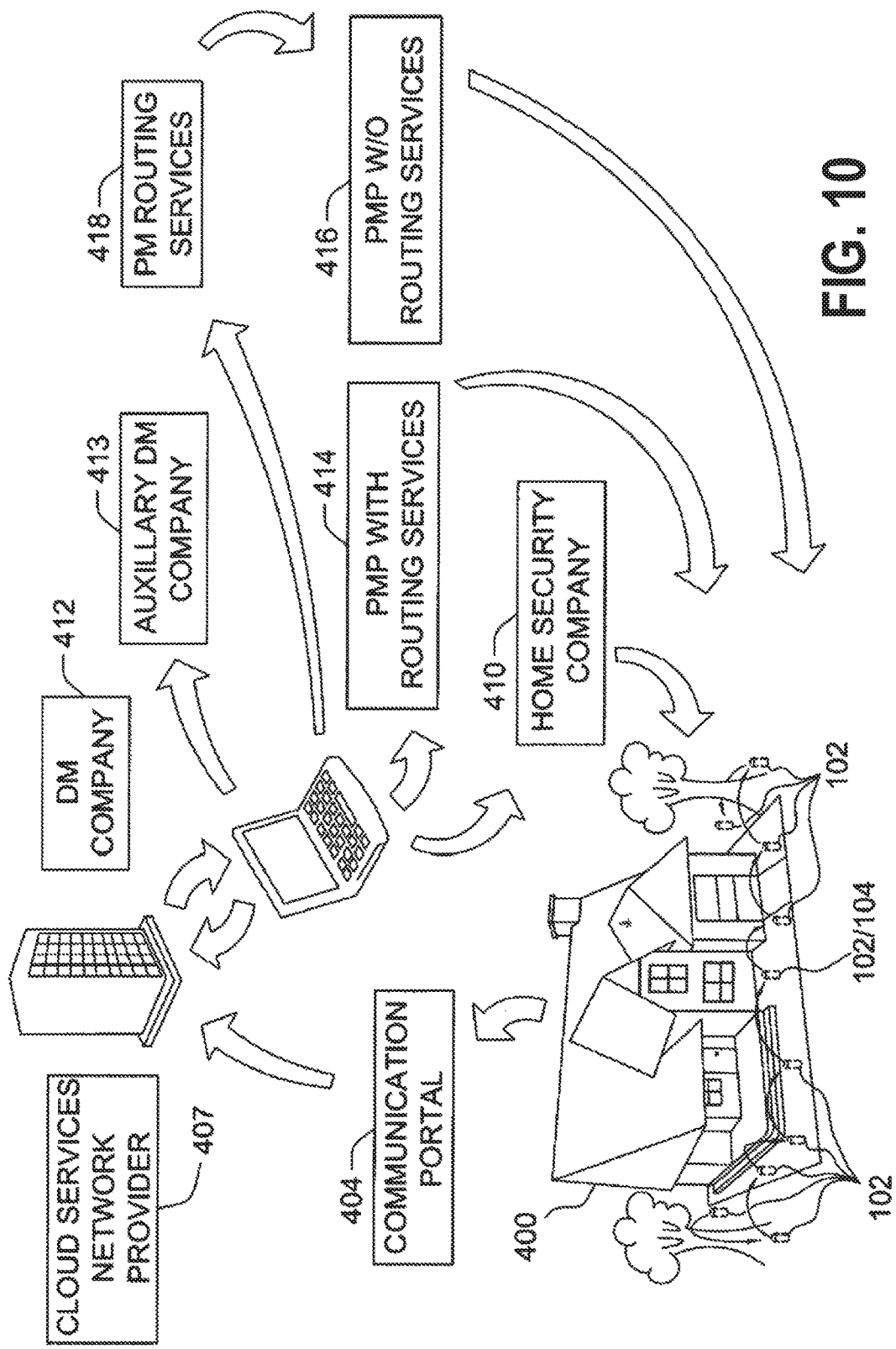
FIG. 10 shows another example of a data communication pathway where station data is received via wireless connection (or wired connection) by a gateway.
Figure 11:
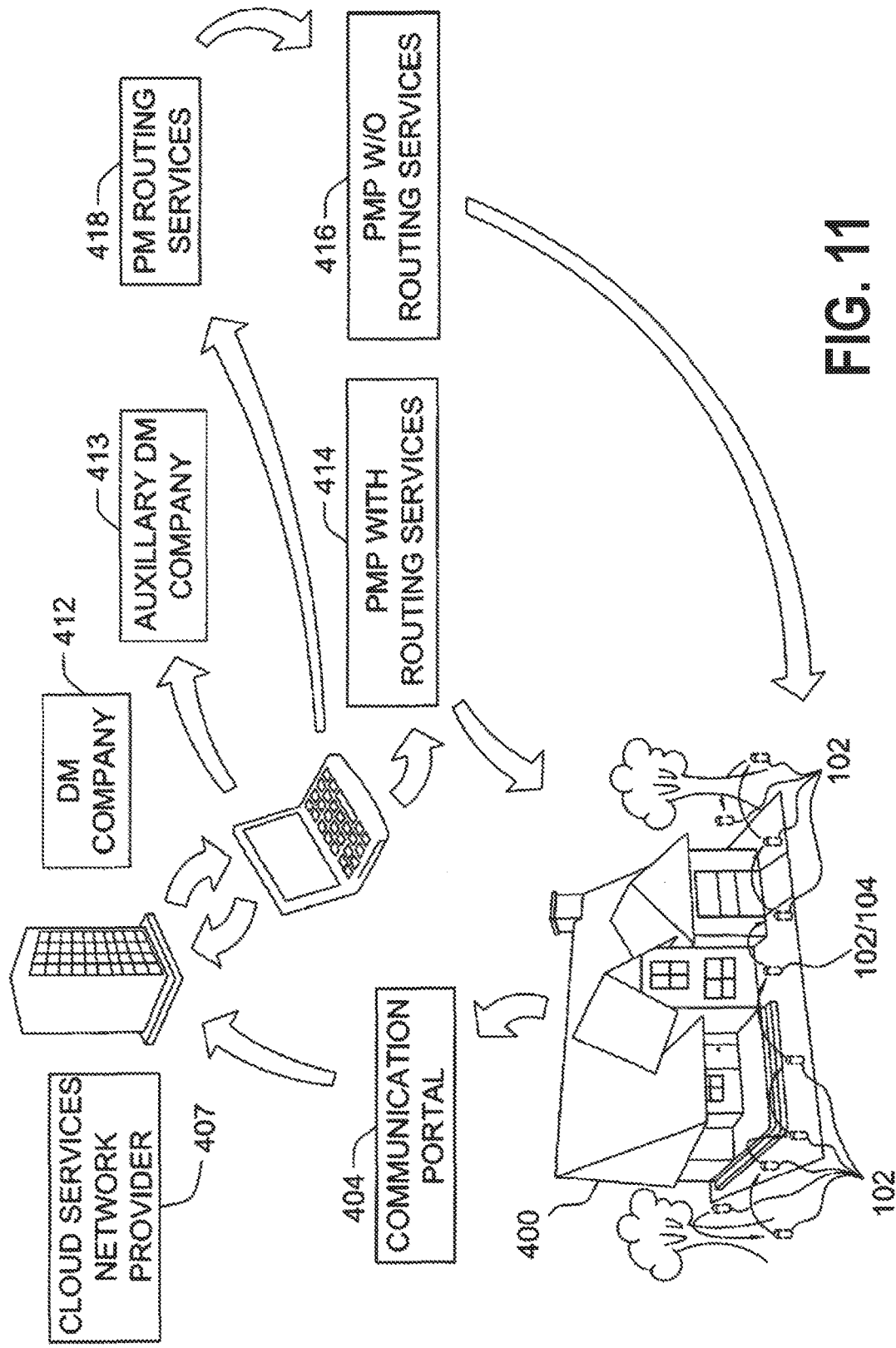
FIG. 11 shows another example of a data communication pathway that differs from the process of FIG. 10 in that no Home Security Company would be involved.
Figure 12:
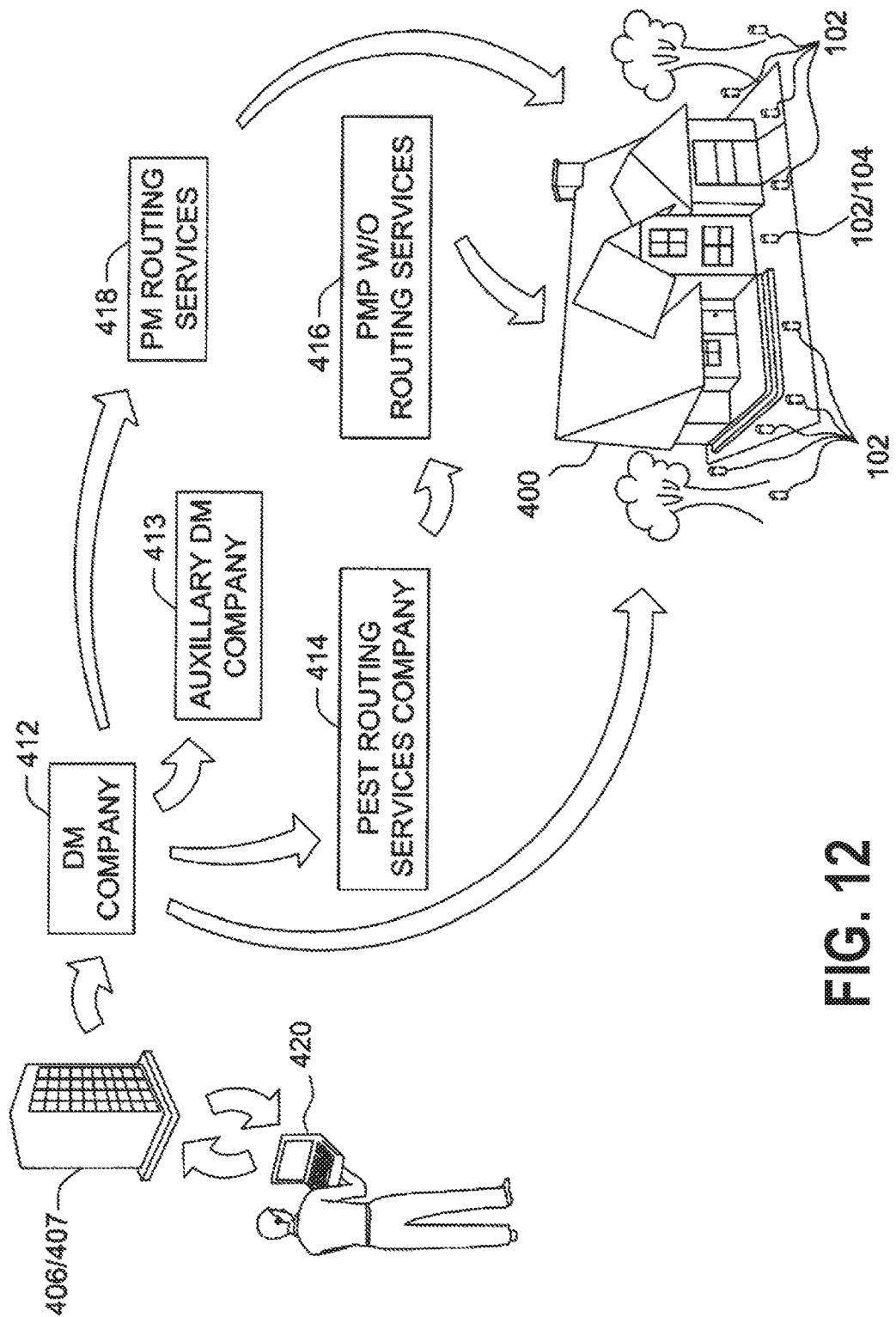
FIG. 12 shows another example of a data communication pathway comprising an on-site inspection using a mobile device as the communication portal to communicate with the gateway.

FIG. 6 is an illustration showing one example of a pest monitoring network 600 that provides a communication pathway for the pest monitoring and detection system 100 of FIG. 1.

The pest monitoring network 600 includes the bait stations 102 communicatively coupled to the gateway 104. The pest monitoring network 600 is set up as a private network having one gateway 104 and multiple bait stations 102 per installation site. The gateway 104 serves as a packet forwarder to a Long Range Radio (LoRa) network server, which sits in a cloud service 602. The gateway 104 is connected to the Internet through the homeowner's Wi-Fi or Ethernet connection, or through a cellular backhaul with a cellular SIM card. A smart-phone application may be used to assist installation setup and provisioning of the communications equipment. The network server sends packets to the middleware/application platform, where they are then decrypted and used for interpreting and routing the collected data, performing analytics, and notifying a project management professional (PMP) of significant events, such as termite detection and equipment maintenance requirements.

When the base station 102 is initially powered up by screwing the sensor holder 110 into the station housing 109 to close the switch and apply the power source 139 to the control unit 128, the control unit 128 enters a "setup mode". While in the setup mode, the bait station 102, via the control unit 128, periodically transmits a registration request to the gateway 104 until it receives confirmation of registration from the gateway 104. After registration is confirmed, the bait station 102 then transitions into a normal operating mode, where it transmits status updates in the form of status transmission packets to the gateway 104 in accordance with predefined time intervals (e.g. once per day). A status transmission packet includes, but is not limited to, a station ID, a report number, a sensor impedance measurement, a battery voltage measurement, and/or a signal strength of a last received acknowledgement from the gateway 104.

The packet structure from the bait station 102 to the gateway 104 is as follows: Preamble>PHDR>PHDR_CRC>PHYPayload>CRC.

The transmission mode chosen between the bait stations 102 and the gateway 104 is LoRa, which is a low-bandwidth modulation scheme using a non-licensed frequency spectrum that has the advantage of transmission distances of longer than 1 kilometer and can pass through many obstacles. LoRa uses low power and utilizes a short receive window after each transmission from the bait station 102, which enables the bait station 102 may be put into low power mode between reporting intervals to save power.

The gateway 104 is configured to collect data from the bait stations 102 and to pass the information to the network server residing in the cloud. In addition to the data received from each bait station 102, the gateway 104 may add additional parametrics such as a time stamp of each station report and/or a measured Signal strength from each bait station 102.

The uplink from the gateway 104 to the cloud is an internet connection that can be configured to connect using any known suitable method. In one embodiment, the internet connection is made using a digital cellular network (e.g. 3G or 4G), similar to that used by a smart phone accessing the internet. In another embodiment, a Wi-Fi connection may be established to a customer Wi-Fi network to pass the data to an internet cloud database. In a further embodiment, the gateway 104 can also be connected directly to the homeowner's router through a wired Ethernet connection.

The Network Server sits in the cloud service 602 and is used to keep track of which bait stations 102 are associated with which gateway 104 and the location of the customer premise. It is also responsible for the following processes: (a) device activation to allow a device to join the network; (b) radio regulation: depending on the region/band used, such as device duty-cycle negotiation (e.g. wait X sec between each frame) or bandwidth negotiation; (c) Radio channels selection; (d) Device classes support (A, C, B); (e) Frame de-duplication—when several gateways receive a device frame; (f) Frame downlink routing—to select best downlink path; (g) Frame integrity—to make sure data is not corrupted; (h) Frame encryption/decryption—to avoid anyone from intercepting your data; (i) Frame counter check— to forbid replay attack; (j) Backward compatibility across LoRaWAN versions; (k) Real time routing of data packets from endpoints to application server; (l) Authenticating security keys between the end node, network server, and application server; and (m) Managing the network efficiency metrics, such as Network Throughput, Network Availability, Packet Loss, Packet Delay, and/or Packet Delay Jitter.

The Network Server sends data to the application server through an IP address, which then is accessed by a monitoring entity to perform the following: (a) Decryption of Packets; (b) Analytics; (c) PMP Related Tasks; (d) SAP Related Tasks; (e) Fulfillment; and/or (f) Marketing Communications.

The Gateway will send uplink messages to the network in the following format: Preamble>PHDR>PHDR_CRC>PHYPayload>CRC.

The Network Server also is responsible for sending necessary downlink messages to the gateway. The packet structure is: Preamble>PHDR>PHDR_CRC>PHYPayload.

At a high level, the Middleware/Application Platform is a collection of micro-cloud services that make up an on-demand, scalable, and secure computing system that sits on top of a public or private cloud. The Platform is capable of discovering, identifying, cataloguing, connecting, and controlling the gateways 104 and the bait stations 102 for IoT projects.

Devices connect to the platform through MQTT, Wi-Fi, IP, cellular, or satellite. The connection may be either direct or aggregated via a gateway/network or mobile device. Once devices are connected to the platform, the data is normalized (if applicable) and the following capabilities are made available via REST API: (a) Data storage/management where the data is available to the service provider to mine for historical data via the API; (b) Scheduling timed events based on specific day/time and timezones; (c) SMS/Email alerts, based on certain thresholds being exceeded or met; (d) If/Then event triggers that prompt a notification to the service provide, such as termite detection, low battery, and/or low signal strength between the gateway 104 and any of the bait stations 102; (e) data visualization; and (f) LoRa tracking. A REST API allows for external Business Intelligence, Artificial Intelligence, and other 3rd party services to consume or interact with the Middleware/Application layer.

To install the system 100, an installer begins by installing the gateway 104 at the customer premise. It is typically installed indoors, with access to utility power, and access to the planned method of internet access. After providing the gateway 104 with power and connecting the gateway 104 through Wi-Fi, ethernet, or cellular, the gateway 104 enters a verification mode shown through LED status lights. When the gateway 104 connectivity status is complete (i.e. green solid LED light), the installer reads the gateway ID from a barcode label, using the smartphone application, and the gateway 104 is registered via authentication through the following steps: (a) Gateway Uplink to Network Server (with downlink acknowledgment); (b) Network Server Packet Authentication; (c) Network Server and Application Server Authentication; (d) Network Server to Gateway Downlink; and (e) Application to smartphone application authentication.

If the cellular network is used as the uplink, the SIM card data of the gateway 104 is entered to enable the gateway communications. If the customer Wi-Fi network is used, it may be necessary to establish a local Wi-Fi connection between the installer's smart-phone and the gateway to enter the customer's network SSID and password.

The installer chooses bait station 102 placement according to guidelines, and installs each bait station 102 in the ATBS enclosure. The installer uses the installation smart-phone application to read each station's barcode ID to register each bait station 102.

When the installer screws the electronic module onto the bait assembly, as described above, the bait station 102 powers up and enters Setup Mode, in which it periodically (e.g. every 30 seconds) broadcasts a registration request. The gateway 104 then receives the request, and sends it to the network-application server for authentication. The application server communicates with the smartphone application to verify installation of that bait station 102 is complete. The smart-phone application then let the installer know to move to the next station.

After the installer has installed the last bait station 102, they select an option to complete installation on the smart-phone application. The system performs a test verification by turning on and sending all real-time station data to the gateway 104 communicating with the network and application server and verifying. The smart-phone application acknowledges that the installation is complete and notifies the installer of the installation location. The system then enters normal operation mode, transmitting data at the predefined time periods, as previously described.

The gateway 104 may communicate (a) internally and/or (b) externally. The gateway's 104 internal communication may take place using the network. The gateway's 104 external communication may be sent to a home security (HS) Hub 402 and on to a communication portal 404 as shown in FIGS. 7-12. It is understood that the gateway 104 and the HS Hub 402 may use a WiFi connection, an Internet connection, an Ethernet connection, a cellular connection, and/or any other suitable form of communication means to transmit data externally from the gateway 104 and/or HS Hub 402 and/or the communication portal 404. The HS Hub 402 and/or the communication portal 404 may be provided by a customer using the pest monitoring system 100 and/or by any other external source. The HS Hub 402 and/or the communication portal 404 allow for the periodic logging of sensor/network data to the external host cloud. An Application Program Interface (API) may be used to transmit the data from the gateway 104 to the cloud. An API may be used to transmit the data from the bait station 102 to the gateway 104. An API may be used to transmit the data from the cloud to a web interface. An API may be written using a variety of different formats such as JSON, XML, or other such text-based formats or binary serialization such as MessagePack, protobuf, bson, avro or any other such binary format.

It is understood that in some suitable embodiments, the gateway 104 may be integrated into a connected system or network (as shown in FIGS. 7-12), including but not limited to, a smart home system and/or home security panel/system. In such embodiments, the HS Hub 402 and/or the communication portal 404 serve as the gateway 104 such that the bait stations 102 may communicate directly with the HS Hub 402 and/or the communication portal 404. Such communication preferably uses a WiFi connection; however, an Internet connection, an Ethernet connection, a cellular connection, and/or any other suitable form of communication means to transmit data may be used. Additionally, where the bait station 102 is at least partially underground, a low-power wide area network (LPWAN or LoRaWAN) connection may be used to communicate between the bait station 102 and the HS hub 402 and/or communication portal 404.

In the example embodiment, gateway 104 is communicatively coupled with a plurality of bait stations 102 and the HS Hub 402 and/or the communication portal 404. Gateway 104 acts as a gateway between the plurality of bait stations 102 and the HS Hub 402 and/or the communication portal 404. In the example embodiment, gateway 104 provides secure communication links between bait stations 102 and the HS Hub 402 and/or the communication portal 404, while also filtering the communications to prevent cybersecurity threats. In the example embodiment, gateway 104 establishes secure communication channels with each of bait stations 102. The secure communication channels are two-way communication channels. In some embodiments, the secure communication channels transmit and receive encrypted data. In some further embodiments, the secure communication channels require authentication information to be included in communications. Secure communication channels may be secured in other methods to allow the systems and methods described herein to function.

The gateway 104 may have two different modes when operating: (a) an administration mode (may also be referred to as maintenance mode or discovery mode) that allows the gateway 104 to detect and add bait stations 102 to the network; or (b) a reporting mode. When gateway 104 is set to the administration mode, gateway 104 is searching for bait stations 102 to add to its network and sends out pings to the bait stations 102 it finds. It may be desired to have the gateway 104 auto-default to the administration mode when it is first activated. Once a bait station 102 is attached to a gateway 104 network, the bait station 102 will not look to join any other network unless it is told otherwise and/or reset. It is to be understood that both the gateway 104 and the bait stations 102 may need to be set to the administration mode for the network to be created. A mobile device application may also be used to set the gateway 104 into administration mode. When setting up the pest monitoring system 100, the installer may turn on the gateway 104 first, ensure that it is in administration mode, and then activate the individual bait stations 102 to form the pest monitoring system network. It is preferred that the pest monitoring system 100 communicate using a star network as described herein, where each bait station 102 communicates directly with the gateway 104.

The gateway 104 also may have two different communication modes: (a) internal communication over the pest monitoring system network to send or receive information with the bait stations 102; or (b) external communication to send or receive information with a remote device and/or the cloud. To receive data from the bait stations 102, each bait station 102 may be configured to automatically transmit a signal to the gateway 104 upon determining presence of pest activity and/or the gateway 104 may ping the individual bait stations 102 on its network at predetermined intervals.

The gateway 104 may have knowledge of which bait stations 102 belong in its network, while the bait stations 102 themselves do not recognize who specifically they are talking to. The gateway 104 is configured to store the data sent to it from the bait stations 102, at least until the data is sent to an external location and/or device by the gateway 104. The gateway 104 will preferably send the data to the cloud or external source, upon receipt of instructions to do so and/or upon time intervals programmed into the firmware of the bait stations 102 and/or the gateways 104. It is understood that the gateway 104 may send data to the cloud and/or external source at programmed time intervals and/or upon request from a mobile application used on a remote device as described in more detail below.

It is understood that the gateway 104 may function as both a bait station 102 and/or as a gateway 104 and may have the ability to communicate both internally with the other bait stations 102 and/or gateways 104 as well as externally.

As shown in FIG. 5, the gateway 104 may have the magnetic reed switch 302 and/or an ultrasonic switch 301. An ultra-sonic sensor may power the ultrasonic switch 301 on the gateway 104 and may be used for the rest/wake-up cycle of the gateway 104. The ultrasonic switch 301 may allow for the remote wake-up of the gateway 104 using a remote device. This would enable instantaneous downloading of the data stored on the gateway 104 at that time, rather than waiting for the gateway 104 to send data out per its scheduled download. It is understood that the data stored on the gateway 104 may be the last reported data from the bait stations 102 to the gateway 104.

It is understood that a mobile client such as a phone or hand-held device may perform the following operations: (a) obtain a list of all bait stations 102 connected to the gateway 104; (b) reset the bait stations and/or gateway 104; (c) link the gateway 104 to the customer's home network (such as WiFi network or cellular network or the like); (d) configure host cloud reporting; (e) check the customer's home network; (f) delete a bait station 102 from the network; (g) place a bait station 102 and or gateway 104 into discover mode; and/or (h) erase the entire network.

It is understood that, in some embodiments, the ultrasonic switch 301 may be preferred to other types of switches, for example, infrared switches, due to their ability to work better in subsurface environments. The ultrasonic switch 301 relies on a combination of an ultrasonic transmitter and ultrasonic receiver. The transmitter emits an ultrasonic signal that is transmitted wirelessly to the ultrasonic receiver which then converts the ultrasonic signal into an electronic signal that may be used for various functions. In the pest monitoring system 100 that is the subject of the current disclosure, the ultrasonic switch 301 or device resides within the sensor holder 110 that is part of the pest monitoring system 100. The gateway 104 and/or bait station 102 present in the pest monitoring system 100 may be placed within a plastic sensor housing (not shown) placed within, on, or above the ground. The pest monitoring system 100 components may also be placed within, on, or above the ground without the use of a plastic sensor housing as well. The signal emitted by the ultrasonic transmitter must pass through the covering of the sensor as well as any sensor housing material. Additionally, the ultrasonic signal may have to pass through soil, mulch or other materials (i.e. organic or inorganic) such as walls, concrete, and/or man-made barriers. It is preferred to use ultrasonic signals versus infrared due to their increased ability to transmit through the subsurface environment as well as the plastic material surrounding the device. The use of the ultrasonic switch 301 has been tested in the field and has proven to be effective in enabling the activation of the required operational function within the pest monitoring system 100. It is understood that the ultrasonic transmitter may be a hand held device of any type that is capable of emitting an ultrasonic signal.

In one embodiment, exemplified in FIGS. 7-12, the pest monitoring system 100 may be integrated directly into a connected system or HS Hub 402. It is understood that for purposes of this application connected system means any automated or wireless interconnected and/or connected system within an industrial, residential and/or commercial structure. A connected system may have a central point of communication or device to gather the communication from all of the devices, such as a HS Hub 402. In addition, it is understood that a connected system allows various devices within an industrial, residential or commercial structure to communicate with one another or to communicate to a central location. Such devices may include but are not limited to fire/smoke detectors, intrusion detectors, medical alert devices, energy management devices, water/leak detection devices, irrigation systems, smart appliances, lighting features, door locks, window sensors, video/audio devices etc. In addition, it is understood that a connected system may communicate externally through the HS Hub 402 and/or a communication portal 404 from the structure 400 to a distributed network system or communication portal 404 or another external source, such as the cloud or single server systems or anything similar, etc. The pest monitoring system 100 may be compatible with a residential and/or commercial connected system, and/or a distributed network system. The pest monitoring system 100 may be directly installed and integrated by service providers into an existing and/or as part of a connected system by individuals, including but not limited to, home security providers, builders, pest management professionals, other technology service providers and/or structure owners.

As described previously, the pest monitoring system 100 is designed to detect pest activity within, on, or around the consumable and/or displaceable bait matrix 124. One or more bait stations 102 and at least one gateway 104 may be installed, in proximity to industrial, commercial, and/or residential structures 400, as well as levees, docks, railroads, and other such wood-based structures, spaced at distances determined to be effective in detecting pest activity. Such spacing between the various bait stations 102 and/or gateway 104 may be between 5-30 feet, 5-15 feet, and 1-100 feet.

Removal of a portion of the bait matrix 124 by a pest may trigger a signal that may be communicated from the individual bait station 102 to the gateway 104 or to a distributed network system for, but not limited to, data management, storage, analysis and/or communication to authorized parties, including but not limited to, the technology provider, installation company, and structure owner. The signal may be transmitted from the gateway 104 through the HS Hub 402 of the connected system to a communication portal 404 and onward as shown in FIGS. 7-12. The signal indicating pest activity may be further routed by the service provider for the connected system (406, 412) to appropriate recipients (410, 413, 414, 416, 418, etc.) including but not limited to the technology owner, an authorized service provider and/or the structure/property owner 400. An authorized service provider (414, 416) may be notified and requested to respond to the potential pest threat.

Utilization of, but not limited to, existing technology, infrastructure, and expertise common to the security and monitoring industries eliminates complexity of the monitoring process, communicates threat, and facilitates response to the threat. Integration of the pest monitoring system 100 into, including but not limited to, a connected system may provide a similar level of structural protection and peace-of-mind originally offered by the security and monitoring industries, including but not limited to life safety (fire, intrusion, medical) and/or lifestyle (temperature, lights, doors, etc.) management without the need for conventional visual inspection for pest activity. Incorporating pest monitoring with additional home security/monitoring systems provides a broader range of comfort and security to the property owner. It is understood when pests are detected by the pest monitoring system 100, the alert may go directly to the security company and they may transmit the alert to one or more of the following: a pest monitoring provider; the contact, manager, or owner of the structure being monitored; and/or the company providing the pest monitoring system 100.

In some embodiments, upon receiving a signal from a bait station 102 indicating termite presence, the HS Hub 402 generates an alert to notify the owner/contact of the building/structure. The alert may include, but is not limited to including, displaying a pest alert on a smart television connected to the HS hub 402, flickering lights in the building/structure in a predetermined sequence, and/or ringing a doorbell of the building/structure in a predetermined sequence.

It is understood that communication of the data gathered by the gateway 104 may occur through a variety of means and may include communication to one or more of the following: (a) HS Hub 402 which receives the data from the bait stations 102 (or the gateway 104); (b) communication portal 404 which may enable the data transmission from the source (with or without the presence of the HS Hub 402) to the cloud and may comprise a WiFi router, a cell phone or other such devices; (c) HS Company Data Service 406, which may host the cloud data which may have been transmitted from the communication portal; (d) Home Security Company or other such service provider 410, e) DM Company or Data Management Company 412/413; (f) Pest Management Professional "PMP" with or without routing services 414/416 who may take care of any pest detected; (g) PM routing service 418 which notifies the PMP; (h) Home or property owner 400; and/or (i) cloud service network provider 407. FIGS. 7-12 provide examples of various communication pathways. It is understood that the pathways may be adjusted and that the general goal of the pest monitoring system 100 is to provide data regarding the presence of pests from the location of the system 100 and ultimately to the property owner and/or pest management professional or other such service provider. It is understood that various intermediate communication pathways may be used to achieve this purpose.

Another embodiment of this disclosure is a method to determine, after having deployed traditional or conventional bait at the site, whether the termites (or other insects/arthropods) that are consuming the bait are the same termites (or other insects/arthropods) that are infesting the structure on the site. It would be useful, therefore, to provide bait which facilitates making such a determination.

In one embodiment, a bait generally comprises a polysaccharide carrier material and a marker material mixed with the carrier material. The marker material is consumable by an insect (or another arthropod) and contains a substance which facilitates determining, upon viewing the insect (or another arthropod) that the insect (or another arthropod) is actively feeding on the bait.

In another embodiment, a method of monitoring insects generally comprises deploying bait at a first location on a site, wherein the bait contains a marker material which facilitates determining that insects/arthropods are actively feeding on the bait. The method also comprises monitoring insect/arthropod activity at the bait, detecting a level of insect/arthropod activity at the bait as a result of the monitoring, and visually inspecting a second location on the site for insect/arthropod activity as a result of the detection. The method further comprises determining, by viewing an insect/arthropod at the second location, that the insect/arthropod consumed the marker material and is actively feeding on the bait.

Figure 13:
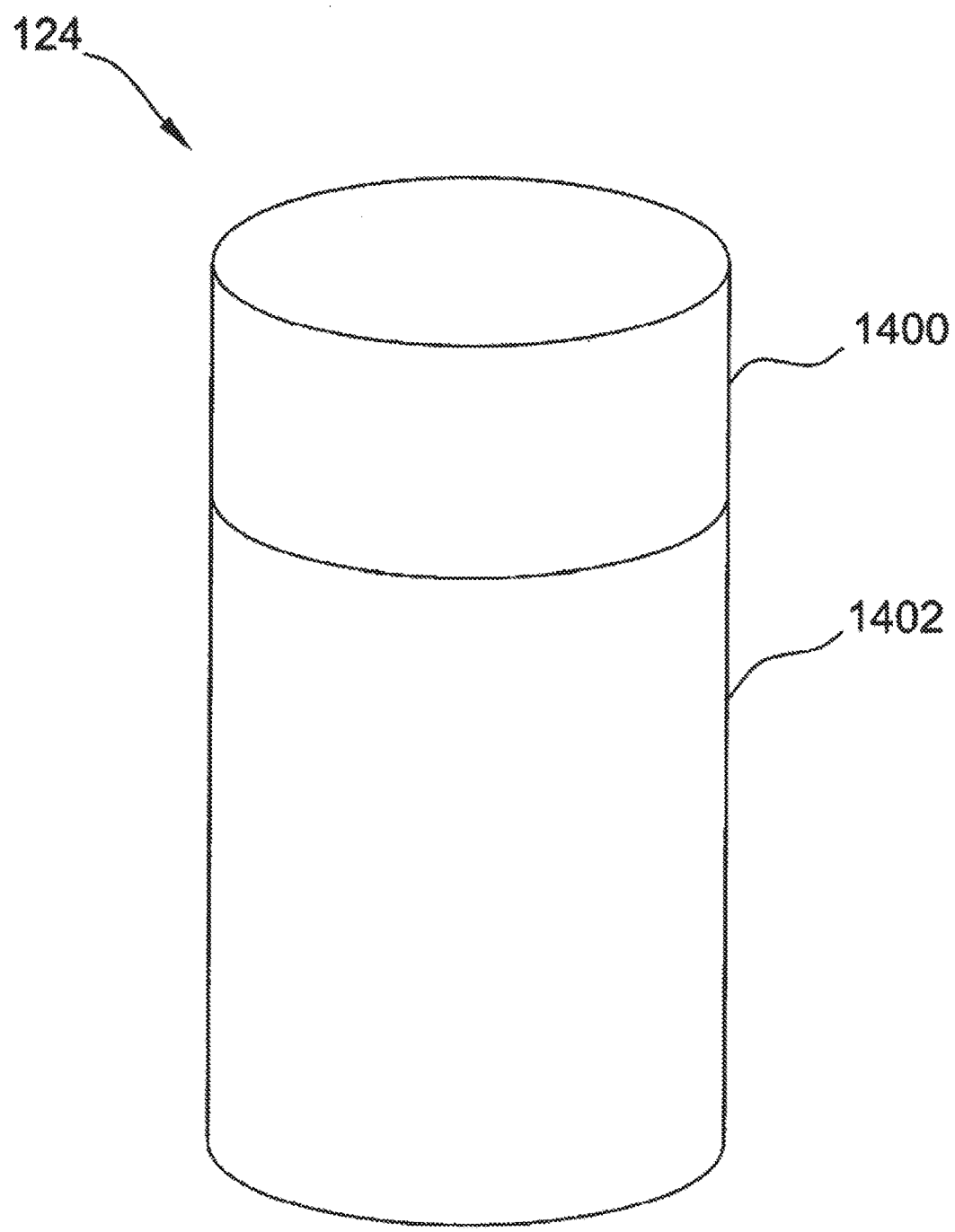
FIG. 13 is a perspective view of an exemplary bait matrix that may be used with the pest monitoring system shown in FIG. 1 including a conductive bait matrix and a nonconductive bait matrix.

FIG. 13 is a perspective view of an exemplary bait matrix 124 that may be used with the pest monitoring system 100 (shown in FIG. 1) including a conductive bait matrix 1400 and a non-conductive bait matrix 1402. It is understood that in one preferred embodiment "conductive bait matrix" generally means a bait matrix that comprises electrically conductive particles. It is to be understood that there may also be cases where the bait includes electrically conductive particles without being conductive itself. For the purpose of this disclosure, such kind of bait may also be called "conductive bait". In one embodiment, the bait matrix 124 includes only the conductive bait matrix 1400.

However, in other embodiments, it may be preferred that the bait matrix 124 may include one or more sections, wherein at least one section may include the conductive bait matrix 1400 and a second section may include the non-conductive bait matrix 1402.

Further, in other suitable embodiments, it is understood that the bait matrix 124 may be non-conductive (i.e. includes only a bait matrix 1402 substantially not containing electrically conducting particles).

The conductive bait matrix 1400 may comprise up to 5% of the size of the total bait matrix 124 (conductive portion 1400 plus the non-conductive portion 1402), up to 10% of the total bait matrix 124, up to 15% of the total bait matrix 124, up to 30% of the total bait matrix 124, up to 50% of the total bait matrix 124, up to 75% of the total bait matrix 124, and/or up to 100% of the total bait matrix 124.

In one suitable embodiment, the conductive bait matrix 1400 is highly palatable to pest and may be preferred for consumption or displacement by the pests as shown in Table 2 below and as set forth in more detail in Example 1 herein.

Further, it is understood that the bait matrix 124 as described in FIG. 1 may be highly palatable to pest and may be preferred for consumption or displacement by the pests without including the conductive bait matrix 1400.

The bait matrix 124 according to one embodiment is of a generally solid construction. In other embodiments the bait matrix 124 may instead be semi-solid (e.g., in the form of a gel), or it may be generally in a liquid state (e.g., in the form of a fluid suspension). In a particularly suitable embodiment, the bait matrix 124 is an extruded bait matrix.

The bait matrix 124 and/or the conductive bait matrix 1400 according to one suitable embodiment includes a carrier material and a plurality of electrically conductive particles and/or a plurality of palatability enhancing particles. It is understood that the non-conductive bait matrix 1402 may contain no or not sufficient conductive particles to carry be electrically conductive and/or carry an electrical charge. It is also understood that the conductive bait matrix 1400 may be only a portion (conductive portion 1400) of the bait matrix 124. It is further understood that an electric charge may or may not be applied to the conductive bait matrix 1400. The electrically conductive or phagostimulatory particles according to one embodiment may be metal particles such as, without limitation, iron, zinc, magnesium, copper, or aluminum. The particles may be in any suitable particulate form such as dust, oxide, filings, slag, flakes, or other suitable particle form.

In other embodiments, the electrically conductive or phagostimulatory particles are semi-metal or non-metal electrically conductive particles. Suitable examples according to one embodiment include carbon-based particles such as, without limitation, graphite, carbon nanotube fragments, carbon black, coke, and carbonized-charcoal powder.

In one particularly suitable embodiment, the electrically conductive or phagostimulatory particles are particles of graphite. Graphite is available in different types such as, for example, flake graphite, amorphous graphite, vein graphite, expandable graphite, or highly oriented pyrolytic graphite (HOPG).

Graphite is commercially available in a variety of grades for different applications such as EDM Grades (as e.g., described in "Properties and Characteristics of Graphite, For the EDM Industry", Fifth Printing—February 2002, 1987 Poco Graphite, Inc., POCO Graphite, Inc. 300 Old Greenwood Rd. Decatur, Tex. 76234), Industrial Grades (as e.g. described in "Industrial Material Solutions", Poco Graphite Inc., brochures IND-92480-0514, 6204-7085INK-0414, all 2014) Semiconductor Grades, Ion Implant Grades, Biomedical Grades (as e.g. described in "Biomedical Grade Graphites", Poco Graphite Inc., Brochure IND-7334-0514), and Glassmate Grades (as e.g. described in "Glassmate", Poco Graphite Inc., brochure GLA 102930-0214, 2014).

It is well known that different types and grades of graphite differ in one or more of their properties such as, for example, density, Shore hardness, Rockwell Hardness, flexural strength, thermal expansion, thermal conductivity, heat capacity, emissivity, compressive strength, electrical resistivity, or average particle size.

In general, any kind and any grade of graphite may be used, provided that its incorporation into the bait matrix facilitates a palatability preference for the bait matrix. In one suitable embodiment, the material comprising electrically conductive particles is graphite provided by graphite manufacturers (such as, for example, Asbury Graphite Mills, Inc.) as conductive filler for the manufacture of electrically conductive polymers. In one embodiment, the material comprising conductive particles is ultra-fine graphite and/or ultra-high surface area graphite.

In one suitable embodiment, the graphite mean particle size may measure from 1 µm to 20 µm, 1 µm to 15 µm, 1 µm to 10 µm, 1 µm to 5 µm, 1 µm to 3 µm. Methods to determine the average particle size are well known to the person skilled in the art. In one embodiment, the graphite has a surface area in the range from 1 $m^2/g$ to 500 $m^2/g$, from 20 $m^2/g$ to 400 $m^2/g$, from 50 $m^2/g$ to 300 $m^2/g$.

Electrical resistivity (also known as resistivity, specific electrical resistance, or volume resistivity) is an intrinsic property that quantifies how strongly a given material opposes the flow of electric current. The skilled person is familiar with methods to measure electrical resistivity. For example, one standard method of measuring the electrical resistivity of a graphite sample is described in ASTM C611-98.

TABLE 1

Graphite types provided by Asbury Graphite Mills Inc. for the manufacture of conductive polymers
Asbury ® Ultra Fine/Ultra High Surface Area Graphite

| Grade | Type | Mean Particle Size (µm) | Surface Area ($m^2$/gram) | Resistivity (Ohm*cm) |
|---|---|---|---|---|
| 4118 | Synthetic | <3.0 | 100-150 | 0.14 |
| 3725 | Natural | <2.5 | Nominal 180 | 0.23 |
| 2299 | Natural | <2.0 | Nominal 400 | 0.65 |
| 4827 | Synthetic | <2.0 | 225-275 | 0.21 |
| 4848 | Synthetic | <2.0 | 225-275 | 0.25 |
| 4847 | Synthetic | <1.5 | 275-325 | 0.25 |
| 4849 | Synthetic | <1.5 | 275-325 | 0.38 |
| TC 306 | Synthetic | <1.5 | 325-375 | 0.26 |
| TC 307 | Synthetic | <1.5 | 325-375 | 0.26 |

In one embodiment, the conductive bait matrix 1400 contains an amount of electrically conductive particles, preferably graphite, that is sufficient to induce an electrical resistance of the conductive bait matrix 1400 in the range from 1 kΩ to 500 kΩ, from 10 kΩ to 100 kΩ, preferably from 40 kΩ to 80 kΩ, more preferably from 1 kΩ to 20 kΩ.

In one embodiment, the conductive bait matrix 1400 contains from about 0.1% to about 50% by weight, 1% to about 25%, preferably about 5% to about 15%, more preferably about 8% to about 12% by weight graphite particles as compared to the weight of the total conductive bait matrix 1400. The remainder of the conductive bait matrix 1400 in such embodiments would be the carrier material. In other embodiments, a toxicant such as an active ingredient may also be included in the bait matrix 124 and may reduce the concentration of the graphite particles, the concentration of carrier material, or both.

It is to be understood that some phagostimulants such as e.g. erythritol may also be used as an active insecticide ingredient.

Other suitable electrically conductive particles may also be used and remain within the scope of some aspects of this disclosure. Further, it is understood that the bait matrix 124 described in FIG. 1 may include the toxicant without including the conductive bait matrix 1400. It is to be further understood that the conductive bait matrix 1400 may be used in the device without the presence of an electrical current in the conductive bait matrix 1400 itself.

The carrier material of the bait matrix 124 according to one embodiment comprises a consumable material (e.g., a material that is consumable and digestible by a pest being monitored using the bait matrix). For example, in one particularly suitable embodiment, the carrier material includes polysaccharide material (e.g., a cellulosic material such as wood flour, alpha cellulose, microcrystalline cellulose or other suitable cellulose material consumable by termites). It is understood that the carrier material may include other consumable materials without departing from the scope of this disclosure. In other suitable embodiments, an agar matrix alone or combined with sugars (i.e., xylose, mannose, galactose, erythritol, aspartame, saccharin) and/or purified cellulose materials may be used as carrier material of the bait matrix 124.

It is also contemplated that the carrier material may instead, or additionally, comprise a consumable, but non-digestible or essentially non-digestible, material (e.g., a material that is consumable, but not digestible, by a pest being monitored using the bait matrix 124). In one example, a suitable consumable and non-digestible or essentially non-digestible material used as a carrier material is a thermoplastic material and/or a resin-type material. Such a material is capable of melting and being mixed with the electrically conductive particles (and the digestible material, if present) for extrusion together to form the bait matrix 124.

However, it is understood that the bait matrix 124 may function as described in FIG. 1 without including the conductive bait matrix 1400.

By "essentially non-digestible" it is understood that less than 50% by weight, preferably less than 10% by weight, more preferably less than 1% by weight, still more preferably less than 0.1% by weight, of the orally acquired material are subsequently digested by the pest being monitored using the bait matrix 124. Digestible for purposes of this application means capable of being broken down to a simpler form by the consumer after consumption.

It is also contemplated that the carrier material may instead, or additionally, include a displaceable material, i.e. a material that can be dislodged by the pest without the pest eating and/or digesting it. Thermoplastic materials in general are well known materials that become pliable or moldable above a specific temperature and solidify upon cooling. There are many examples of suitable thermoplastic materials including but not limited to—High Temperature Thermoplastics like polyphthalamide (PPA), Polyphenylene sulfide (PPS), Liquid-crystal polymers (LCP), Poly ether ether ketone (PEEK), Polyetherimid (PEI), Polyarylsulphones (PSU), Polyethersulfone (PES), Polyphenylsulfone (PPSU)—Engineering thermoplastics like syndiotactic polystyrene (SPS), Polyethylene terephthalate (PET), Polybutylene terephthalate (PBT), Polyoxymethylene (POM), Polyamide (PA), polypropylene (PP), polycarbonate (PC), Poly(p-phenylene oxide) (PPE), Poly (methyl methacrylate) (PMMA), Acrylonitrile butadiene styrene (ABS), styrene-acrylonitrile copolymer (SAN), Acrylonitrile Styrene Acrylate (ASA)—Standard thermoplastics like High-density polyethylene (HDPE), Low-density polyethylene (LDPE), Linear low-density polyethylene (LLDPE), poly(butylene adipate-co-terephthalate) (PBAT), Acrylonitrile butadiene styrene (ABS).

The carrier material in one embodiment comprises a thermoplastic material that has a melting point of below about 220° C., or below about 180° C., or below about 160° C., or below about 140° C.

In one embodiment, the bait matrix 124 and/or the conductive bait matrix 1400 also includes at least one pesticide active ingredient.

If the bait matrix 124 and/or the conductive bait matrix 1400 also includes a pesticide active ingredient, the processing temperature used to melt or soften the thermoplastic material when making the carrier material is preferably a temperature less than that at which the functionality of the pesticide active ingredient is nullified and/or the integrity of the active ingredient molecules is compromised.

Suitable thermoplastic materials include, without limitation, cellulose acetate propionate (CAP), cellulose acetate butyrate (CAB), or a polyester. U.S. Patent Application Publication No. 2015/0305326 A1, which is herewith incorporated by reference, describes particularly suitable thermoplastic materials in paragraphs [0077] and [0078]. In one particularly suitable embodiment, the thermoplastic carrier material is a polyester having a relatively low melt temperature, e.g. where the melt temperature is below 170° C., where the melt temperature is below 160° C., where the melt temperature is below 150° C., where the melt temperature is below 140° C., where the melt temperature is below 130° C. Suitable polyesters are for example the polyesters disclosed in WO-A 92/09654 and WO-A 96/15173, which are hereby incorporated by reference.

Preferred suitable polyesters are aliphatic or aliphatic/aromatic (semiaromatic) polyesters with intrinsic viscosities to DIN 53728 of from 150 to 320 $cm^3/g$ and acid numbers to DIN EN 12634 smaller than 1.2 mg KOH/g, preferably smaller than 1.0 mg KOH/g.

Other preferred polyesters are compostable semiaromatic polyesters with intrinsic viscosities greater than 160 $cm^3/g$ and acid numbers smaller than 1.0 mg KOH/g, and with melt volume-flow rate (MVR) smaller than 6.0 $cm^3/10$ min (measured at 190 degrees centigrade, with a weight of 216 kg).

The aforementioned preferred compostable semiaromatic polyesters and their process of manufacture are disclosed in WO-A 09/127556, which is hereby incorporated by reference. The thermoplastic material may also comprise mixtures of biodegradable semiaromatic polyesters with polymers that are susceptible to hydrolysis, examples being PLA (polylactide); PHA (polyhydroxyalkanoates), PBS (polybutylene succinate), and starch. One particularly suitable polyester is sold by BASF SE under the tradename Ecoflex®. This material is a compostable, statistical, aliphatic-aromatic copolyester based on the monomers 1.4-butanediol, adipic acid and terephthalic acid in the polymer chain. The melt temperature of Ecoflex® is approximately 110-120° C.

The thermoplastic polymer can include a single polymer or a mixture of at least two different polymers. For example, in one embodiment, the thermoplastic polymer includes a mixture of a relatively high molecular weight polymer and a relatively low molecular weight polymer. Polyesters like e.g. Ecoflex®, their manufacture and uses are described in patent applications EP-A 1656423, EP-A 937120, EP-A 950689, EP-A 1838784, EP-A 947559, EP-A 965615, which are herewith incorporated by reference. In one embodiment, the thermoplastic polymer comprises a mixture of Ecoflex® and Poly lactic acid (PLA) like e.g. Eecovio®.

One advantage of using a lower melt temperature polyester polymer (e.g., as opposed to, e.g., CAP or CAB) as the carrier material is in extruding a bait matrix that includes an active ingredient which decomposes at higher temperatures like e.g. above 160° C., above 180° C., above 200° C. For example, CAP and CAB typically have a melt temperature closer to about 180° C. Extruding at this higher temperature may have more of a negative impact on an active ingredient than extruding at the lower temperature of the polyester polymer, e.g., the Ecoflex®. It is to be understood that a melt temperature of greater than 180° C. may be used. Additionally, it is believed, based on preliminary studies, that termites show a preference to a bait matrix comprised of graphite and Ecoflex® than to a bait matrix comprised of graphite and CAB or CAP, in the same relative concentrations as shown in Tables 3 and 4 and set forth in more detail in Example 2.

As used herein, a substance or a mixture of substances is considered to be "biodegradable" if this substance or the mixture of substances has a percentage degree of biodegradation of at least 60% in the processes defined in DIN EN 13432. Other methods of determining biodegradability are described by way of example in ABNT 15448-1/2 and ASTM D6400. As used herein, a substance or a mixture of substances is considered to be "compostable" if this substance or mixture of substances may be degraded by microorganisms or other biological processes during composting to yield C02, water, inorganic compounds, and biomass at a rate consistent with other known compostable materials and that leaves no visible, distinguishable or toxic residues and/or a substance or mixture of substances meets the criteria set forth in the any of the following compostable standards EP—DIN EN 13432, US—ASTM D 6400 or JP—GreenPla standard.

The result of the biodegradability and/or compostability is generally that the substance, as e.g. the polyester breaks down within an appropriate and demonstrable period. The degradation may be brought about enzymatically, hydrolytically, oxidatively, and/or via exposure to electromagnetic radiation, such as UV radiation, and is mostly predominantly caused by exposure to microorganisms, such as bacteria, yeasts, fungi, and algae. An example of a method of quantifying the biodegradability mixes polyester with compost and stores it for a particular time. By way of example, according to DIN EN 13432, C02-free air is passed through ripened compost during the composting process and the compost is subjected to a defined temperature profile. Biodegradability is defined here by way of the ratio of the net amount of C02 liberated from the specimen (after deducting the amount of C02 liberated by the compost without the specimen) to the maximum possible amount of C02 liberated by the specimen (calculated from the carbon content of the specimen), this ratio being defined as the percentage biodegradability. Even after a few days of composting, biodegradable polyesters or biodegradable polyester mixtures generally show marked signs of degradation, for example, fungal growth, cracking, and perforation.

Polyesters are well known polymers. They include monomers in polymerized form, such as diols and diacids (or diesters), or hydroxyacids (or hydroxyesters). Suitable polyester are, for example, aliphatic polyester. These include homopolymers of aliphatic hydroxy carboxylic acids or lactones, and also copolymers or block copolymers of different hydroxy carboxylic acids or lactones or mixtures of these. These aliphatic polyesters may also contain units of diols and/or of isocyanates. The aliphatic polyesters may also contain units which derive from tri- or polyfunctional compounds, for example, from epoxides, from acids, or from triols. The aliphatic polyesters may contain the latter units as individual units, or a number of these, possibly together with the diols and/or isocyanates. Processes for preparing aliphatic polyesters are known to the skilled worker. In preparing the aliphatic polyesters it is, of course, also possible to use mixtures made from two or more comonomers and/or from other units, for example, from epoxides or from polyfunctional aliphatic or aromatic acids, or from polyfunctional alcohols. The aliphatic polyesters generally have molar masses (number-average) of from 10,000 to 100,000 g/mol.

Examples of aliphatic polyesters are polymeric reaction products of lactic acid, poly-Shy droxybutanoates, or polyesters built up from aliphatic or cycloaliphatic dicarboxylic acids and from aliphatic or cycloaliphatic diols. The aliphatic polyesters may also be random or block copolyesters which contain other monomers. The proportion of the other monomers is generally up to 10 percent by weight. Preferred comonomers are hydroxycarboxylic acids or lactones or mixtures of these.

Polymeric reaction products of lactic acid are known per se or may be prepared by processes known per se. Besides polylactide, use may also be made of those copolymers or block copolymers based on lactic acid with other monomers. Linear polylactides are mostly used. However, branched lactic acid polymers may also be used. Examples of branching agents are polyfunctional acids or alcohols. Polylactides which may be mentioned as an example are those obtainable essentially from lactic acid or from its C1-C4-alkyl esters or mixtures of these, with at least one aliphatic C4-C10 dicarboxylic acid and with at least one C3-C10 alkanol having from three to five hydroxyl groups.

Poly-3-hydroxybutanoates are homopolymers or copolymers of 3-hydroxybutanoic acid or mixtures thereof with 4-hydroxybutanoic acid and with 3-hydroxyvaleric acid, in particular with a proportion by weight of up to 30 percent, preferably up to 20 percent, of the last-named acid. Suitable polymers of this type also include those with R-stereospecific configuration. Polyhydroxybutanoates or copolymers of these can be prepared microbially.

Processes for the preparation from various bacteria and fungi are known as well as a process for preparing stereospecific polymers. It is also possible to use block copolymers of the above-mentioned hydroxycarboxylic acids or lactones, or of their mixtures, oligomers or polymers.

Suitable polyesters built up from aliphatic or cycloaliphatic dicarboxylic acids and from aliphatic or cycloaliphatic diols are those built up from aliphatic or cycloaliphatic dicarboxylic acids or from mixtures of these, and from aliphatic or cycloaliphatic diols, or from mixtures of these. According to the present disclosure, either random or block copolymers may be used.

Suitable aliphatic dicarboxylic acids generally have from 2 to 10 carbon atoms. They may be either linear or branched. Cycloaliphatic dicarboxylic acids as used herein are generally those having from 7 to 10 carbon atoms, and in particular those having 8 carbon atoms. However, in principle use may also be made of dicarboxylic acids having a larger number of carbon atoms, for example, having up to 30 carbon atoms. Examples include, without limitation: malonic acid, succinic acid, glutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, digly colic acid, itaconic acid, maleic acid and 2,5-norbornanedicarboxylic acid, preferably adipic acid. Mention should also be made of ester-forming derivatives of the abovementioned aliphatic or cycloaliphatic dicarboxylic acids, which may likewise be used, in particular the di-C1-C6-alkyl esters, such as dimethyl, diethyl, di-n-propyl, diisopropyl, di-n-butyl, diisobutyl, di-tert-butyl, di-n-pentyl, diisopentyl, and di-n-hexyl esters. Anhydrides of the dicarboxylic acids may likewise be used. The dicarboxylic acids or ester-forming derivatives of these may be used individually or as a mixture of two or more of these.

Suitable aliphatic or cycloaliphatic diols generally have from 2 to 10 carbon atoms. They may be either linear or branched. Examples are 1,4-butanediol, ethylene glycol, 1,2- or 1,3-propanediol, 1,6-hexanediol, 1,2- or 1,4-cyclohexanediol or mixtures of these.

Examples of aliphatic polyesters are aliphatic copoly esters as described in WO 94/14870, in particular aliphatic copoly esters made from succinic acid, from its diesters, or from mixtures with other aliphatic acids or, respectively, diesters, for example, glutaric acid and butanediol, or mixtures made from this diol with ethylene glycol, propanediol or hexanediol or mixtures of these. In another embodiment, preferred aliphatic polyesters include polycaprolactone.

As used herein, semiaromatic polyesters refer to polyester, which include aliphatic and aromatic monomers in polymerizied form. The term semiaromatic polyesters is also intended to include derivatives of semiaromatic polyesters, such as semiaromatic polyetheresters, semiaromatic polyesteramides, or semiaromatic polyetheresteramides. Among suitable semiaromatic polyesters are linear non-chain-extended polyesters (WO 92/09654). Preference is given to chain-extended and/or branched semiaromatic polyesters. The latter are disclosed in, for example, WO 96/15173, WO 96/15174, WO 96/15175, WO 96/15176, WO 96/21689, WO 96/21690, WO 96/21691, WO 96/21689, WO 96/25446, WO 96/25448, and WO 98/12242, expressly incorporated herein by way of reference. Mixtures of different semiaromatic polyesters may also be used. In particular, the term semiaromatic polyesters is intended to mean products such as Ecoflex® (BASF SE) and Eastar® Bio and Origo-Bi (Novamont).

Among particularly preferred semi-aromatic polyesters are polyesters which comprise the following significant components: (A) an acid component composed of (a1) from 30 to 99 mol % of at least one aliphatic, or at least one cycloaliphatic, dicarboxylic acid, or its ester-forming derivatives, or a mixture of these (a2) from 1 to 70 mol % of at least one aromatic dicarboxylic acid, or its ester-forming derivative, or a mixture of these, and (a3) from 0 to 5 mol % of a compound comprising sulfonate groups, and (B) a diol component selected from at least one C2-C12 alkanediol and at least one C5-C10 cycloalkanediol, or a mixture of these. If desired, the semi-aromatic polyester may also comprise one or more components selected from (C) and (D), wherein (C) is a component selected from:

(c1) at least one dihydroxy compound comprising ether functions and having the formula:

HO—[(CH2)n-O]m-H    (I), where n is 2, 3 or 4 and m is a whole number from 2 to 250, (c2) at least one hydroxycarboxylic acid of the formula IIa or IIb:

(IIa)

(IIb)

where p is a whole number from 1 to 1500 and r is a whole number from 1 to 4, and G is a radical selected from the group consisting of phenylene, $(CH_2)_{q^-}$, where q is a whole number from 1 to 5, —C(R)H and —C(R)HCH$_2$, where R is methyl or ethyl, (c3) at least one amino-C2-C12 alkanol, or at least one amino-C5-C10 cycloalkanol, or a mixture of these, (c4) at least one diamino-C1-C8 alkane, (c5) at least one 2,2'-bisoxazoline of the formula III:

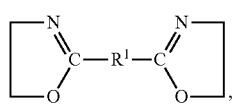
(III)

where $R^1$ is a single bond, a (CH2)z-alkylene group, where z=2, 3, or 4, or a phenylene group, (c6) at least one aminocarboxylic acid selected from the group consisting of the naturally occurring amino acids, polyamides obtainable by poly condensing a dicarboxylic acid having from 4 to 6 carbon atoms with a diamine having from 4 to 10 carbon atoms, compounds of the formulae IVa and IVb:

(IVa)

(IVb)

where s is a whole number from 1 to 1500 and t is a whole number from 1 to 4, and T is a radical selected from the group consisting of phenylene, $(CH_2)_{u^-}$, where u is a whole number from 1 to 12, C(R2)H and C(R2)HCH2, where R2 is methyl or ethyl, and polyoxazolines having the repeat unit V:

(V)

where $R^3$ is hydrogen, C1-C6-alkyl, C5-C8-cycloalkyl, phenyl, either unsubstituted or with up to three C1-C4-alkyl substituents, or tetrahydrofuryl, or a mixture composed of (c1) to (c6), and wherein (D) is a component selected from (d1) at least one compound having at least three groups capable of ester formation, (d2) at least one isocyanate, (d3) at least one divinyl ether, or a mixture composed of (d1) to (d3).

The acid component A of the semiaromatic polyesters may comprise from 30 to 70 mol %, in particular from 40 to 60 mol %, of a1, and from 30 to 70 mol %, in particular from 40 to 60 mol %, of a2.

Aliphatic acids and the corresponding derivatives a1 which may be used are generally those having from 2 to 10 carbon atoms. They may be either linear or branched. The cycloaliphatic dicarboxylic acids are generally those having from 7 to 10 carbon atoms and, in particular, those having 8 carbon atoms. In principle, however, it is also possible to use dicarboxylic acids having a larger number of carbon atoms, for example, having up to 30 carbon atoms. Examples include, without limitation: malonic acid, succinic acid, glutaric acid, 2 methylglutaric acid, 3-methylglutaric acid, adipic acid, pimelic acid, azelaic acid, sebacic acid, fumaric acid, 2,2-dimethylglutaric acid, suberic acid, 1,3-cyclopentane-'dicarboxylic acid, 1,4-cyclohexanedicarboxylic acid, 1,3-cyclohexanedicarboxylic acid, diglycolic acid, itaconic acid, maleic acid, brassylic acid, and 2,5-norbornanedicarboxylic acid. Ester-forming derivatives of the abovementioned aliphatic or cycloaliphatic dicarboxylic acids which may also be used and which may be mentioned are in particular the di-C1-C6-alkyl esters, such as dimethyl, diethyl, di-n-propyl, diisopropyl, di-n-butyl, diisobutyl, di-tert-butyl, di-n-pentyl, diisopentyl or di-n-hexyl esters. It is also possible to use anhydrides of the dicarboxylic acids.

Dicarboxylic acids or their ester-forming derivatives may be used individually or in the form of a mixture composed of two or more of these.

In another embodiment, succinic acid, adipic acid, azelaic acid, sebacic acid, brassylic acid, or respective ester-forming derivatives thereof, or a mixture of these may be used. Aliphatic dicarboxylic acid may comprise sebacic acid or a mixture of sebacic acid with adipic acid, if polymer mixtures with "hard" or "brittle" components for example polyhydroxybutyrate or in particular polylactide, are prepared. In another embodiment, the aliphatic dicarboxylic acid may comprise succinic acid or a mixture of succinic acid with adipic acid if polymer mixtures with "soft" or "tough" components, for example, polyhydroxybutyrate-co-valerate, are prepared.

A further advantage of succinic acid, azelaic acid, sebacic acid, and brassylic acid is that they are accessible renewable raw materials.

Aromatic dicarboxylic acids a2 which may be mentioned are generally those having from 8 to 12 carbon atoms and preferably those having 8 carbon atoms. By way of example, mention may be made of terephthalic acid, isophthalic acid, 2,6-naphthoic acid and 1,5-naphthoic acid, and also ester-forming derivatives of these. Particular mention may be made here of the di-C1-C6-alkyl esters, e.g. dimethyl, diethyl, di-n-propyl, diisopropyl, di-n-butyl, diisobutyl, di-tert-butyl, di-n-pentyl, diisopentyl, or di n-hexyl esters. The anhydrides of the dicarboxylic acids a2 are also suitable ester-forming derivatives.

However, in principle, it is also possible to use aromatic dicarboxylic acids (a2) having a greater number of carbon atoms, for example up to 20 carbon atoms.

The aromatic dicarboxylic acids or ester-forming derivatives of these (a2) may be used individually or as a mixture of two or more of these.

A compound comprising sulfonate groups (a3) is usually one of the alkali metal or alkaline earth metal salts of a sulfonate-containing dicarboxylic acid or ester-forming derivatives thereof, such as alkali metal salts of 5-sulfoisophthalic acid or a mixture of these.

In one embodiment, the acid component A comprises from 40 to 60 mol % of a1, from 40 to 60 mol % of a2 and from 0 to 2 mol % of a3. In another embodiment, the acid component A comprises from 40 to 59.9 mol % of a1, from 40 to 59.9 mol % of a2, and from 0.1 to 1 mol % of a3, in particular, from 40 to 59.8 mol % of a1, from 40 to 59.8 mol % of a2, and from 0.2 to 0.5 mol % of a3.

Diols B are generally selected from the group consisting of branched or linear alkanediols having from 2 to 12 carbon atoms, or from the group consisting of cycloalkanediols having from 5 to 10 carbon atoms. Examples of alkanediols are ethylene glycol, 1,2-propanediol, 1,3-propanediol, 1,2-butanediol, 1,4-butanediol, 1,5-pentanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol and 2,2,4-trimethyl-1,6-hexanediol, in particular ethylene glycol, 1,3-propanediol, 1,4-butanediol or 2,2-dimethy 1-1, 3-propanediol (neopentyl glycol); cyclopentanediol, 1,4-cyclohexanediol, 1,2-cyclohexanedimethanol, 1,3-cyclohexanedimethanol, 1,4-cyclohexanedimethanol or 2,2,4,4-tetramethyl-1,3-cyclobutanediol. Particular preference is given to 1,4-butanediol, in particular in combination with adipic acid as component (a1), and 1,3-propanediol, in particular in combination with sebacic acid as component (a1). Another advantage of 1,3-propanediol is that it is an available renewable raw material. It is also possible to use mixtures of different alkanediols.

Depending on whether an excess of acid groups or of OH end groups is desired, either component A or component B may be used in excess. In one preferred embodiment, the molar ratio of the components A and B used may be from 0.4:1 to 1.5:1, preferably from 0.6:1 to 1.1:1.

Besides components A and B, the polyesters may comprise other components.

Dihydroxy compounds (c1) which may be used are diethylene glycol, triethylene glycol, polyethylene glycol, polypropylene glycol and polytetrahydrofuran (polyTHF), particularly preferably diethylene glycol, triethylene glycol and polyethylene glycol, and mixtures of these may also be used, as may compounds which have different variables n (see formula I), for example polyethylene glycol which comprises propylene units (n=3), obtainable, for example, by using methods of polymerization known per se and polymerizing first with ethylene oxide and then with propylene oxide, and particularly preferably a polymer based on polyethylene glycol with different variables n, where units formed from ethylene oxide predominate. The molar mass (Mn) of the polyethylene glycol is generally selected within the range from 250 to 8000 g/mol, preferably from 600 to 3000 g/mol.

In one embodiment for preparing the semi-aromatic polyesters use may be made, for example, of from 15 to 98 mol %, preferably from 60 to 99.5 mol %, of the diols B and from 2 to 85 mol %, preferably from 0.5 to 40 mol %, of the dihydroxy compounds (c1), based on the molar amount of B and (c1).

In one preferred embodiment, the hydroxycarboxylic acid (c2) used is: glycolic acid, D-, L-, or D,L-lactic acid, 6-hydroxyhexanoic acid, cyclic derivatives of these, such as glycolide (1,4-dioxane-2,5-dione), D- or L-dilactide (3,6-dimethyl-1,4-dioxane-2,5-dione), p-hydroxybenzoic acid, or else their oligomers and polymers, such as 3-polyhydroxybutyric acid, polyhydroxyvaleric acid, polylactide (obtainable, for example, as NatureWorks® 4042D (NatureWorks) or else a mixture of 3-poly hydroxy butyric acid and polyhydroxyvaleric acid (obtainable from PHB Industrial, Tianan, or Metabolix) and, for preparing semiaromatic polyesters, particularly preferably the low-molecular-weight and cyclic derivatives thereof.

Examples of amounts that may be used of the hydroxycarboxylic acids are from 0.01 to 50% by weight, preferably from 0.1 to 40% by weight, based on the amount of A and B.

The amino-C2-C12 alkanol or amino-C5-C10 cycloalkanol used (component c3) may include 4-aininomethyl^cyclohexane-methanol, are preferably amino-C2-C6 alkanols, such as 2-aminoethanol, 3-amino-propanol, 4-aminobutanol, 5-aminopentanol or 6-aminohexanol, or else amino-05-C6 cycloalkanols, such as aminocyclopentanol and aminocyclohexanol, or mixtures of these.

The diamino-C1-C8 alkanes (component c4) used are preferably diamino-C4-C6 alkanes, such as 1,4-diaminobutane, 1,5-diaminopentane or 1,6-diaminohexane (hexamethylenediamine, "HMD").

In one embodiment for preparing the semiaromatic polyesters, use may be made of from 0.5 to 99.5 mol %, preferably from 0.5 to 50 mol %, of (c3), based on the molar amount of B, and of from 0 to 50 mol %, preferably from 0 to 35 mol %, of (c4), based on the molar amount of B.

The 2,2'-bisoxazolines (c5) of the formula III are generally obtainable via the process of Angew. Chem. Int. Edit., Vol. 11 (1972), pp. 287-288. Bisoxazolines are those where R1 is a single bond, (CH2)z-alkylene, where z=2, 3 or 4, for example methylene, ethane-1,2-diyl, propane-1,3-diyl or propane-1,2-diyl, or a phenylene group. Particularly preferred bisoxazolines which may be mentioned are 2,2'-bis (2-oxazoline), bis(2-oxazolinyl)methane, 1,2-bis(2-oxazolinyl)ethane, 1,3-bis(2-oxazolinyl)propane and 1,4-bis(2-oxazolinyl)butane, in particular 1,4-bis(2-oxazolinyl) benzene, 1,2-bis(2-oxazolinyl)benzene or 1,3-bis(2-oxazolinyl)benzene.

In preparing the semiaromatic polyesters use may, for example, be made of from 70 to 98 mol % of B, up to 30 mol % of (c3) and from 0.5 to 30 mol % of (c4) and from 0.5 to 30 mol % of (c5), based in each case on the total of the molar amounts of components B, c3, c4 and c5. In another embodiment, use may be made of from 0.1 to 5% by weight, preferably from 0.2 to 4% by weight, of (c5), based on the total weight of A and B.

The component (c6) used may be naturally occurring aminocarboxylic acids. These include valine, leucine, isoleucine, threonine, methionine, phenylalanine, tryptophan, lysine, alanine, arginine, aspartamic acid, cysteine, glutamic acid, glycine, histidine, proline, serine, tyrosine, asparagine and glutamine.

Preferred aminocarboxylic acids of the formulae IVa and IVb are those where s is a whole number from 1 to 1000 and t is a whole number from 1 to 4, preferably 1 or 2, and t has been selected from the group consisting of phenylene and —(CH2)u—, where u is 1, 5, or 12.

(c6) may also be a polyoxazoline of the formula V. However, (c6) may also be a mixture of different aminocarboxylic acids and/or polyoxazolines.

In one embodiment, the amount of (c6) used may be from 0.01 to 50% by weight, preferably from 0.1 to 40% by weight, based on the total amount of components A and B.

Among other components which may be used, if desired, for preparing the semiaromatic polyesters are compounds (d1) which comprise at least three groups capable of ester formation.

The compounds (d1) may comprise from three to ten functional groups which are capable of developing ester bonds. Particularly preferred compounds (d1) have from three to six functional groups of this type in the molecule, in particular, from three to six hydroxy groups and/or carboxy groups. Examples which should be mentioned are: tartaric acid, citric acid, maleic acid; trimethylolpropane, trimethylolethane; pentaerythritol; polyethertriols; glycerol; trimesic acid; trimellitic acid, trimellitic anhydride; pyromellitic acid, pyromellitic dianhydride, and hydroxyisophthalic acid.

The amounts generally used of the compounds (d1) are from 0.01 to 15 mol %, preferably from 0.05 to 10 mol %, particularly preferably from 0.1 to 4 mol %, based on component A.

Components (d2) used are an isocyanate or a mixture of different isocyanates. Aromatic or aliphatic diisocyanates may be used. However, higher-functionality isocyanates may also be used. Aromatic diisocyanate d2 is especially tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate or xylylene diisocyanate. By way of example, it is possible to use the isocyanates obtainable as Basonat® from BASF SE.

Among these, particular preference is given to diphenylmethane 2,2'-, 2,4'- and 4,4'-diisocyanate as component (d2). The latter diisocyanates are generally used as a mixture.

A three-ring isocyanate (d2) which may also be used is tri(4-isocyanophenyl)methane. Multi-ringed aromatic diisocyanates arise during the preparation of single- or two-ring diisocyanates, for example.

Component (d2) may also comprise subordinate amounts, e.g. up to 5% by weight, based on the total weight of component (d2), of uretdione groups, for example, for capping the isocyanate groups.

Aliphatic diisocyanate (d2) is primarily a linear or branched alkylene diisocyanate or cycloalkylene diisocyanate having from 2 to 20 carbon atoms, preferably from 3 to 12 carbon atoms, e.g. hexamethylene 1,6-diisocyanate, isophorone diisocyanate, or methylenebis(4-isocyanatocyclohexane). Hexamethylene 1,6-diisocyanate and isophorone diisocyanate are particularly preferred aliphatic diisocyanates (d2).

Among the preferred isocyanurates are the aliphatic isocyanurates which derive from C2-C20, preferably C3-C12, cycloalkylene diisocyanates or alkylene diisocyanates, e.g. isophorone diisocyanate or methylenebis(4-isocyanatocyclohexane). The alkylene diisocyanates here may be either linear or branched. Particular preference is given to isocyanurates based on n-hexamethylene diisocyanate, for example, cyclic trimers, pentamers, or higher oligomers of n-hexamethylene diisocyanate.

The amounts generally used of component (d2) are from 0.01 to 5 mol %, preferably from 0.05 to 4 mol %, particularly preferably from 0.1 to 4 mol %, based on the total of the molar amounts of A and B.

Divinyl ethers (d3) which may be used are generally any of the customary and commercially available divinyl ethers. Preference is given to the use of 1,4-butanediol divinyl ethers, 1,6-hexanediol divinyl ethers or 1,4-cyclohexanedimethanol divinyl ethers or a mixture of these.

The amounts of the divinyl ethers preferably used are from 0.01 to 5% by weight, especially from 0.2 to 4% by weight, based on the total weight of A and B.

Examples of semiaromatic polyesters are based on the following components: A, B, d1; A, B, d2; A, B, d1, d2; A, B, d3; A, B, c1; A, B, c1, d3; A, B, c3, c4; A, B, c3, c4, c5; A, B, d1, c3, c5; A, B, c3, d3; A, B, c3, d1; A, B, c1, c3, d3; or A, B, c2. Among these, particular preference is given to semiaromatic polyesters based on A, B and d1, or A, B and d2, or on A, B, d1 and d2. In another preferred embodiment, the semiaromatic polyesters are based on A, B, c3, c4 and c5 or A, B, d1, c3 and c5.

While the polyester polymer according to the above disclosure is a biodegradable polyester polymer, it is understood that the polyester polymer may be non-biodegradable without departing from the scope of this disclosure.

In one suitable example, the carrier material comprises both a polysaccharide material, such as a cellulosic material, and a thermoplastic material, such as a polyester. For example, in such an embodiment the thermoplastic material may comprise about 20 to about 40 weight %, 20 to about 60 weight %, or 20 to about 80 weight % of the bait matrix 124.

Some suitable compositions of the conductive bait matrix 1400 are shown in Table 1a:

TABLE 1a

| Cellulose | Graphite | Thermoplastic Polyester |
|---|---|---|
| 75 | 5 | 20 |
| 70 | 10 | 20 |
| 65 | 15 | 20 |
| 65 | 5 | 30 |
| 60 | 10 | 30 |
| 55 | 15 | 30 |
| 55 | 5 | 40 |

TABLE 1a-continued

| Cellulose | Graphite | Thermoplastic Polyester |
|---|---|---|
| 50 | 10 | 40 |
| 45 | 5 | 50 |
| 45 | 15 | 40 |
| 40 | 10 | 50 |
| 35 | 15 | 50 |
| 35 | 5 | 60 |
| 30 | 10 | 60 |
| 25 | 15 | 60 |

Some suitable compositions of the non-conductive bait matrix 1402 are shown in Table 1b:

TABLE 1b

| Cellulose | Thermoplastic Polyester |
|---|---|
| 80 | 20 |
| 70 | 30 |
| 65 | 35 |
| 60 | 40 |
| 55 | 45 |
| 50 | 50 |
| 45 | 55 |
| 40 | 60 |
| 35 | 65 |
| 30 | 70 |
| 25 | 75 |
| 20 | 80 |

It is understood that other suitable manufacturing processes are also contemplated for combining the carrier material such as, without limitation, coextrusion, compaction, immersion, molding, suspension and the like.

One method for making a workpiece includes:
(1) providing a mixture of
  a. a softened or molten thermoplastic polymer having a softening or melting point below about 220° C.
  b. a phagostimulant material (i.e. a material to increase palatability of the matrix for consumptive purposes, which may be "digestible"
    or "nutritive", but need not offer such benefit) for the target pest; and
  c. a material comprising conductive and/or phagostimulatory particles;
(2) forming the mixture to provide a workpiece having a desired shape; and
(3) cooling the workpiece to a temperature below the softening or melting point of the plastic to provide a solid composite article.

One workpiece preferably is or comprises the conductive bait matrix 1400.

Another method for making a workpiece includes:
(1) providing a mixture of
  a. a softened or molten thermoplastic polymer having a softening or melting point below about 220° C.
  b. a phagostimulant material (i.e. "digestible" or "nutritive" component) for the target pest and
  c. optionally further components
(2) forming the mixture to provide a workpiece having a desired shape; and
(3) cooling the workpiece to a temperature below the softening or melting point of the plastic to provide a solid composite article.

Another suitable workpiece is or comprises the non-conductive bait matrix 1402.

As used herein, the term "molten" is intended to refer to a state of a thermoplastic material in which the material is fully melted, partially melted, or sufficiently softened or tacky that the polymer can be formed, for example, by extrusion or molding and then cooling, into a plastic matrix. Similarly, the term "melting point" as used herein is intended to refer to the temperature at which a given material, polymer or mixture of polymers melts, softens or becomes tacky, and encompasses the glass transition temperature for amorphous polymers. A person skilled in the art will appreciate that the melting point of a given material, polymer or mixture of polymers can be modified by contacting the material, polymer or mixture of polymers with certain solvents and/or other additives. In one embodiment, the workpiece is formed by extrusion.

To make a solid composite article in accordance with one embodiment, a mixture of a granular or particulate thermoplastic polymer, a phagostimulant material for the target pest and a material comprising a plurality of conductive and/or phagostimulatory particles is provided, and the mixture is then compounded to mix the components, and extruded or molded at a predetermined temperature and pressure. In a suitable embodiment, a combination of graphite and polymer are phagostimulatory, as opposed to the polymer alone. The polymer, the phagostimulant material and the material comprising a plurality of phagostimulatory particles can be combined using standard mixing or compounding techniques to mix the components and drive off excess moisture. For example, the materials can be mixed in a rotational mixer or compounding extruder. Heat is applied if needed to bring the mixture to a temperature sufficiently high to make the thermoplastic polymer pliable or plastic and therefore suitable for shaping, such as by extrusion. In one embodiment, the temperature is at least as high as the melting point of the polymer. In another embodiment, the temperature is at least as high as the glass transition temperature of the polymer.

One skilled in the art will recognize that higher temperatures may be needed, and that the processing temperature may be optimized to allow the polymer to be processed as long as the temperature is not raised to a point that results in substantial harm to other components of the composite, such as, for example, charring the digestible or nutritive material. A person of ordinary skill in the art will also understand that the inclusion of a solvent in the mixture can modify the softening temperature of the thermoplastic material. In embodiments in which a solvent is present, it is understood that softening at the surface of a polymer, as modified by the solvent, might begin at a temperature that is lower than the natural melting point of the polymer in the absence of the solvent. In other words, temperatures below the natural melting point of the polymer may be suitable molding temperatures in embodiments in which the solvent is effective to soften the surface of the polymer at a temperature below its natural melting point.

A wide variety of extrusion or molding techniques can be used, many examples of which are known in the art. While it is not intended that the present application be limited by any theory, it is believed that, under extrusion or molding conditions applied in methods described herein, the polymer granules become softened, tacky or fully melted. When this occurs, pressure exerted upon the mixture causes softened polymer granules to contact one another and adhere together or causes the polymer to fully melt, whereby the molten polymer forms a continuous phase in the mixture. The temperature at which the compression is applied is a temperature high enough to achieve a desired level of polymer particle adhesion or polymer melting. It is understood that a wide variety of material specifications (such as polymer type, polymer size, granule size distribution and ratio of ingredients) and also a wide variety of process parameters (such as temperature and pressure) can be used to provide articles having various advantageous characteristics. It is within the ability of a skilled person, armed with the description of the present application, to select, without undue experimentation, advantageous combinations of materials and parameters to provide articles having differing amounts of conductive particles, different levels of palatability, and different physical properties for use as an effective bait matrix in the system as described.

In one manner of practicing the method, the molten mixture is provided by mixing the polymer, the phagostimulant (i.e. digestive or nutritive) material and the material comprising a plurality of conductive and/or phagostimulatory particles to form a mixture and then compounding said mixture under elevated pressure and temperature to form a molten material.

In another manner of practicing the method, the method includes forming pellets or flakes of the mixture prior to compounding.

In one manner of making the workpiece, all of the components are mixed together and then the mixture is heated above the melting point of the thermoplastic polymer included therein, e.g. up to about 220 degrees centigrade in some embodiments, in a device, such as a twin screw mixer, that is capable of additional mixing followed by extrusion through a die, which imparts a specific cross-sectional profile to the composite material, and then cooling in a water bath or spray.

In another manner of forming the workpiece, the polymer, the phagostimulant material and the material comprising a plurality of conductive and/or phagostimulatory particles are combined within an extruder under positive pressure and at elevated temperature and are thereafter extruded to provide an elongated workpiece.

In another manner of forming the workpiece, the thermoplastic polymer and the material comprising a plurality of conductive and/or phagostimulatory particles are individually but simultaneously fed upstream into the extruder and the phagostimulant material is added downstream into the extruder.

In another manner of forming the workpiece, the thermoplastic polymer, the material comprising a plurality of conductive and/or phagostimulatory particles, and the phagostimulant material are individually but simultaneously fed into the extruder.

It is to be understood that suitable workpieces can be manufactured by the manners of forming the workpiece described above also without the material comprising a plurality of conductive and/or phagostimulatory particles.

In one preferred embodiment, the surface of the finished workpiece is structurally inhomogeneous on a mm to cm scale. In one embodiment, the surface comprises a plurality of cavities of a width from 0.1 mm to 100 mm, from 1 mm to 50 mm, from 1 mm to 20 mm, and a depth from 0.1 mm to 10 mm, from 1 mm to 5 mm, from 1 mm to 3 mm. The cavities can be of any shape. The cavities can be interconnected with or separated from each other. Individual cavities on the same workpiece can be different in size and shape.

Figure 14:
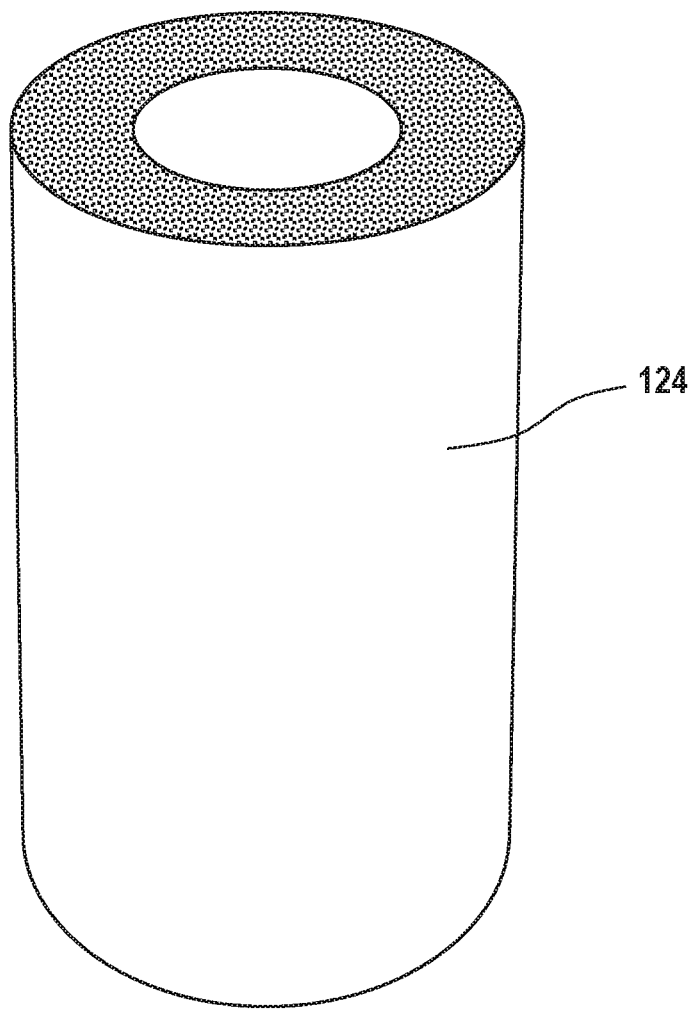
FIG. 14 shows the conductive bait matrix shown in FIG. 13 having a structurally inhomogeneous surface.

FIG. 14 shows an exemplary bait matrix 124 having a structurally inhomogeneous surface.

In one embodiment, one or more of the parameters of the extrusion process like for example temperature, duration, extrusion velocity, extrusion additives, post-extrusion treatment and the like are chosen so that the surface of the extruded workpiece comprises separated or interconnected cavities of 0.1 mm to 20 mm width and 0.1 mm to 5 mm depth.

The skilled person is knowledgeable as to which parameters of the extrusion process produce imperfect/structurally inhomogeneous surfaces of a workpiece. For example, a structurally inhomogeneous surface can be produced by applying extrusion temperatures of at most Tm+80° C. or Tm+70° C. or Tm+60° C., Tm being the extruded thermoplastic semi crystalline polymer's melting temperature.

The cooling can be achieved, for example, by applying a water bath to the workpiece or by spraying the workpiece with water.

In another embodiment, the surface of the finished workpiece is structurally homogeneous, i.e. does show few or no cavities in the mm to cm scale.

Figure 15:
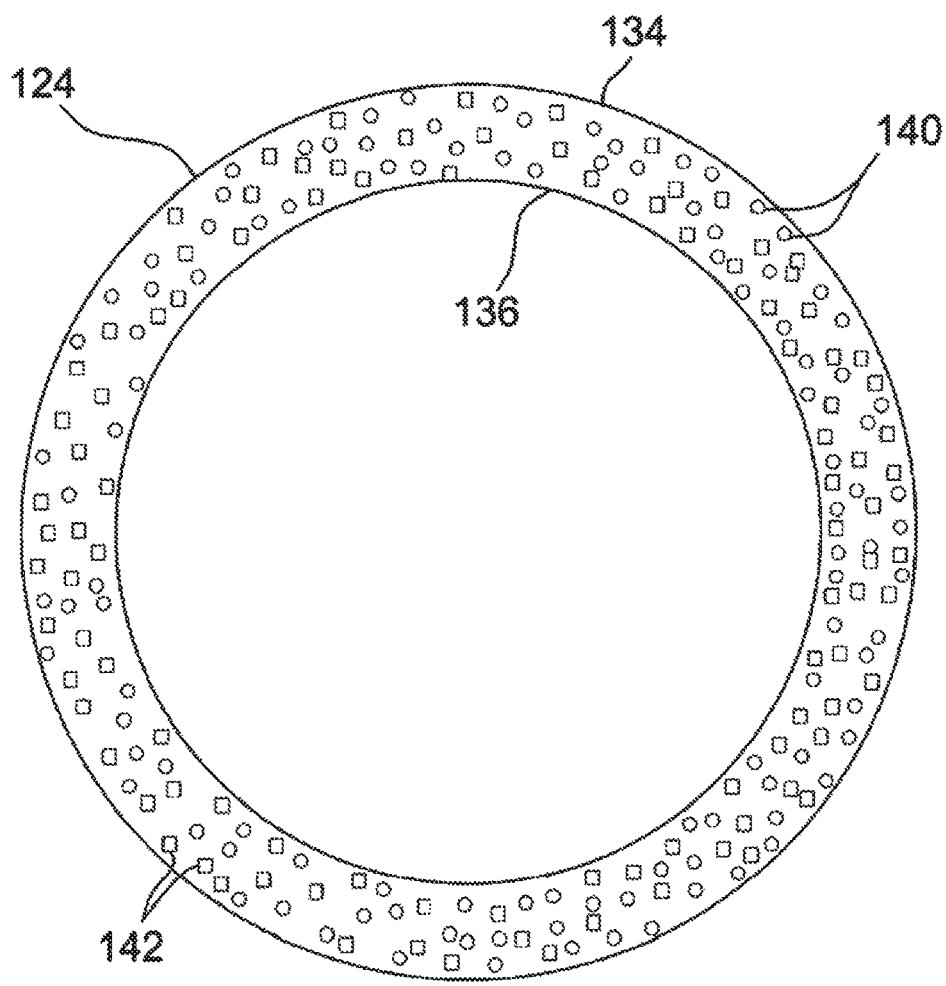
FIG. 15 is a transverse cross-section of the bait matrix shown in FIG. 13.

FIG. 15 is a cross-section of one suitable embodiment of the bait matrix 124. As is readily seen, the phagostimulatory or non-soluble biomarker (illustrated schematically as circles 1600) and carrier material particles (illustrated schematically as squares 1602) are randomly interspersed throughout both the thickness and the height of the bait matrix 124.

Figure 16:
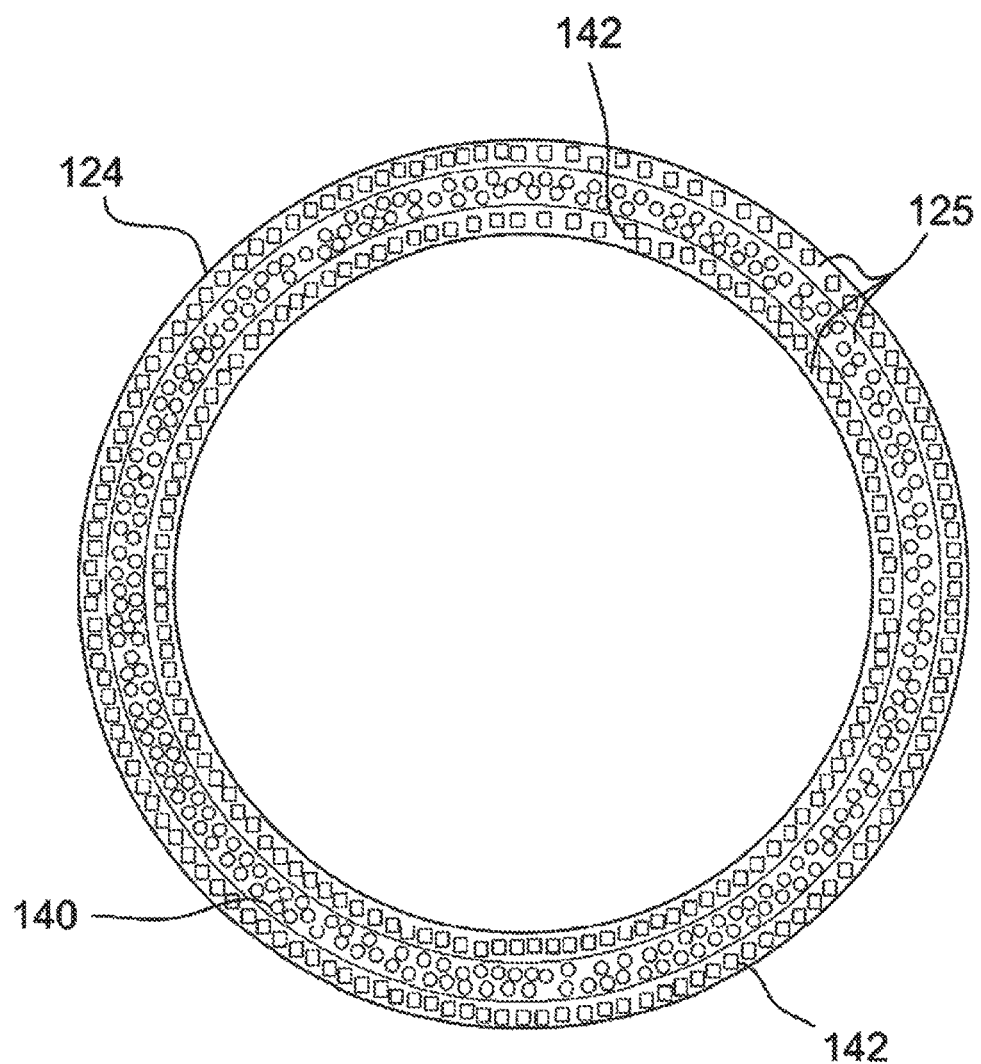
FIG. 16 is a transverse cross-section of another embodiment of the bait matrix shown in FIG. 13.

As shown in FIG. 16, in another contemplated embodiment of the bait matrix 124, the bait matrix 124 may be formed by a process of co-extrusion such that the bait matrix 124 has a plurality of distinct layers 1700. In such an embodiment, a layer of electrically conductive particles 1600 would be extruded simultaneous to a layer of carrier material particles 1602 such that the layer of carrier material particles 1602 cover an outer surface of the layer of electrically conductive particles 1600. Optionally, the layer of electrically conductive particles 1600 may be sandwiched between layers of carrier material particles 1602.

EXAMPLES

Termite Preference for Particular Bait Matrix Compounds

Example 1

Termite Preference for Graphite (Conductive Bait Matrix)

Arenas consisted of 100 mm×20 mm polystyrene dishes filled (ca. 5 mm depth) with QuickStone® Laboratory Stone (Whip Mix Corp., Louisville Ky.) mixed as per the manufacturer's instructions. The QuickStone® Laboratory Stone was cured for 24 hours (h) prior to use. For initial hydration, 5 ml purified water was added to each arena and excess water was poured off after 2 h. The surface was then lightly blotted. Uniformly sized bait sections from two different bait matrix compositions comprising Ecoflex® and graphite or Ecoflex® and no graphite, approximately 1.0×1.0×0.5 cm (10 replicates of each composition), were weighed and placed individually into plastic weigh dishes (4 cm×4 cm, with openings cut into opposite sidewalls for termite access). A non-nutritive 5% agar plug (ca. 0.5 cm×1.0 cm) was added to each arena as a water source. Agar plugs were replaced every 3-4 days (d) and approximately 0.25 ml purified water was added to the surface of each arena every 4 d. About one hundred termites (workers and approximately 10% soldiers, determined by weight) were transferred into each arena. The assay was maintained at 27° C. and 80% RH. After two weeks, bait samples were removed from arenas and oven dried at 110° F. for approximately 24 h. The baits were weighed and the differences in pre and post weights, resulting from bait removal by termites, were compared as an indicator of bait acceptance. Bait removal resulted from a combination of consumption, provisioning (feeding of soldiers by workers), and the application of bait to the surfaces of the arena.

Conclusions

As shown by the data in Table 2, matrix acceptance of Ecoflex® containing graphite was significantly greater than that of Ecoflex® which contained no graphite.

TABLE 2

Comparative consumption data for the "conductive portion of the assembly" ("KA", which includes a mixture of ecoflex ®, Lattice ® NT 100 (a form of microcrystalline cellulose) and graphite (Asbury ® 4848)) and "non-conductive portion of the assembly" ("HW", which includes ecoflex ® and Lattice ® NT 100 (a form of microcrystalline cellulose)). Acceptance of KA was significantly greater than that of HW in the no choice assay (t test, 0.05% level).

Single dish, no choice

| | KA - ecoflex ® (graphite) | | | | HW - ecoflex ® (no graphite) | | |
|---|---|---|---|---|---|---|---|
| Rep | pre | post | A (g) | Rep | pre | post | A (g) |
| 1 | 0.6313 | 0.5615 | 0.0698 | 1 | 0.8213 | 0.7801 | 0.0412 |
| 2 | 0.6964 | 0.582 | 0.1144 | 2 | 0.8989 | 0.8814 | 0.0175 |
| 3 | 0.7273 | 0.6462 | 0.0811 | 3 | 0.7233 | 0.6849 | 0.0384 |
| 4 | 0.6752 | 0.5329 | 0.1423 | 4 | 0.7364 | 0.688 | 0.0484 |
| 5 | 0.6911 | 0.6017 | 0.0894 | 5 | 0.8481 | 0.8257 | 0.0224 |
| 6 | 0.6775 | 0.6331 | 0.0444 | 6 | 0.6539 | 0.6247 | 0.0292 |
| 7 | 0.6643 | 0.5994 | 0.0649 | 7 | 0.7415 | 0.701 | 0.0405 |
| 8 | 0.6951 | 0.6157 | 0.0794 | 8 | 0.7382 | 0.6934 | 0.0448 |
| 9 | 0.5989 | 0.5058 | 0.0931 | 9 | 0.8413 | 0.7896 | 0.0517 |
| 10 | 0.6214 | 0.5787 | 0.0427 | 10 | 0.6687 | 0.6228 | 0.0459 |
| Avg.→ | | | 0.08215 | | | | 0.038 |

Example 2

Termite Preference for Ecoflex® Material

Objective: To determine whether Formosan subterranean termites, *Coptotermes formosanus*, and eastern subterranean termites, *Reticulitermes flavipes* had a preference for particular bait matrices components three prototype bait matrices as set forth in Table 3, were presented to the termites via no choice and single-dish choice methodologies.

TABLE 3

Prototype matrices evaluated for acceptance by *C. formosanus* and *R. flavipes*

| ecoflex ® | CAB CE 24647 (CAB) | CAP CE 26627 (CAP) |
|---|---|---|
| ecoflex ® F Blend X % | X % | X % |
| NT 100 Y % | NT 100 Y % | NT 100 Y % |
| Graphite Z % | Graphite Z % | Graphite Z % |

NT 100 = Lattice ® NT 100
Graphite used was Asbury ® 4848

Equal percentages (X %) of Ecoflex®, CAB and CAP were used in each respective type of bait sample and combined with the same percentages of NT 100 (Y %) and graphite (Z %) where X, Y and Z each represent a specific percentage of the bait composition and are consistent between the samples, e.g. X % is the same between bait samples (Ecoflex®, CAB and CAP). In one suitable embodiment, the value of X is 35, the value of Y is 55, and the value of Z is 10.

No Choice Assay Test:

Arenas consisted of 100 mm×20 mm polystyrene dishes filled (ca. 5 mm depth) with QuickStone® Laboratory Stone (Whip Mix Corp., Louisville Ky.) mixed as per the manufacturer's instructions. The QuickStone® was cured for 24 hours (h) prior to use. For initial hydration, 5 ml purified water was added to each arena and excess water was poured off after 2 h. The surface was then lightly blotted. Uniformly sized bait sections (10 replicates) or pine sections (4 replicates) were weighed and placed individually into plastic weigh dishes (4 cm×4 cm, with openings cut into opposite sidewalls for termite access). A non-nutritive 5% agar plug (ca. 0.5 cm×1.0 cm) was added to each arena as a water source. Agar plugs were replaced every 3-4 days (d) and approximately 0.25 ml purified water was added to the surface of each arena every 4 d. One hundred termites (workers and approximately 10% soldiers, determined by weight) were transferred into each arena. The assay was maintained at 27° C. and 80% relative humidity. After two weeks, bait/pine samples were removed from arenas and oven dried at 110° F. for approximately 24 h. The baits were weighed and the differences in pre and post weights, resulting from bait removal by termites, were compared as an indicator of bait acceptance. Bait removal resulted from a combination of consumption, provisioning (feeding of soldiers by workers), and the application of bait to the surfaces of the arena.

Single-Dish Choice Assay Test:

The single-dish choice replicates (three) were included to determine if termites would accept/consume the bait in the presence of wood. The same method was followed as was described for the no choice assay with the addition to the arena of a section of wood.

Results

General observations: For the duration of the evaluation, termites of both species were observed walking and aggregating on the three prototype baits. After 48 h, bait (marked with graphite) was visible through the body wall in most termites in all arenas. Two weeks after infestation, there appeared to be more bait visible in termites in the Ecoflex® arenas compared to those in the CAB and CAP arenas.

*Coptotermes formosanus* (Table 4)

No Choice Assay:

Bait acceptance, as indicated by the amount of material removed from the subsample, of Ecoflex® was significantly greater than that of CAB, CAP, and pine.

Acceptance of CAP was significantly lower than that of Ecoflex®, CAB, and pine.

There was no significant difference between acceptance of CAB and pine.

Single-Dish Choice Assay:

Termites removed more Ecoflex® (59.37 mg) compared to pine (20.97 mg). Termites removed less CAB (0.83 mg) compared to pine (56.43 mg).

Termites removed less CAP (0.93 mg) compared to pine (41.60 mg).

*Reticulitermes flavipes* (Table 4)

No Choice Assay:

There were no significant differences in the acceptance of Ecoflex®, CAB, and pine.

Acceptance of CAP was significantly lower than that of Ecoflex®, CAB, and pine.

Single-Dish Choice Assay:

Termites removed more Ecoflex® (66.63 mg) compared to pine (11.03 mg).

Termites removed less CAB (35.37 mg) compared to pine (59.17 mg).

Termites removed less CAP (11.83 mg) compared to pine (74.30 mg).

Conclusions

Ecoflex® was readily accepted by Formosan subterranean termites, *Coptotermes formosanus*, and eastern subterranean termites, *Reticulitermes flavipes* in both no choice and single-dish choice (bait and pine) laboratory methodologies.

Bait acceptance of CAP (containing CE polymer 26627) was significantly lower than Ecoflex® and CAB (containing CE polymer 24647) in the no choice assay.

Bait acceptance of CAB and CAP was greatly reduced when paired with a pine food source in a single-dish choice laboratory assay.

Bait acceptance of Ecoflex® was greater than that of a pine food source in a single-dish choice laboratory assay.

TABLE 4

Acceptance[1] of three prototype TrelonaTM MY Termite Bait matrices, ecoflex ® (thermoplastic material = ecoflex ®), CAB (thermoplastic material = CAB), and CAP (thermoplastic material = CAP) by Formosan subterranean termites, *Coptotermes formosanus*, and eastern subterranean termites, *Reticulitermes flavipes*.

| | | Avg.[3] weight change (mg) 14 d post infestation | |
|---|---|---|---|
| Arena | Treatment[2] | *C. formosanus* | *R. flavipes* |
| No choice | KA(ecoflex ®) | 77.48 A | 64.18 A |
| | KG(CAB) | 42.48 B | 55.82 A |
| | HV(CAP) | 16.92 C | 21.22 B |
| | Wood (pine) | 44.20 B | 63.73 A |
| Single-dish choice | KA (ecoflex ®) | 59.37 | 66.63 |
| | Wood (pine) | 20.97 | 11.03 |
| | KG (CAB) | 0.83 | 35.37 |
| | Wood(pine) | 56.43 | 59.17 |
| | HV (CAP) | 0.93 | 11.83 |
| | Wood(pine) | 41.60 | 74.30 |

[1]Acceptance is determined by the change in bait weight resulting from the removal of bait by consumption, provisioning (feeding of soldiers by workers), and the application of bait to the surfaces of the arena.
[2]Table 3 summarizes the general composition.
[3]Average of 10 replicates of no choice ecoflex ®, Cab and CAP;
[4] replicates of no choice pine, 3 replicates of single-dish choice.
Values followed by the same letter are not significantly different at the 0.05% level, means separated by Tukey's HSD.
Assay initiated on 1 Sept. 2015, C. Leichter NB 33587 p. 96.

Example 3

Additional preference for an Ecoflex® bait matrix is shown in the data set forth in Table 5 below. Three types of bait matrix compositions were exposed to *Coptotermes formosanus* for four weeks in a field study. The three baits used were a) a mixture of cellulose (Y %), cellulose acetate propionate CAP (X %), and graphite (Z %), b) a mixture of cellulose (Y %), Ecoflex® (X %), and graphite (Z %) and c) a mixture of cellulose (Y %), cellulose acetate butyrate CAB (X %), and graphite (Z %)—where X, Y and Z each represent a specific percentage of the bait composition and are consistent between the samples, e.g. X % is the same between bait a), b) and c). Replicates of the three different baits were placed in buckets in the ground and colonies of termites were allowed to feed on them for a period of thirty days. An estimated number of termites introduced to the buckets were provided at the beginning and an estimated number of termites remaining in the buckets was provided at the completion of the study. Some buckets contained multiple bait matrices as shown in the table below. Other buckets contained individual matrices. Buckets 3-6 were placed near each other surrounding the same location (a tree) and buckets 7-10 were placed near each other surrounding the same location (a second tree). Following the thirty day period, the baits were removed from the buckets and consumption was observed, rated and baits were then weighed.

Conclusion the termites showed a clear preference for Bait (b)—the Ecoflex® blend over the Bait (a)—the CAP blend and Bait (c)—the CAB blend regardless of colony size and whether the baits were presented individually or in combination with one another.

TABLE 5

Preference data from field trial comparing termite preference for (a) CAP blend bait, (b) an ecoflex ® blend bait, and (c) a CAB blend bait after 30 days consumption.
Preference Field Trials

| Bucket # | Treatment | Installation weight (g) | Final Weight (g) | % Bait Consumption | Estimated # Termites at Install/com |
|---|---|---|---|---|---|
| 1* | Bait (b) | 202.1 | 144.6 | 28.45 | 5000/3,000 |
| | Bait (b) | 202.0 | 144 | 28.71 | |
| | Bait (b) | 200.5 | 126.8 | 36.76 | |
| | Bait (b) | 200.6 | 136.1 | 32.15 | |
| | Bait (a) | 204.0 | 218 | −6.86 | |
| | Bait (a) | 199.9 | 214.8 | −7.45 | |
| | Bait (c) | 213.9 | 227.9 | −6.55 | |
| | Bait (c) | 209.8 | 222.7 | −6.15 | |
| 2 | Bait (b) | 200.4 | 18.6 | 90.72 | 15,000/10,000 |
| | Bait (b) | 200.4 | 17.9 | 91.07 | |
| | Bait (b) | 202.8 | 19.1 | 90.58 | |
| | Bait (b) | 199.2 | 18.6 | 90.66 | |
| | Bait (a) | 202.3 | 218.2 | −7.86 | |
| | Bait (a) | 202.6 | 220.6 | −8.88 | |
| | Bait (c) | 205.5 | 221 | −7.54 | |
| | Bait (c) | 209.5 | 223.2 | −6.54 | |
| 3 | Bait (b) | 201.0 | 5.6 | 97.21 | 100/200 |
| 4 | Bait (b) | 204.7 | 18 | 91.21 | 200/300 |
| 5 | Bait (a) | 204.1 | 222.3 | −8.92 | 200/0 |
| 6 | Bait (c) | 211.1 | 215.4 | −2.04 | 150/100 |
| 7 | Bait (b) | 200.0 | 14.3 | 92.85 | 100/500 |
| 8 | Bait (b) | 201.3 | 62.2 | 69.10 | 50/400 |
| 9 | Bait (a) | 205.4 | 217.9 | −6.09 | 300/0 |
| 10 | Bait (c) | 208.2 | 217.6 | −4.51 | 50/150 |

*Bucket 1 and its contents were noted to be very wet upon the completion of the study.

When introducing elements of the present invention or the preferred embodiment(s) thereof, the articles "a", "an", "the", and "said" are intended to mean that there are one or more of the elements. The terms "comprising," "including", and "having" are intended to be inclusive and mean that there may be additional elements other than the listed elements as various changes could be made in the above constructions without departing from the scope of the invention, it is intended that all matter contained in the above description or shown in the accompanying drawings shall be interpreted as illustrative and not in a limiting sense.

As various changes could be made in the above constructions without departing from the scope of the invention, it is intended that all matter contained in the above description or shown in the accompanying drawings shall be interpreted as illustrative and not in a limiting sense.

What is claimed is:

1. A pest monitoring system comprising:
   (a) a cavity to house a circuit, wherein the circuit comprises (i) a first electrode; and (ii) a second electrode that is not initially in contact with the first electrode;
   (b) a bait matrix positioned adjacent to the cavity;

(c) a waterproof member which partially surrounds the cavity and is positioned between the bait matrix and the first and second electrodes, the waterproof member configured to prevent moisture intrusion to the cavity prior to a presence of pest activity; and (d) a non-conductive gap formed of an electrically insulating material and configured to: (i) provide a base to which the first and second electrodes are attached; (ii) facilitate proper positioning of the first and second electrodes; and (iii) prevent the first and second electrodes from contacting one another;

wherein the circuit initially in a first impedance state that is configured to change to a second impedance state, or range of states, due to pest activity.

2. The pest monitoring system of claim 1, wherein the bait matrix at least partially surrounds the cavity.

3. The pest monitoring system of claim 1, wherein one of a) material deposited by pests exploiting the bait matrix and b) moisture intrusion creates a measurable impedance between the first and second electrodes to cause the circuit to become a closed circuit.

4. The pest monitoring system of claim 3, wherein a change in impedance between the first and second electrodes creates a measurable electrical characteristic that, when present, indicates exploitation of the bait matrix by pests.

5. The pest monitoring system of claim 1, further comprising a control unit configured to create a first electrical signal in the first electrode via the first terminal and monitor the second electrode via the second terminal.

6. The pest monitoring system of claim 5, wherein the control unit is further configured to:
   measure an electrical characteristic between the first electrode and the second electrode; and
   determine whether there is a presence of pests based on the measured electrical characteristic.

7. A pest monitoring system comprising:
   a. one or more stations each comprising a waterproof member which partially surrounds a cavity and is positioned between a bait matrix and the cavity, the waterproof member configured to prevent moisture intrusion to the cavity prior to a presence of pest activity, wherein the cavity houses one or more circuits, and wherein the one or more circuits comprise:
      (i) a first electrode;
      (ii) a second electrode that is not initially in contact with the first electrode;
      and
      (iii) a non-conductive gap formed of an electrically insulating material and configured to: (A) provide a base to which the first and second electrodes are attached; (B) facilitate proper positioning of the first and second electrodes; and (C) prevent the first and second electrodes from contacting one another;
      wherein the circuit is initially in a first impedance state that is configured to change to a second impedance state, or range of states, due to pest activity;
   b. one or more control units in communication with the one or more circuits, wherein the one or more control units detect any change in impedance and generate a signal;
   c. one or more gateways in communication with the one or more control units, wherein the one or more gateways receive the signal and serve as a packet forwarder to a network server; and
   d. one or more application platforms to receive the signal and interpret the change in impedance as indicative of a pest presence.

8. A pest monitoring system comprising a control unit that detects a change in impedance between two or more electrodes comprising:
   (i) a first electrode having a first electrical potential;
   (ii) a second electrode that is not initially in contact with the first electrode; and
   (iii) a non-conductive gap formed of an electrically insulating material and configured to: (A) provide a base to which the first and second electrodes are attached; (B) facilitate proper positioning of the first and second electrodes; and (C) prevent the first and second electrodes from contacting one another;
   wherein the first and second electrodes are housed in a cavity, the cavity is partially surrounded by a waterproof member that is positioned between a bait matrix and the cavity, the waterproof member configured to prevent moisture intrusion to the cavity prior to a presence of pest activity, and the control unit transmits at least one signal indicative of a change in potential across the two or more electrodes.

9. The pest monitoring system of claim 8, wherein the signal is transmitted to a central device.

10. The pest monitoring system of claim 8, wherein the signal is transmitted to a data collection service.

11. The pest monitoring system of claim 8, wherein the signal is transmitted to a cloud server.

12. The pest monitoring system of claim 8, wherein the signal is transmitted to a home monitoring system.

13. The pest monitoring system of claim 8, wherein the signal is transmitted directly to a pest management professional.

* * * * *